United States Patent
Kim et al.

(10) Patent No.: US 11,754,302 B2
(45) Date of Patent: Sep. 12, 2023

(54) PORTABLE AIR PURIFIER

(71) Applicant: LG ELECTRONICS INC., Seoul (KR)

(72) Inventors: Youngjun Kim, Seoul (KR); Ho-Jung Kim, Seoul (KR); Ji Hyung Kim, Seoul (KR); Tae Yoon Kim, Seoul (KR); Myung Jin Ku, Seoul (KR); Seong Ho Hong, Seoul (KR); Juhyun Kim, Seoul (KR); Jongkeon Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 378 days.

(21) Appl. No.: 16/646,257

(22) PCT Filed: Sep. 11, 2018

(86) PCT No.: PCT/KR2018/010651
§ 371 (c)(1),
(2) Date: Mar. 11, 2020

(87) PCT Pub. No.: WO2019/050383
PCT Pub. Date: Mar. 14, 2019

(65) Prior Publication Data
US 2020/0282797 A1    Sep. 10, 2020

(30) Foreign Application Priority Data

Sep. 11, 2017   (KR) .................. 10-2017-0116151
Mar. 30, 2018   (KR) .................. 10-2018-0037517
Sep. 11, 2018   (KR) .................. 10-2018-0108379

(51) Int. Cl.
*F24F 8/80*        (2021.01)
*B01D 46/00*   (2022.01)
(Continued)

(52) U.S. Cl.
CPC ............ *F24F 8/80* (2021.01); *B01D 46/0005* (2013.01); *B60H 1/00021* (2013.01);
(Continued)

(58) Field of Classification Search
CPC .. F24F 8/10–99; F24F 13/20; F24F 2013/205; B01D 46/0045; B01D 46/0047; B01D 46/42; B01D 2273/30
See application file for complete search history.

(56) References Cited

U.S. PATENT DOCUMENTS 3,891,418 A  *  6/1975   Burger ............... B01D 46/4281
                                                                  55/293
4,662,912 A  *  5/1987   Perkins ..................... F24F 8/10
                                                                  55/467
(Continued)

FOREIGN PATENT DOCUMENTS

| CN | 1254816 | 5/2000 |
| CN | 1789849 | 6/2006 |

(Continued)

OTHER PUBLICATIONS

Taiwan Office Action dated Dec. 8, 2021.
(Continued)

*Primary Examiner* — Travis Ruby
(74) *Attorney, Agent, or Firm* — KED & ASSOCIATES

(57) ABSTRACT

A portable air purifier may include at least one blower fan which rotates with respect to a rotational shaft extending in a first direction, and includes a hub, and a plurality of fan blades radially connected around the hub; and a fan cover provided with at least one shielding plate that shields the hub, and a plurality of guide vanes that guides a discharge direction of air discharged by the at least one blower fan. A foreground of a rotational area of the plurality of fan blades forms a blowing surface, and the plurality of guide vanes
(Continued)

may be arranged in front of the blowing surface and extend radially with respect to the rotational shaft. Each of the plurality of guide vanes may include a first guide surface positioned adjacent to the at least one blower fan and a second guide surface connected to the first guide surface and positioned further from the at least one blower fan than the first guide surface. The second guide surface may extend parallel to the first guide surface. The first guide surface may be oriented at a predetermined angle with respect to the blowing surface.

20 Claims, 62 Drawing Sheets

(51) Int. Cl.
*B60H 1/00* (2006.01)
*B60H 3/06* (2006.01)
*F24F 8/10* (2021.01)
*F24F 8/108* (2021.01)
*B01D 46/42* (2006.01)
*F24F 13/20* (2006.01)

(52) U.S. Cl.
CPC ..... *B60H 1/00264* (2013.01); *B60H 1/00428* (2013.01); *B60H 1/00657* (2013.01); *B60H 3/06* (2013.01); *F24F 8/10* (2021.01); *F24F 8/108* (2021.01); *B01D 46/42* (2013.01); *B01D 2273/30* (2013.01); *B60H 1/00828* (2013.01); *B60H 3/0658* (2013.01); *F24F 13/20* (2013.01)

(56) References Cited

U.S. PATENT DOCUMENTS

| | | | | |
|---|---|---|---|---|
| 4,781,526 A * | 11/1988 | Mead | | B01D 46/00 55/501 |
| 4,976,753 A | 12/1990 | Huang | | |
| 5,667,564 A * | 9/1997 | Weinberg | | B03C 3/32 96/68 |
| 5,749,359 A * | 5/1998 | Hansen | | A62B 9/003 128/202.25 |
| 5,837,020 A * | 11/1998 | Cartellone | | B01D 46/42 55/459.3 |
| 6,017,375 A | 1/2000 | Duell | | |
| 6,136,055 A * | 10/2000 | Stanek | | F24F 1/0071 55/482 |
| 6,238,023 B1 * | 5/2001 | Choi | | F24F 13/20 62/262 |
| 6,344,065 B1 * | 2/2002 | Boulva | | B01D 46/543 55/385.2 |
| 6,398,492 B1 | 6/2002 | Cho et al. | | |
| 7,429,284 B2 * | 9/2008 | Oh | | A47L 9/1641 55/459.1 |
| 7,537,649 B2 | 5/2009 | Pippel | | |
| 8,273,144 B2 | 9/2012 | Shore | | |
| 8,377,183 B2 | 2/2013 | Bailey et al. | | |
| 2002/0078703 A1 | 6/2002 | Kim | | F24F 1/005 62/298 |
| 2007/0214956 A1 * | 9/2007 | Carlson | | B01D 46/0086 55/417 |
| 2008/0086994 A1 | 4/2008 | Descotes | | |
| 2010/0089243 A1 | 4/2010 | Bailey et al. | | |
| 2013/0243588 A1 * | 9/2013 | Lo | | F04D 29/547 415/182.1 |
| 2014/0053591 A1 * | 2/2014 | Shin | | F24F 13/20 62/285 |
| 2014/0059987 A1 | 3/2014 | Hirakawa | | |
| 2014/0123612 A1 | 5/2014 | Yamada | | |
| 2015/0068169 A1 * | 3/2015 | Schulz | | B01D 45/16 55/447 |
| 2015/0113924 A1 * | 4/2015 | Mathews | | B01D 46/64 55/357 |
| 2015/0282384 A1 | 10/2015 | Ho | | |
| 2015/0352479 A1 | 12/2015 | Kim | | |
| 2015/0375154 A1 * | 12/2015 | Lai | | B01D 46/10 55/467 |
| 2015/0375602 A1 * | 12/2015 | Fields | | B60H 1/00264 55/385.3 |
| 2016/0107504 A1 | 4/2016 | Johnston | | |
| 2018/0202465 A1 * | 7/2018 | Randall | | B01D 46/62 |
| 2018/0335221 A1 | 11/2018 | Cho | | |
| 2021/0121816 A1 * | 4/2021 | Kim | | B01D 46/4245 |
| 2021/0123611 A1 * | 4/2021 | Yoon | | F24F 1/0018 |
| 2022/0023788 A1 * | 1/2022 | Oh | | F04D 25/0613 |
| 2022/0026085 A1 * | 1/2022 | Kim | | F24F 8/80 |

FOREIGN PATENT DOCUMENTS

| | | |
|---|---|---|
| CN | 1896610 | 1/2007 |
| CN | 103629747 | 3/2014 |
| CN | 105089465 | 11/2015 |
| CN | 105793578 | 7/2016 |
| DE | 10-2011-016070 | 10/2012 |
| EP | 1 016 790 | 7/2000 |
| JP | S5570321 | 5/1980 |
| JP | 2001-271791 | 10/2001 |
| JP | 2002-143282 | 5/2002 |
| JP | 2004-016942 | 1/2004 |
| JP | 2006-205937 | 8/2006 |
| JP | 3147515 | 1/2009 |
| JP | 2014-050793 | 3/2014 |
| JP | 2017-133416 | 8/2017 |
| KR | 10-2000-0047329 | 7/2000 |
| KR | 10-2004-0026321 | 3/2004 |
| KR | 10-2004-0056151 | 6/2004 |
| KR | 10-2006-0112000 | 10/2006 |
| KR | 10-0930308 | 12/2009 |
| KR | 10-2010-0063548 | 6/2010 |
| KR | 10-1157669 | 6/2012 |
| KR | 10-2013-0030381 | 3/2013 |
| KR | 10-2013-0142451 | 12/2013 |
| KR | 10-2014-0054655 | 5/2014 |
| KR | 10-2014-0142950 | 12/2014 |
| KR | 20-0475454 | 12/2014 |
| KR | 10-2015-0043877 | 4/2015 |
| KR | 10-2016-0015566 | 2/2016 |
| KR | 10-2016-0027292 | 3/2016 |
| KR | 10-1636067 | 7/2016 |
| KR | 10-2016-0099145 | 8/2016 |
| KR | 10-2017-0029302 | 3/2017 |
| KR | 10-2018-0086824 | 8/2018 |
| KR | 10-2018-0127223 | 11/2018 |
| WO | WO 2015/083371 | 6/2015 |
| WO | WO 2017/045584 | 3/2017 |
| WO | WO 2017/081904 | 5/2017 |

OTHER PUBLICATIONS

European Search Report issued in Application No. 18853715.3 dated Aug. 12, 2021.
European Search Report issued in application No. 18854158.5 dated May 12, 2021.
Korean Office Action dated Jul. 2, 2020.
Korean Office Action dated Jul. 8, 2020.
Korean Notice of Allowance dated Nov. 25, 2020 issued in KR Application No. 10-2018-0108404.
U.S. Appl. No. 16/646,257, filed Mar. 11, 2020.
U.S. Appl. No. 16/646,278, filed Mar. 11, 2020.
Korean Office Action dated Mar. 19, 2020.
Korean Office Action dated May 18, 2020.
International Search Report (with English Translation) issued in Application No. PCT/KR2018/010651 dated Jan. 15, 2019.
International Search Report (with English Translation) issued in Application No. PCT/KR2018/010652 dated Jan. 8, 2019.
Korean Notice of Allowance dated Feb. 24, 2021 issued in Application No. 10-2018-0108399.

(56) References Cited

OTHER PUBLICATIONS

Korean Office Action dated Mar. 30, 2021 issued in Application No. 10-2019-0029570.
Japanese Office Action dated Mar. 16, 2021 issued in Application No. 2020-535949.
U.S. Office Action dated May 31, 2022 issued in U.S. Appl. No. 16/646,278.
U.S. Notice of Allowance dated Sep. 20, 2022 issued in U.S. Appl. No. 16/646,278.
Korean Notice of Allowance dated Sep. 28, 2022.
Chinese Office Action dated Oct. 25, 2022.
Chinese Office Action dated Sep. 26, 2022 issued in CN Application No. 201880058606.7.
Chinese Office Action issued in Application No. 201880058606.7 dated Apr. 8, 2023.

* cited by examiner

FIG. 53

| ROTATION VELOCITY OF BLOWER FAN(RPM) | CONVENTIONAL AIR PURIFIER[CMH] | PORTABLE AIR PURIFIER OF PRESENT INVENTION [CMH] | PRESENT INVENTION |
|---|---|---|---|
| 4500 | 12.2 | 13.5 | +10% |
| 4900 | 13.8 | 16.1 | +16% |

FIG. 57
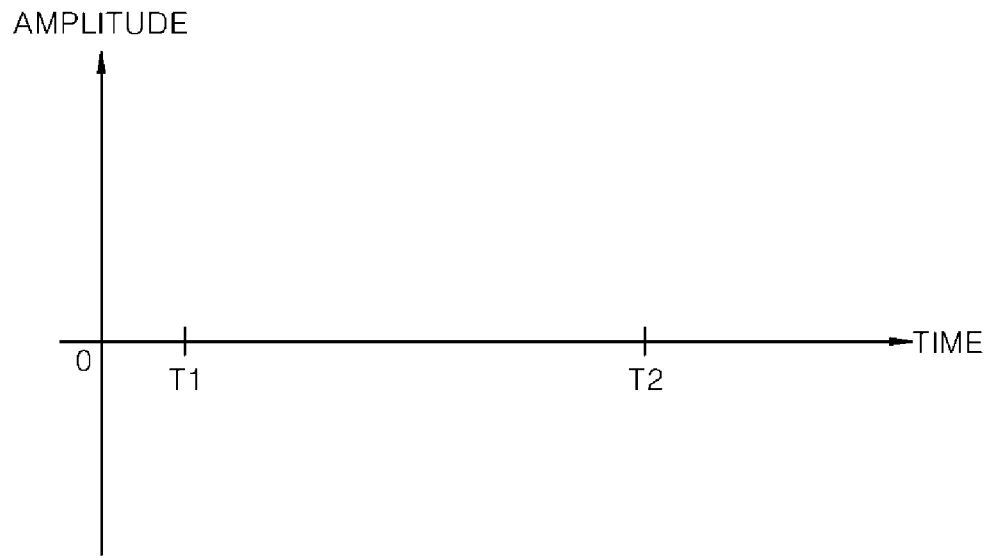
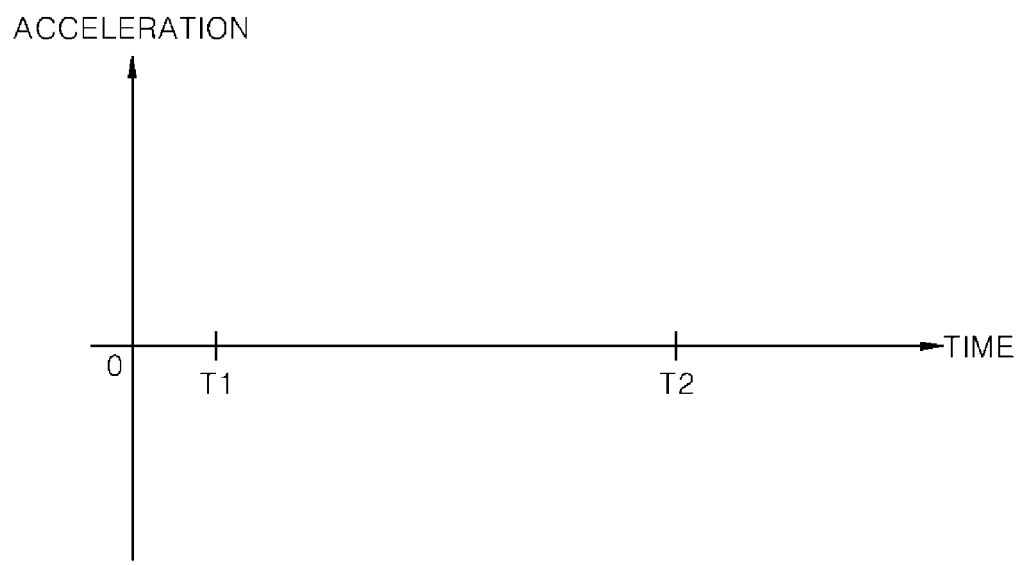

FIG. 58
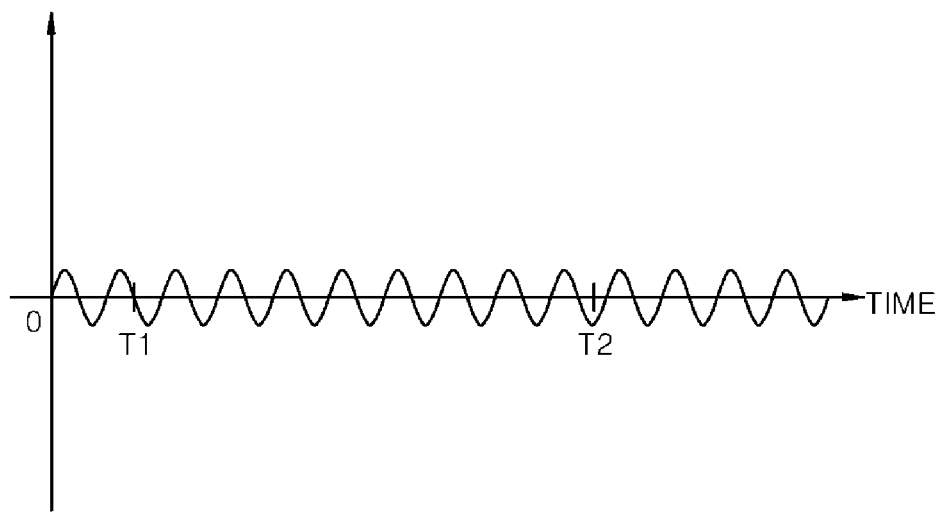
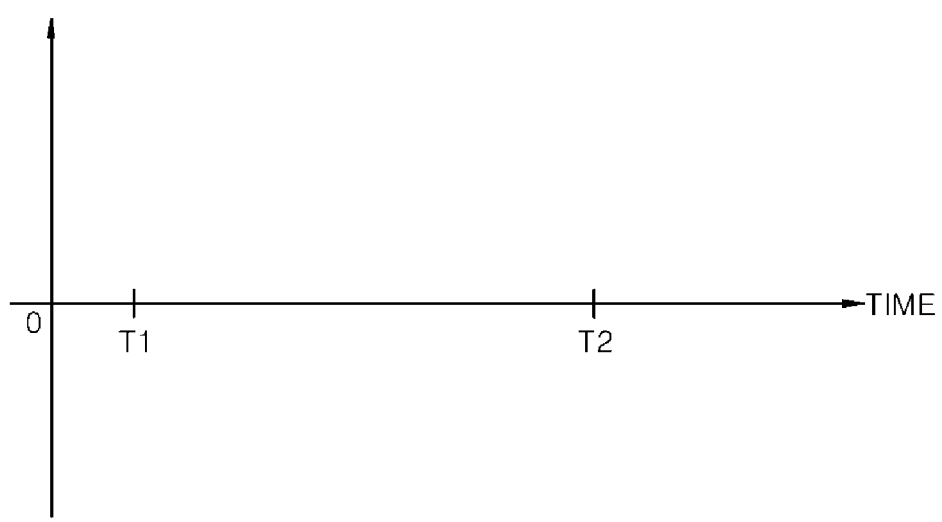

FIG. 59
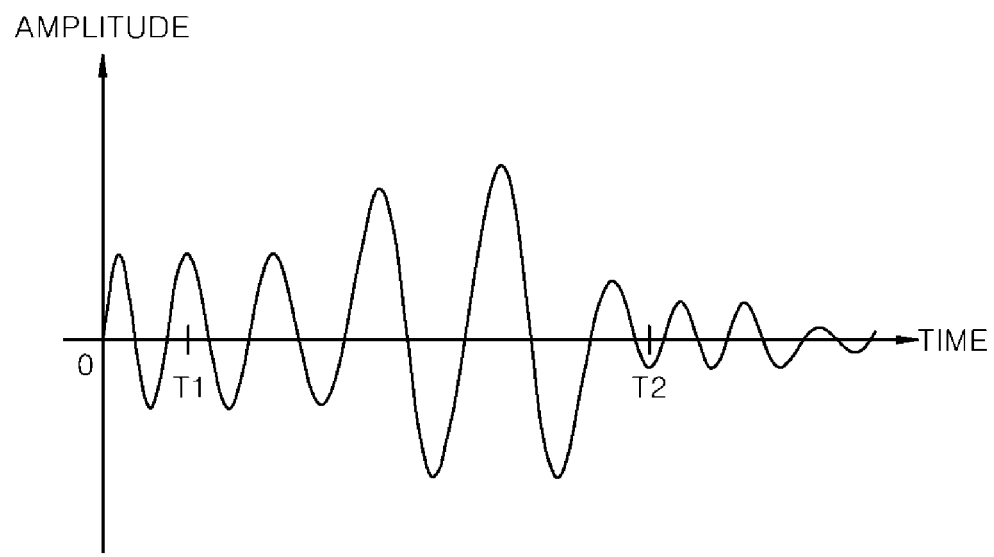
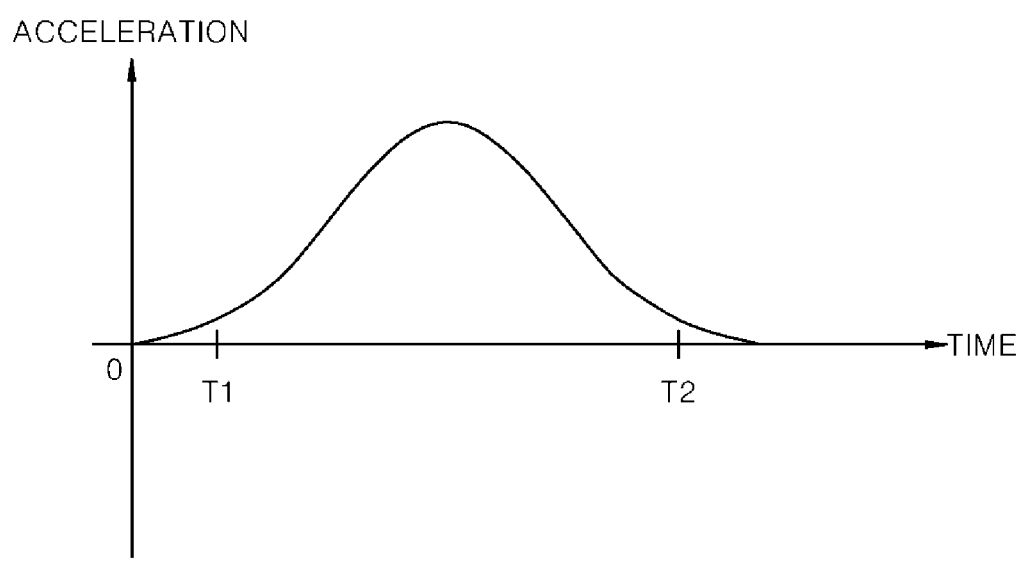

PORTABLE AIR PURIFIER

CROSS-REFERENCE TO RELATED PATENT APPLICATIONS

This application is a U.S. National Stage Application under 35 U.S.C. § 371 of PCT Application No. PCT/KR2018/010651, filed on Sep. 11, 2018, which claims priority to Korean Patent Application No. 10-2017-0116151, filed Sep. 11, 2017, Korean Patent Application No. 10-2018-0037517, filed Mar. 30, 2018, and Korean Patent Application No. 10-2018-0108379, filed Sep. 11, 2018, whose entire disclosures are hereby incorporated by reference.

TECHNICAL FIELD

The present invention relates to a portable air purifier, and more particularly, to a portable air purifier which is portable and usable.

BACKGROUND ART

Air purifiers are devices widely used in modern life and are devices for purifying air by filtering physical particles such as dust, fine particles, and ultrafine particles, chemical substances such as odor particles and harmful gases, and microorganisms such as bacteria and viruses.

The air purifiers are becoming essential devices even in general households under the influence of urbanization, industrialization, and internationalization. In addition, the demand for the air purifiers is rapidly increasing due to an increase in fine particles, an increase in allergic patients, and an improvement in living standards.

When the air purifier is intended for an environment in a general household which has an area exceeding 100 m2, the air purifier may have a large size. In the air purifier, filters corresponding to physical particles such as dust, filters corresponding to chemical substances such as gases, and filters corresponding to microorganisms such as bacteria and viruses may be used in combination. That is, a large size air purifier capable of accommodating various filters may be used in a wide space.

However, a large size air purifier is inefficient for being used in a narrow space such as a studio or a vehicle interior, a very wide space such as a public library, or an outdoor space in terms of space utilization, mobility, and energy consumption. In addition, rather than the large size air purifier, an air purifier, which is small and is portably usable by an individual, may be more suitable for users who move frequently. Under such circumstances, portable air purifiers which may be carried and used by individuals are being developed.

The portable air purifiers are provided in a small and light form so as to be easily portable. Such a portable air purifier has an advantage in that a user may easily carry and use the portable air purifier in a desired place. That is, the portable air purifier is a device suitable for a user who has a living pattern of frequently going out or moving to various places, rather than staying in the same place such as a home, a long time.

However, a discharge amount of purified air of the portable air purifier is inevitably smaller than that of a general air purifier installed and used in one place. In addition, a front discharge range of purified air discharged through the portable air purifier is inevitably relatively narrow. This is a problem inevitably caused due to an air purifier being miniaturized. As a portable air purifier is miniaturized, it is more difficult to increase a discharge amount and a front discharge range of purified air.

As described above, when the discharge amount and the front discharge range of the purified air of the portable air purifier are reduced, it is difficult for the purified air of the portable air purifier to reach a user, and in particular, a user's face. As described above, when it is difficult for the purified air of the portable air purifier to reach the user's face, it is difficult for the portable air purifier to provide proper air purification performance.

DISCLOSURE

Technical Problem

The present invention is directed to providing a portable air purifier having an improved structure such that purified air effectively reaches a user's face.

In addition, the present invention is directed to providing a portable air purifier capable of being manufactured at a low cost and also exhibiting high air purification performance.

Technical Solution

According to an embodiment of the present invention, a portable air purifier includes a blower fan which is rotated about a rotation shaft extending in a first direction and includes a hub and fan blades connected to a radial circumference of the hub, and a fan cover which includes a shield plate disposed at a discharge side of the blower fan to cover the hub and guide vanes configured to guide a discharge direction of air discharged from the blower fan, wherein a blowing surface is formed in front of a region in which the fan blade is rotated, the guide vane is disposed in front of the blowing surface and radially extends from the rotation shaft, the guide vane includes a first guide surface disposed adjacent to the blower fan and a second guide surface connected to the first guide surface and disposed farther than the first guide surface from the blower fan, the second guide surface is parallel to the first direction, and the first guide surface forms a certain angle (a) with respect to the blowing surface.

Due to such a configuration, since straightness of purified air discharged forward is improved using the guide vane, it is possible to increase an amount of air purified in the portable air purifier, which reaches a user's face, thereby providing more improved air purification performance.

The guide vanes may be disposed in a rotation direction of the blower fan, and the number of the guide vanes may be greater than the number of the blades.

Thus, since the number of points through which a discharge direction of air is guided by the guide vane (534) is greater than the number of points through which air is discharged by the blower fan (541), an air discharge direction guide action may be more effectively performed.

The fan cover may include an upper cover portion to which the blower fan is coupled and an air discharge portion formed to pass through the upper cover portion in front of the blower fan, the shield plate may be disposed in the air discharge portion, and the guide vane may connect the shield plate and the upper cover portion.

The fan cover may be made of a synthetic resin injection molding material, wherein the upper cover portion, the shield plate, and the guide vane are integrally injection-molded, and the guide vane may have a thickness of 1 mm.

Therefore, it is possible to manufacture a fan cover which may be easily manufactured at a low cost and which may also provide more improved air discharge performance.

Advantageous Effects

According to a portable air purifier of the present invention, since straightness of purified air discharged forward is improved using a guide vane, it is possible to increase an amount of air purified in the portable air purifier, which reaches a user's face, thereby providing more improved air purification performance.

In addition, more improved air discharge performance can be provided using a low cost general purpose fan instead of an expensive and high performance fan, thereby providing a high performance portable air purifier at a low cost.

Furthermore, according to a portable air purifier of the present embodiment, a guide vane can be applied to a fan cover in a process of designing the fan cover, thereby suppressing an increase in designing and manufacturing costs while providing improved air purification performance.

DESCRIPTION OF DRAWINGS

FIG. 53 is a table showing the results of measuring the air flow rate of the air purifier in which the guide vane is not applied to the fan cover and measuring the air flow rate of the air purifier according to the second embodiment of the present invention.

FIGS. 57 to 59 are graphs showing examples of sensed data sensed by a sensor module of the portable air purifier according to whether a vehicle starts or travels.

MODES OF THE INVENTION

Hereinafter, embodiments of a portable air purifier according to the present invention will be described with reference to the accompanying drawings. For convenience of description, the drawings are not to precise scale and may be exaggerated in thickness of lines or size of components for descriptive convenience and clarity only. In addition, the following terms are defined in consideration of functions used in the present invention and can be changed according to a convention or the intent of a user or an operator. Accordingly, definitions of the terms should be understood on the basis of the entire description of the present specification.

<Portable Air Purifier According to First Embodiment of the Present Invention>

[Portable Air Purifier Having Hexahedral Shape]

Figure 1:
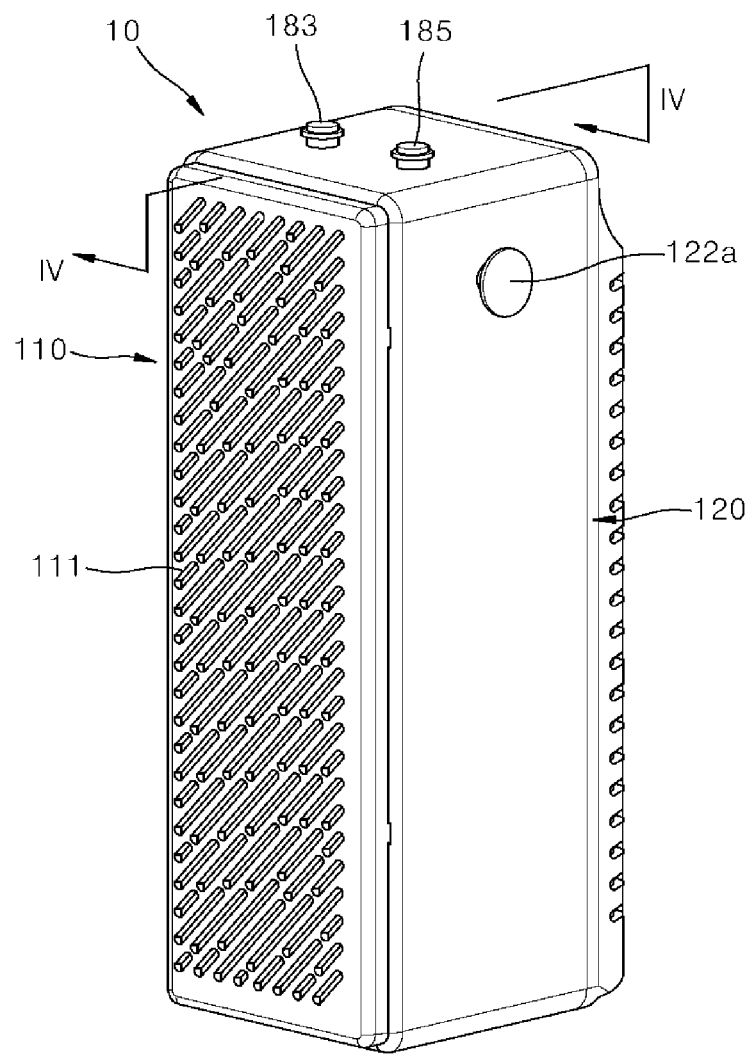
FIG. 1 is a front perspective view illustrating a front side of a portable air purifier according to a first embodiment of the present invention.
Figure 2:
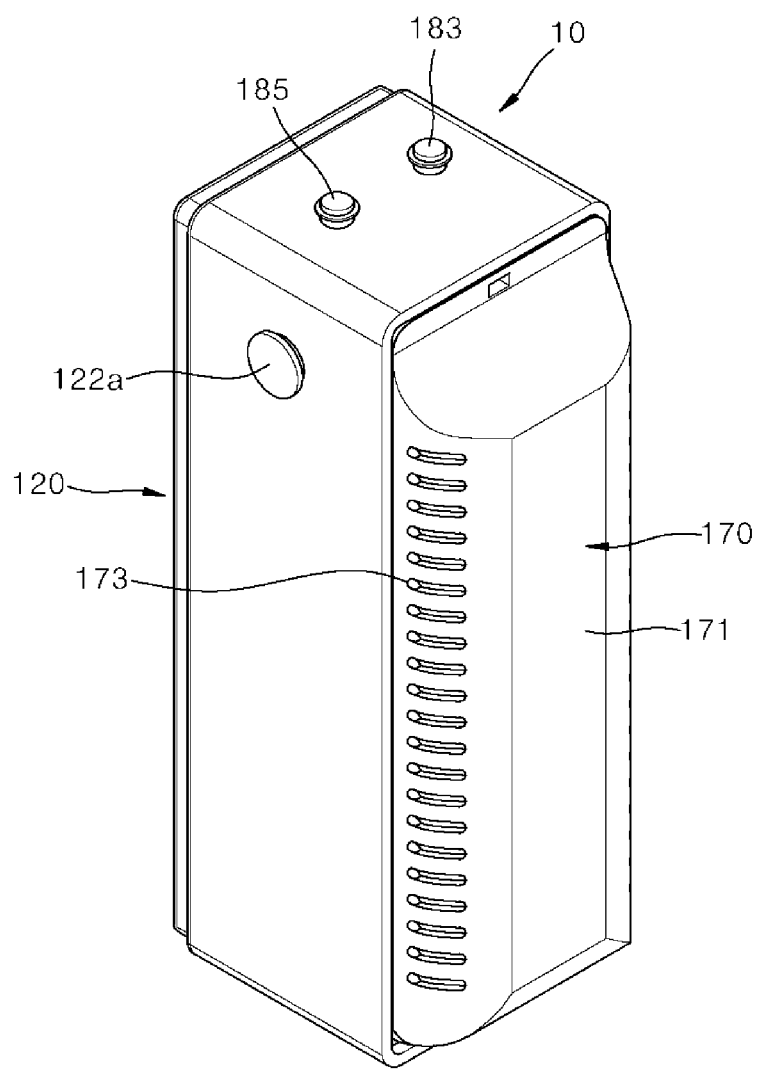
FIG. 2 is a rear perspective view illustrating a rear side of the portable air purifier shown in FIG. 1.
Figure 3:
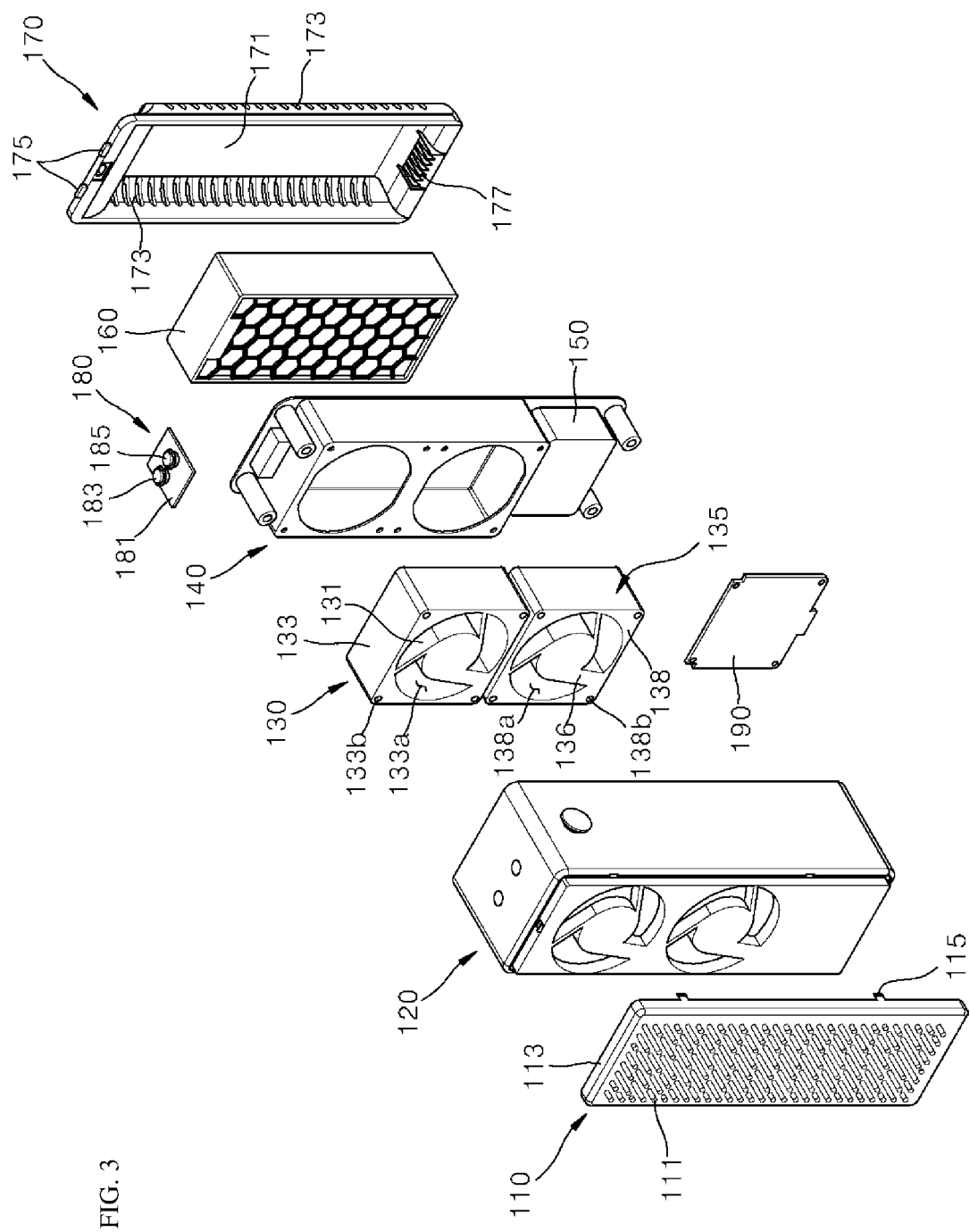
FIG. 3 is an exploded perspective view illustrating an exploded state of the portable air purifier shown in FIG. 1.
Figure 4:
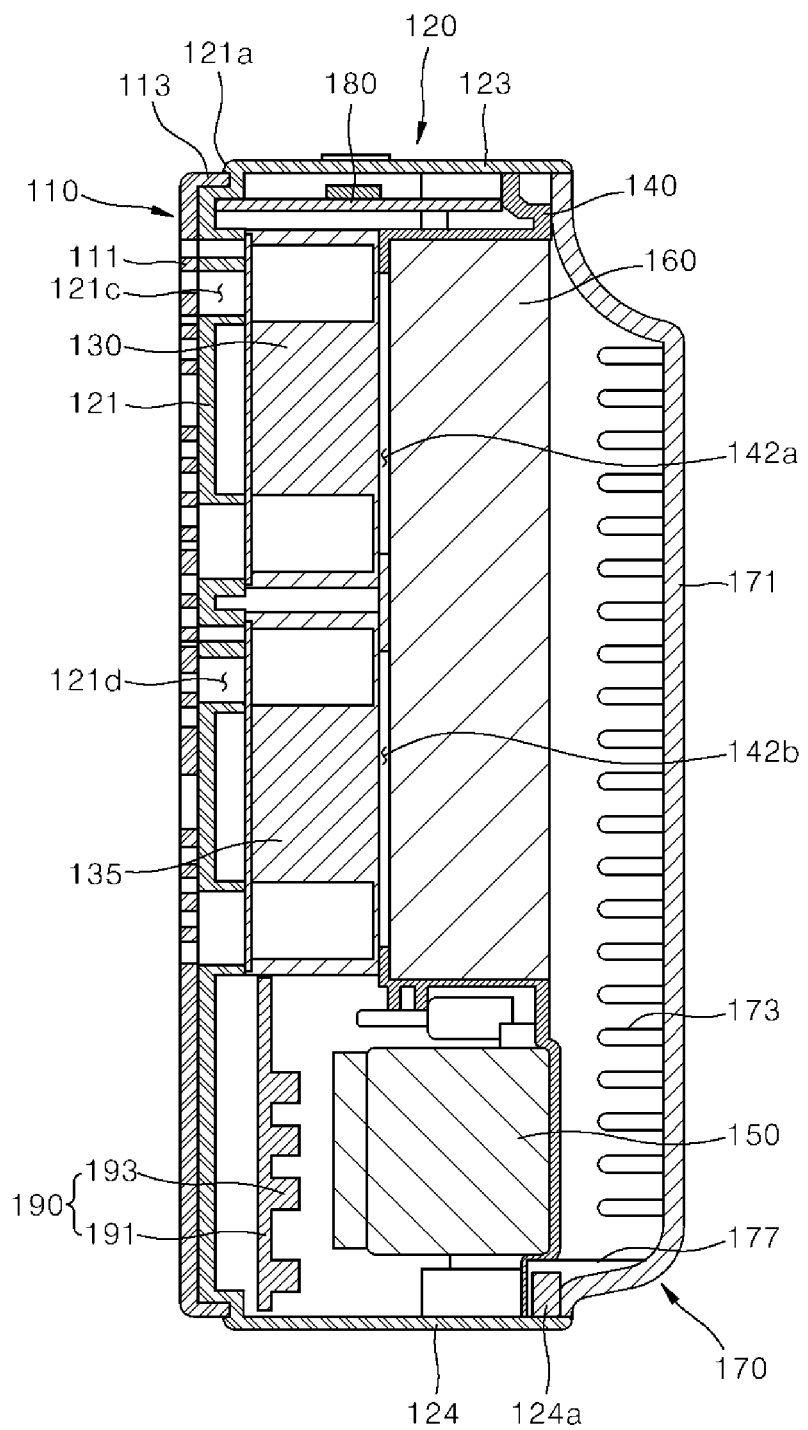
FIG. 4 is a cross-sectional view taken along line "IV-IV" of FIG. 1.

FIG. 1 is a front perspective view illustrating a front side of a portable air purifier according to a first embodiment of the present invention, and FIG. 2 is a rear perspective view illustrating a rear side of the portable air purifier shown in FIG. 1. In addition, FIG. 3 is an exploded perspective view illustrating an exploded state of the portable air purifier shown in FIG. 1, and FIG. 4 is a cross-sectional view taken along line "IV-IV" of FIG. 1.

Referring to FIGS. 1 to 4, a portable air purifier 10 according to the first embodiment of the present invention may be formed to have an approximately hexahedral shape. The portable air purifier 10 includes a case 120 which forms an exterior and accommodates a plurality of components, a front panel 110 which is coupled to a front of the case 120, and a rear panel 170 which is coupled to a rear side of the case 120. The portable air purifier 10 may have an overall hexahedral shape which is vertically long and stood up. Therefore, a user may use the portable air purifier 10 by standing the portable air purifier 10 up or laying the portable air purifier 10 down, and the portable air purifier 10 is prevented from rolling in a place such as a vehicle interior in which shaking occurs.

Directions will be defined. The term "forward" refers to a direction in which the front panel 110 is positioned from the case 120, and the term "rearward" refers a direction opposite to the frontward and a direction in which the rear panel 170 is positioned from the case 120.

[Case]

Figure 5:
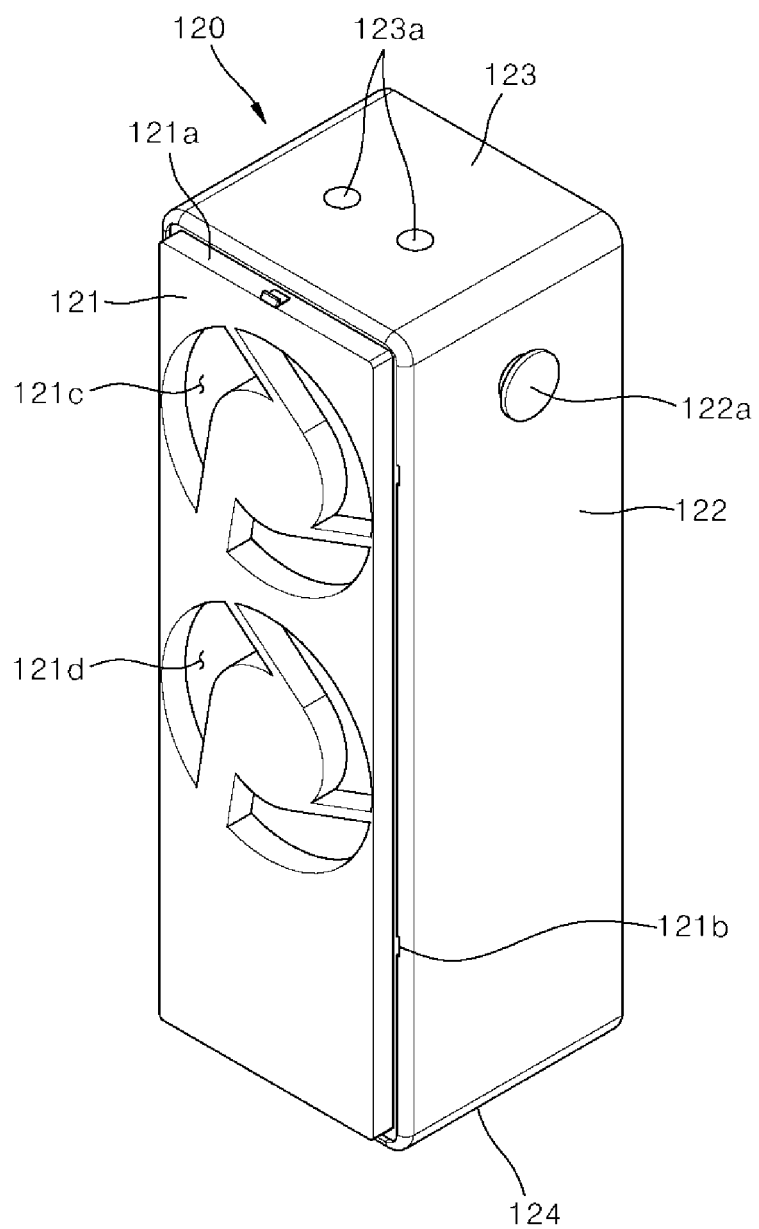
FIG. 5 is a perspective view illustrating a configuration of a case shown in FIG. 3.

FIG. 5 is a perspective view illustrating a configuration of the case shown in FIG. 3.

Referring to FIGS. 1 to 5, the portable air purifier 10 includes the case 120. The case 120 has a hexahedral shape of which a rear surface portion is open and which has an interior space. The case 120 includes a front surface portion and a rear surface portion having an open surface facing the front surface. As an example, the case 120 may be made of a metal material, for example, an aluminum material.

The rear surface portion of the case 120 is open so that outside air is suctioned. As described above, a plurality of components may be installed in the interior space of the case 120 through the open rear surface portion. A filter unit to be described below is mounted in or detached from the case 120 through the open rear surface portion. The rear panel 170 may be coupled to the open rear surface portion, and thus, the open rear surface portion may be covered.

A power button 183 may be provided at one side of the case 120 to turn power of the portable air purifier 10 on or off. In addition, an air flow rate adjustment button 185 disposed adjacent to the power button 183 may be provided at the one side of the case 120 to increase or decrease an air flow rate of the portable air purifier 10.

A latch portion 122a to which a strap 15 (see FIG. 13) having a band shape is restriction-coupled is provided at the other side of the case 120. Due to the strap 15, portability of the portable air purifier 10 may be improved.

[Front Panel]

The portable air purifier 10 includes the front panel 110 disposed at the front of the case 120. As an example, the front panel 110 may be made of a plastic resin material. The front panel 110 is a portion through which air purified by the portable air purifier 10 is externally discharged. To this end, a plurality of discharge ports 111 are provided in the front panel 110. As an example, the plurality of discharge ports 111 may be formed by perforating or cutting at least a portion of the front panel 110. Air purified in the portable air purifier 10 may be evenly discharged forward from the portable air purifier 10 through a plurality of discharge ports 111.

As an example, the front panel 110 may have a plate shape. The front panel 110 is provided with a front panel coupling portion 113 formed by at least a portion of an edge of the front panel 110 extending rearward. The front panel coupling portion 113 is a member coupled to the front surface portion of the case 120. To this end, the front panel coupling portion 113 is fitted into and coupled to a front panel coupling groove 121*a* formed in the front surface portion of the case 120. In this case, the front panel 110 may be configured to cover an entirety of the front surface portion of the case 120.

In addition, the front panel 110 further includes a front panel locking portion 115 (see FIG. 3) caught and restricted by the front surface portion of the case 120. The front panel locking portion 115 is coupled to the case 120 and provided as a component for firmly mounting the front panel 110 together with the front panel coupling portion 113.

The front panel locking portion 115 is formed to protrude from one side of the front panel coupling portion 113. The front panel locking portion 115 is caught and locked by a front panel locking groove 121*b* (see FIG. 5) formed on the front surface portion of the case 120. As an example, the front panel locking portion 115 may be formed to have a hook shape and coupled to the front panel locking groove 121*b* in a hook manner. A plurality of front panel locking portions 115 may be disposed in the front panel coupling portion 113 so as to be spaced apart from each other.

[Rear Panel]

The portable air purifier 10 may further include the rear panel 170 disposed behind the case 120. As an example, the rear panel 170 may be made of a plastic resin material. The rear panel 170 is a portion through which outside air is suctioned into the portable air purifier 10. To this end, a plurality of inlet ports 173 are formed in the rear panel 170. As an example, the plurality of inlet ports 173 may be formed by perforating or cutting at least a portion of the rear panel 170. Outside air may be easily suctioned into the portable air purifier 10 through the plurality of inlet ports 173.

The rear panel 170 is coupled to the case 120 to cover the open rear surface portion of the case 120. The rear panel 170 is provided with a recessed surface 171 formed by recessing at least a portion of the rear panel 170 from front to rear. The plurality of inlet ports 173 may be formed in the recessed surface 171. As an example, the plurality of inlet ports 173 may be symmetrically formed at both sides of the recessed surface 171. As described above, the inlet port 173 may be formed, and thus, outside air may be easily suctioned through the inlet port 173.

The rear panel 170 will be described in detail below.

[Configuration of Portable Air Purifier]

Figure 6:
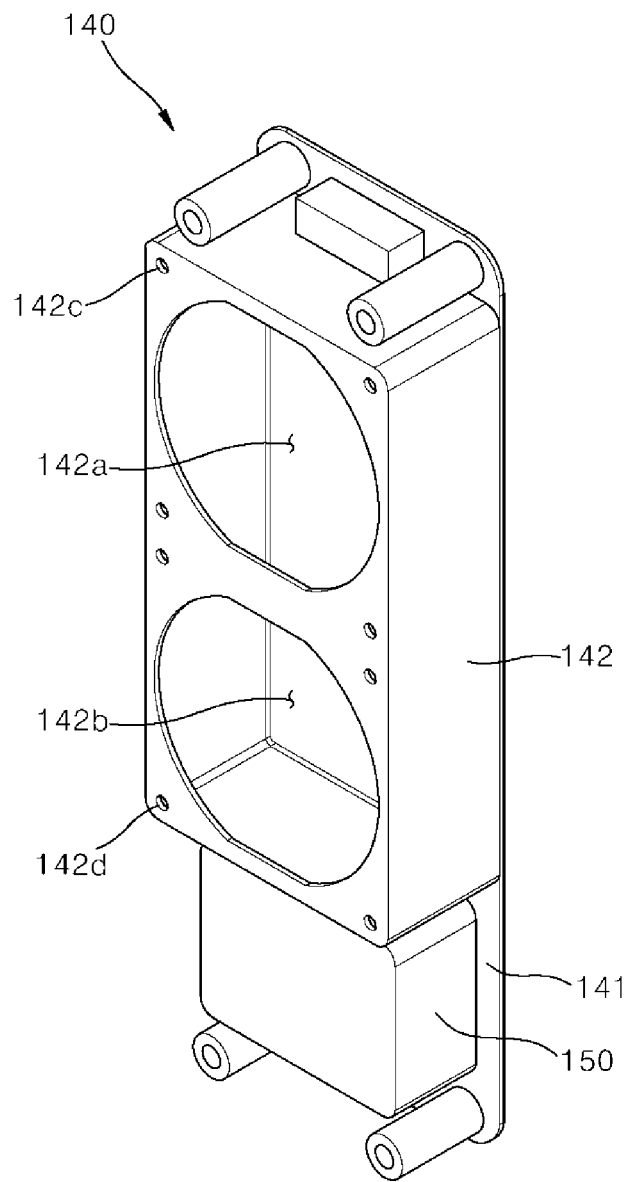
FIG. 6 is a perspective view illustrating a configuration of a filter mounting unit of FIG. 3.

FIG. 6 is a perspective view illustrating a configuration of a filter mounting unit of FIG. 3.

Referring to FIGS. 3 to 6, the portable air purifier 10 includes the front panel 110, the case 120, an upper fan assembly 130, a lower fan assembly 135, a filter mounting unit 140, a battery 150, a filter unit 160, and the rear panel 170. The portable air purifier 10 may further include a sub printed circuit board (PCB) 180 and a main PCB 190 which are for controlling the upper fan assembly 130, the lower fan assembly 135, or the filter unit 160.

Here, all of the upper fan assembly 130, the lower fan assembly 135, the filter mounting unit 140, the battery 150, the filter unit 160, the sub PCB 180, and the main PCB 190 are accommodated in the case 120. The rear panel 170 may cover the open rear surface portion of the case 120, and thus, components disposed in the case 120 may be protected.

[Detailed Configuration of Case]

As described above, the case 120 may have the interior space and the hexahedral shape of which the rear surface portion is open. The fan assemblies 130 and 135, the filter mounting unit 140, and the filter unit 160 are sequentially disposed in the interior space of the case 120. In this case, the fan assemblies 130 and 135, the filter mounting unit 140, and the filter unit 160 are disposed to overlap each other in an axial direction of blower fans of the fan assemblies 130 and 135. That is, the components constituting the portable air purifier 10 are installed to be parallel in a lateral direction.

The case 120 includes a front surface portion 121, a side surface portion 122, an upper surface portion 123, and a lower surface portion 124.

The front panel 110 is coupled to the front surface portion 121. To this end, the front surface portion 121 includes the front panel coupling groove 121*a* into which the front panel 110 is inserted. As an example, the front panel coupling groove 121*a* may be formed to have a shape recessed inward from an edge of the front surface portion 121 of the case. The front panel coupling groove 121*a* is formed such that the front panel coupling portion 113 of the front panel 110 is fitted thereinto by being pressed thereagainst.

The front surface portion 121 of the case may further include the front panel locking groove 121*b* coupled to the front panel locking portion 115 of the front panel 110. As an example, the front panel locking groove 121*b* may be formed to have a shape in which a portion of the front panel coupling groove 121*a* is further recessed. The front panel locking portion 115 may be caught and restricted by the front panel locking groove 121*b*. A plurality of front panel locking grooves 121*b* may be formed and disposed at points corresponding to the front panel locking portions 115.

In addition, the front surface portion 121 of the case may be further provided with an upper air discharge portion 121*c* through which air passing through the upper fan assembly 130 is discharged. The upper air discharge portion 121*c* is formed by perforating or cutting a portion of the front surface portion 121 of the case. A plurality of upper air discharge portions 121*c* may be formed in the front surface portion 121 of the case so as to be spaced apart from each other. As an example, the plurality of upper air discharge portions 121*c* may be radially disposed and formed in a fan shape. However, the present invention is not limited thereto, and the plurality of upper air discharge portions 121*c* may be formed in various shapes such as a lattice shape.

In addition, the front surface portion 121 of the case may be further provided with a lower air discharge portion 121*d* through which air passing through the lower fan assembly 135 is discharged. The lower air discharge portion 121*d* is formed by perforating or cutting a portion of the front surface portion 121 of the case. A plurality of lower air discharge portions 121*d* may be formed in the front surface portion 121 of the case so as to be spaced apart from each other. As an example, like the upper air discharge portions 121*c*, the plurality of lower air discharge portions 121*d* may be radially disposed and formed in a fan shape.

That is, the lower air discharge portions 121*d* may be formed in the same shape as the upper air discharge portions 121*c*. The lower air discharge portion 121*d* is formed below the upper air discharge portion 121*c* so as to be spaced apart therefrom. Due to such a configuration, air passing through the upper fan assembly 130 may be discharged through the upper air discharge portion 121*c*, and air passing through the lower fan assembly 135 may be discharged through the lower air discharge portion 121*d*.

In the present embodiment, although it has been described that the fan assembly of the portable air purifier is provided as two fan assemblies, but the present invention is not limited thereto, and the fan assembly may be implemented as one fan assembly. In this case, any one of the upper fan assembly and the lower fan assembly may be provided. As another example, three or more fan assemblies may be provided.

In addition, the case 120 may further include the latch portion 122*a* to which the strap 15 having a band shape is coupled. The latch portion 122*a* is coupled to the strap 15 which is separately provided such that a user may easily carry the portable air purifier 10 or hang the portable air purifier 10 on an object. Due to such a configuration, portable convenience of the portable air purifier 10 may be improved. The latch portion 122*a* may be disposed on the side surface portion 122 of the case. However, the present invention is not limited thereto, and the latch portion 122*a* may also be provided on the front surface portion 121 of the case or the upper surface portion 123 of the case.

In addition, the case 120 of the case may further include button through-holes 123*a* for externally exposing the power button 183 and the air flow rate adjustment button 185. The button through-hole 123*a* may be understood as holes for externally exposing the power button 183 and the air flow rate adjustment button 185, which are positioned in the case 120, from the case 120. Two button through-holes 123*a* may be formed to externally expose the power button 183 and the air flow rate adjustment button 185. As an example, the button through-holes 123*a* may be formed in the upper surface portion 123 of the case, but the present invention is not limited thereto.

In addition, the case 120 may further include a rear panel locking groove (not shown) coupled to the rear panel 170. The rear panel locking groove is formed in an inner surface of the case 120. As an example, the rear panel locking groove may be formed by recessing or cutting a portion of the inner surface of the upper surface portion 123 of the case. A rear panel locking portion 175 to be described below may be caught and restricted by the rear panel locking groove. A plurality of rear panel locking grooves may be formed and may each be formed at a point corresponding to the rear panel locking portion 175.

In addition, the case 120 may be further provided with a magnet 124*a* to which the rear panel 170 is coupled. The magnet 124*a* may include a permanent magnet. As an example, the magnet 124*a* may be formed of a single magnet having one pole. The magnet 124*a* may react with a magnet coupling portion 177 to be described below and may be coupled to the magnet coupling portion 177 through magnet coupling (attraction force).

[Upper Fan Assembly and Lower Fan Assembly]

The portable air purifier 10 includes the upper fan assembly 130 and the lower fan assembly 135 which suction air from behind the portable air purifier 10 and discharge the air toward a front of the portable air purifier 10. In this case, the upper fan assembly 130 and the lower fan assembly 135 are disposed to be spaced apart from each other vertically. That is, the upper fan assembly 130 and the lower fan assembly 135 may be disposed to vertically overlap each other.

The upper fan assembly 130 and the lower fan assembly 135 may be disposed to face the upper air discharge portion 121*c* and the lower air discharge portion 121*d* which are formed in the front surface portion 121 of the case. Therefore, air suctioned through the rear panel 170 may pass through each of the upper fan assembly 130 and the lower fan assembly 135 and may be discharged through the front panel 110.

In the present embodiment, the upper fan assembly 130 and the lower fan assembly 135 are illustrated as having the same size and shape. However, the present invention is not limited thereto, and the upper fan assembly 130 and the lower fan assembly 135 may have different sizes and shapes.

The upper fan assembly 130 and the lower fan assembly 135 include an upper fan 131 and a lower fan 136 which generate an air flow, an upper fan motor (not shown) and a lower fan motor (not shown) which provide rotational forces to the upper fan 131 and the lower fan 136, and an upper fan bracket 133 and a lower fan bracket 138 which are coupled to the upper fan 131 and the lower fan 136.

The upper and lower fans 131 and 136 may include axial-flow fans. Therefore, air suctioned into the case 120 through the rear panel 170 may be suctioned in axial directions of the upper fan 131 and the lower fan 136 and discharged in the axial directions of the upper fan 131 and the lower fan 136.

Motor shafts may be coupled to the upper fan motor and the lower fan motor, and the motor shafts may be coupled to the upper fan 131 and the lower fan 136. As an example, the upper fan motor and the lower fan motor may include brushless direct current (BLDC) motors of which a frequency may be adjusted.

The upper fan bracket 133 and the lower fan bracket 138 may be coupled to the upper fan 131 and the lower fan 136 to guide a flow of air passing through the upper fan 131 and the lower fan 136. To this end, the upper fan bracket 133 and the lower fan bracket 138 include an upper bracket opening 133*a* and a lower bracket opening 138*a* which guide air to suction sides of the upper fan 131 and the lower fan 136.

That is, air suctioned into the case 120 through the rear panel 170 may pass through the upper bracket opening 133*a* and the lower bracket opening 138*a* and be suctioned into the upper fan 131 and the lower fan 136. As an example, the upper bracket opening 133*a* and the lower bracket opening 138*a* may have a circular shape and may be formed such that the upper fan 131 and the lower fan 136 are respectively inserted thereinto.

In addition, the upper fan bracket 133 and the lower fan bracket 138 further include bracket coupling portions 133*b* and 138*b* coupled to the case 120. The bracket coupling portions 133*b* and 138*b* may be coupled to the front surface portion 121 of the case using coupling members. In this case, the bracket coupling portions 133*b* and 138*b* may be in contact with coupling bosses (not shown) provided inside the front surface portion 121 of the case. Therefore, certain coupling members may pass through the bracket coupling portions 133b and 138b and be coupled to the coupling bosses.

[Filter Mounting Unit and Battery]

The portable air purifier 10 further includes the filter mounting unit 140, in which the filter unit 160 is mounted, and the battery 150. The filter mounting unit 140 is disposed behind the upper fan assembly 130 and the lower fan assembly 135.

The filter mounting unit 140 may include a base portion 141, in which the battery 150 is installed, and a recessed portion 142 in which a portion of the base portion 141 is recessed to form a space in which the filter unit 160 is mounted. The recessed portion 142 may be in contact with rear surfaces of the upper fan assembly 130 and the lower fan assembly 135.

The base portion 141 may have a standing plate shape. As an example, the base portion 141 may have a rectangular plate shape which is vertically long. The battery 150 may be installed at a lower place of the base portion 141. The battery 150 is preferably positioned at the lower place in the base portion 141 in consideration of a center of gravity of the portable air purifier 10. As an example, the battery 150 may be disposed below the filter unit 160.

The battery 150 may supply power for driving the portable air purifier 10. To this end, the battery 150 may be electrically connected to at least one of the upper fan assembly 130, the lower fan assembly 135, the sub PCB 180, the main PCB 190, and the filter unit 160.

The recessed portion 142 provides a mounting space which is formed by recessing a portion of the base portion 141 in a forward direction and in which the filter unit 160 is mounted. The recessed portion 142 may be formed to have a shape in which the remaining region of the base portion 141 is recessed forward, excluding a region of the base portion 141 in which the battery 150 is installed.

The recessed portion 142 may protrude forward by a length corresponding to a thickness of the filter unit 160. Accordingly, the filter unit 160 may be stably supported inside the recessed portion 142. In this case, a mounting groove or a mounting protrusion, which allows the filter unit 160 to be firmly mounted, may be provided in or on an inner surface of the recessed portion 142. Due to such a configuration, the filter unit 160 may be mounted inside the filter mounting unit 140 through an open rear surface of the filter mounting unit 140.

In addition, the recessed portion 142 may further include guide holes 142a and 142b for guiding air passing through the filter unit 160 toward axial suction sides of the blower fans 131 and 136.

The guide holes 142a and 142b include an upper guide hole 142a and a lower guide hole 142b. The upper guide hole 142a and the lower guide hole 142b are formed in a front surface of the recessed portion 142.

In the present embodiment, the front surface portion of the recessed portion 142 is illustrated as being formed to have a rectangular shape. The upper guide hole 142a may be formed in an upper portion of the front surface portion of the recessed portion 142, and the lower guide hole 142b may be formed in a lower portion thereof. That is, the upper guide hole 142a and the lower guide hole 142b are formed to be spaced apart from each other vertically. In this case, the upper guide hole 142a and the lower guide hole 142b may be formed to face the upper bracket opening 133a and the lower bracket opening 138a, respectively.

As an example, the upper guide hole 142a and the lower guide hole 142b may be formed to have an approximately circular shape. The upper guide hole 142a and the lower guide hole 142b may be concentric with the upper bracket opening 133a and the lower bracket opening 138a, respectively. Therefore, air suctioned through the rear panel 170 may be purified while passing through the filter unit 160, and the purified air may pass through the upper guide hole 142a and the lower guide hole 142b to flow to the upper fan assembly 130 and the lower fan assembly 135.

In addition, mount coupling portions 142c and 142d for concurrently coupling the upper fan assembly 130, the lower fan assembly 135, and the filter mounting unit 140 to the case 120 may be provided in the front surface of the recessed portion 142.

The mount coupling portions 142c and 142d include an upper mount coupling portion 142c and a lower mount coupling portion 142d disposed below the upper mount coupling portion 142c. In this case, a plurality of upper mount coupling portions 142c and a plurality of lower mount coupling portions 142d may be formed by perforating or cutting portions of the front surface of the recessed portion 142.

As an example, the upper mount coupling portion 142c is formed adjacent to an upper guide hole 142a, and the lower mount coupling portion 142d is disposed adjacent to a lower guide hole 142b. The upper mount coupling portion 142c and the lower mount coupling portion 142d are formed to face the upper bracket coupling portion 133b and the lower bracket coupling portion 138b, respectively.

Accordingly, the filter mounting unit 140, the upper fan and lower fan assemblies 130 and 135, and the case 120 may be coupled using a single coupling member at once. Due to such a configuration, the upper fan and lower fan assemblies 130 and 135 and the filter mounting unit 140 may be easily assembled in the case 120.

[Filter Unit]

The portable air purifier 10 includes the filter unit 160 for filtering air by filtering any one of physical particles such as dust, fine particles, and ultrafine particles, chemical substances such as odor particles and harmful gases, and microorganisms such as bacteria and viruses.

That is, the filter unit 160 may mean any one of a dust collecting filter for filtering physical particles such as dust, a deodorizing filter for filtering chemical substances such as gases, and a sterilizing filter for filtering microorganisms such as bacteria and viruses.

The portable air purifier 10 of the present embodiment may be equipped with the filter unit 160 including any one of the dust collecting filter, the deodorizing filter, and the sterilizing filter. Therefore, a user may select and use any one of the dust collecting filter, the deodorizing filter and the sterilizing filter according to the user's preference. That is, the purpose or performance of the portable air purifier 10 may vary according to a type of the selected filter.

As an example, the dust collecting filter may include a high efficiency particulate air (HEPA) filter. In addition, the deodorizing filter may include a carbon filter. The sterilizing filter may include an ionizer. However, the present invention is not limited thereto, and the dust collecting filter, the deodorizing filter, and the sterilizing filter may include various types of filters.

The filter unit 160 may be mounted in or detached from the filter mounting unit 140.

Specifically, the filter unit 160 may be mounted in the recessed portion 142 of the filter mounting unit 140. In this case, the filter unit 160 may be provided with a protrusion or a groove coupled to a seating groove or a seating protrusion provided inside the recessed portion 142. Therefore, the filter unit 160 may be stably supported without being detached or shaken from the filter mounting unit 140. As an example, the filter unit 160 may have a hexahedral shape, but the present invention is not limited thereto.

[Sub PCB and Main PCB]

The portable air purifier 10 further includes the sub PCB 180 including the power button 183 and the air flow rate adjustment button 185.

The sub PCB 180 includes a sub-substrate 181 and the power button 183 and the air flow rate adjustment button 185 which are installed on the sub-substrate 181. The power button 183 performs a function of turning power of the portable air purifier 10 on or off. In addition, the air flow rate adjustment button 185 performs a function of increasing or decreasing an air flow rate of the portable air purifier 10. The sub PCB 180 is electrically connected to the main PCB 190 to be described below.

The sub PCB 180 may be disposed at an uppermost side in the case 120. That is, the sub PCB 180 is disposed above the upper fan assembly 130 and the filter unit 160. In this case, the power button 183 and the air flow rate adjustment button 185 are externally exposed from the case 120 through the button through-holes 123*a* formed in the upper surface portion 123 of the case. Therefore, a user may operate the exposed buttons to turn the portable air purifier 10 on or off or adjust an air flow rate of the portable air purifier 10.

In addition, the portable air purifier 10 further includes the main PCB 190 for managing all hardware modules of the portable air purifier 10. That is, the main PCB 190 may serve as a control unit of the portable air purifier 10.

The main PCB 190 may be disposed below the lower fan assembly 135 in the case 120. As an example, the main PCB 190 may be disposed in a standing form and may be supported by a substrate support portion provided inside the case 120.

The main PCB 190 includes a main substrate 191 and a plurality of elements 193 installed on the main substrate 191. The main substrate 191 may be electrically connected to the upper fan assembly 130, the lower fan assembly 135, the battery 150, and the sub PCB 180. The main PCB 190 may control the upper fan assembly 130 and the lower fan assembly 135 based on a command input through the power button 183 and the air flow rate adjustment button 185.

In addition, the main PCB 190 may be electrically connected to the filter unit 160. As an example, when the filter unit 160 includes an ionizer, the main PCB 190 may be electrically connected to the ionizer and perform a control to supply power to the ionizer. As another example, the filter unit 160 may be electrically connected to the battery 150, and thus, the filter unit 160 may receive power directly from the battery 150.

[Detailed Configuration of Rear Panel]

As described above, the rear panel 170 is a portion which is disposed behind the case 120 and through which outside air is suctioned into the portable air purifier 10. The rear panel 170 is coupled to the rear side of the case 120 to cover the open rear surface portion of the case 120.

The rear panel 170 further includes the rear panel locking portion 175 caught and restricted by the rear surface of the case 120. The rear panel locking portion 175 provided as a component coupled to a rear end portion of the case 120 to firmly mount the rear panel 170.

The rear panel locking portion 175 may be formed to protrude from an upper end portion of the rear panel 170. The rear panel locking portion 175 is caught and restricted by the rear panel locking groove (not shown) formed in an inner side the upper surface portion 123 of the case 120. As an example, the rear panel locking portion 175 may be formed to have a hook shape and coupled to the rear panel locking groove in a hook manner. A plurality of rear panel locking portions 175 may be disposed in the rear panel 170 so as to be spaced apart from each other.

Here, the rear panel locking portion 175 may be referred to as a "first fixing portion."

In addition, the rear panel 170 further includes the magnet coupling portion 177 pressed against the rear surface of the case 120. The magnet coupling portion 177 is provided as a component coupled to the magnet 124*a* provided inside the case 120 to prevent the rear panel 170 from being detached from the case 120.

The magnet coupling portion 177 may be provided at a lower end portion of the rear panel 170. That is, the magnet coupling portion 177 may be mounted at a position corresponding to the magnet 124*a*.

The magnet coupling portion 177 includes a magnetic body coupled to the magnet 124*a*. That is, the magnet coupling portion 177 may include a metal body or a magnet. Therefore, when the rear panel 170 is coupled to the rear surface of the case 120, the magnet coupling portion 177 may react with the magnet 124*a* to be fixed to the magnet 124*a* by mutual attraction. As a result, the rear panel 170 may be fixed without being shaken.

Here, the magnet coupling portion 177 may be referred to as a "second fixing portion."

[Portable Air Purifier Including Filter Unit that is Easily Mounted and Detached]

In the portable air purifier 10 according to the present embodiment, the filter unit 160 may be easily mounted in and detached from the case 120. As an example, in order to sweep dust accumulated in a dust collecting filter included in the filter unit 160, the filter unit 160 may be detached from the case 120. As another example, when the currently mounted filter unit 160 is the dust collecting filter, the filter unit 160 may be detached in order to replace the dust collecting filter with another filter, that is, a deodorizing filter or a sterilizing filter.

FIGS. 7 to 10 are views illustrating a method of replacing the filter unit in the portable air purifier according to an embodiment of the present invention.

Figure 7:
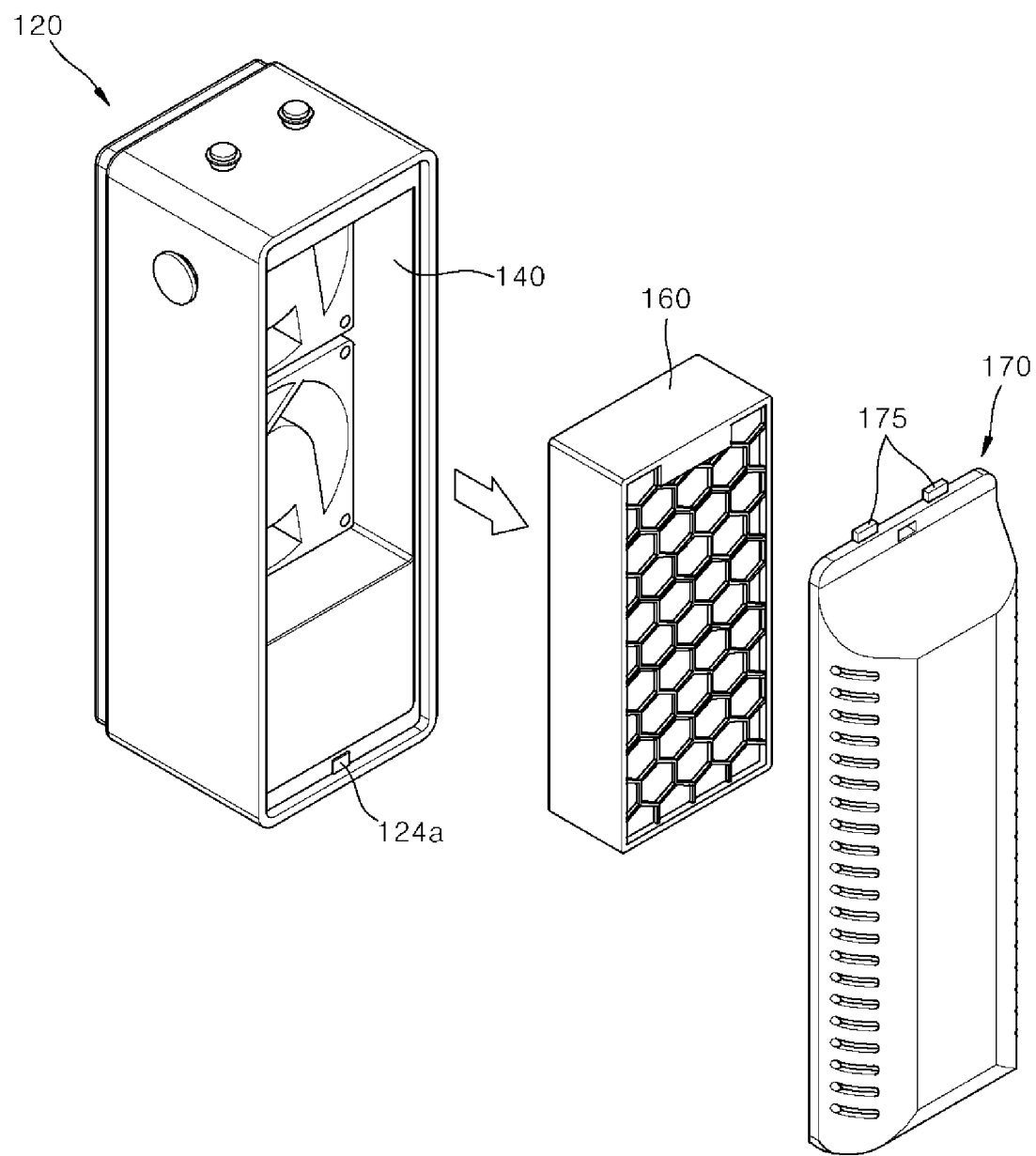
FIGS. 7 to 10 are views illustrating a method of replacing a filter unit in the portable air purifier according to the first embodiment of the present invention
Figure 8:
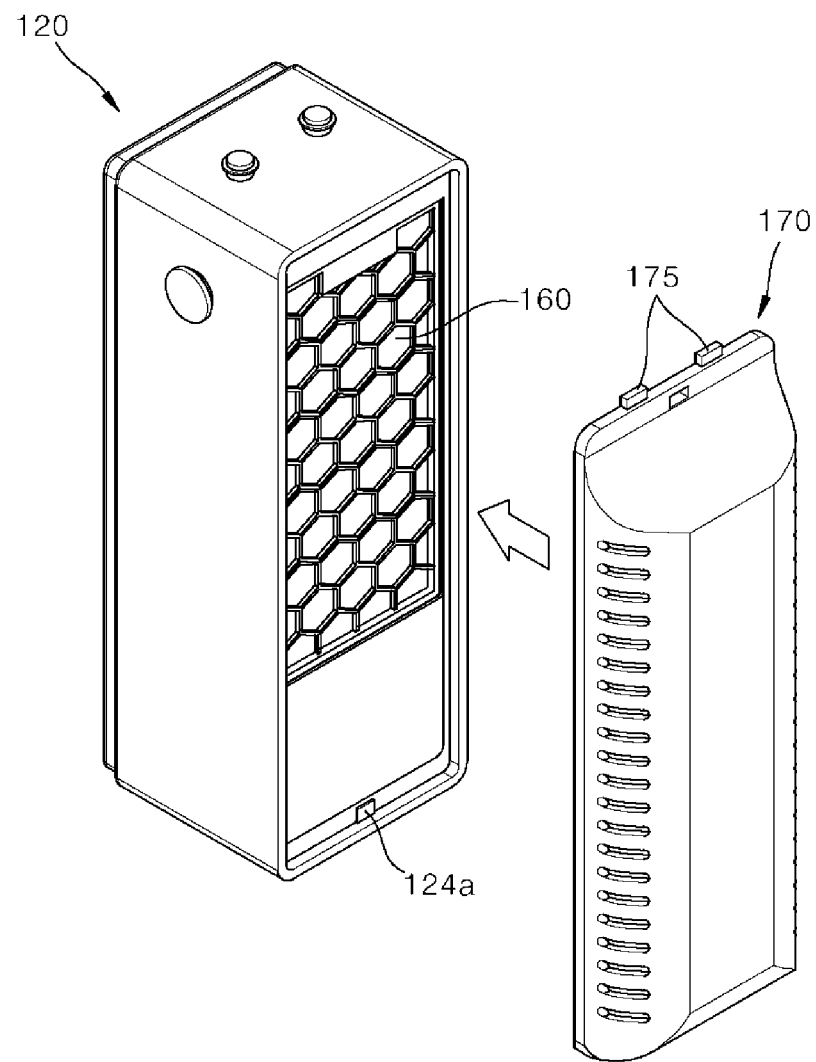

In order to replace the filter unit 160, as shown in FIGS. 7 and 8, first, the rear panel 170 coupled to the rear side of the case 120 is separated therefrom. The filter unit 160 mounted in an interior of the case 120, that is, in the filter mounting unit 140, is unloaded to the outside. For example, when the filter unit 160 is a dust collecting filter, after the filter unit 160 is cleaned, the filter unit 160 may be remounted in the filter mounting unit 140. Alternatively, after the filter unit 160 is separated, the filter unit 160 including another filter, that is, a deodorizing filter or a sterilizing filter, may be mounted in the filter mounting unit 140.

Figure 9:
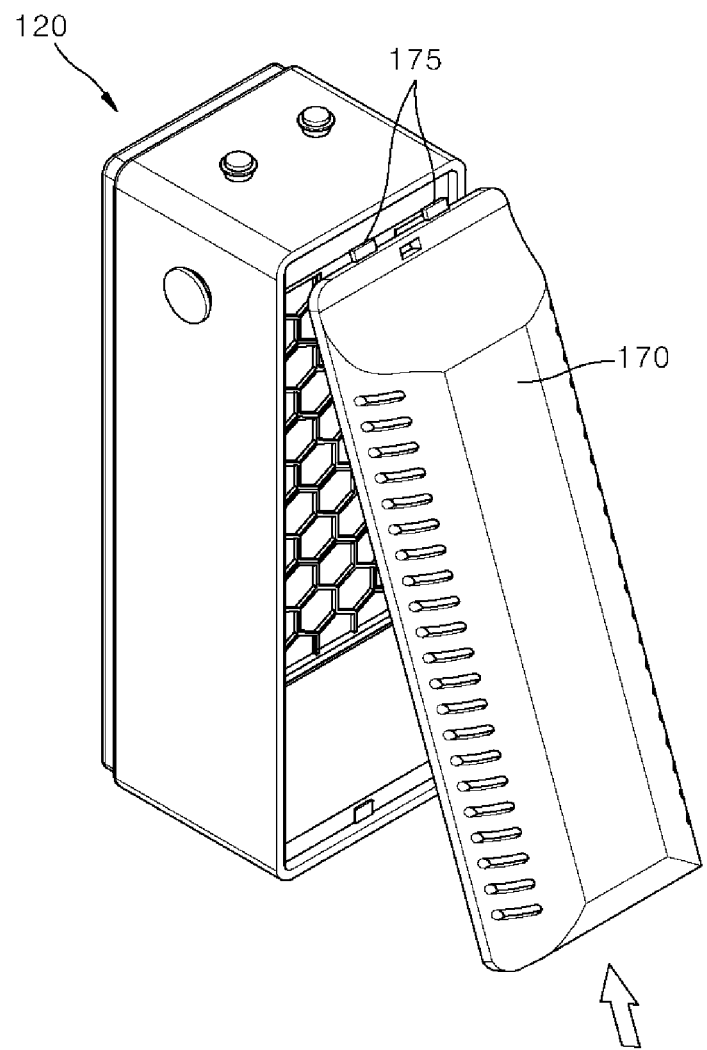

When the filter unit 160 is mounted in the filter mounting unit 140, the rear panel 170 is re-coupled to the rear side of the case 120. In this case, an upper portion of the rear panel 170 is first coupled to the case 120. In order to couple the rear panel 170 to the case 120, as shown in FIG. 9, the rear panel locking portion 175 provided at the upper end portion of the rear panel 170 is fitted into and coupled to the rear panel locking groove formed in an inner side of the case 120. Accordingly, the upper portion of the rear panel 170 is fixed to the case 120.

Figure 10:
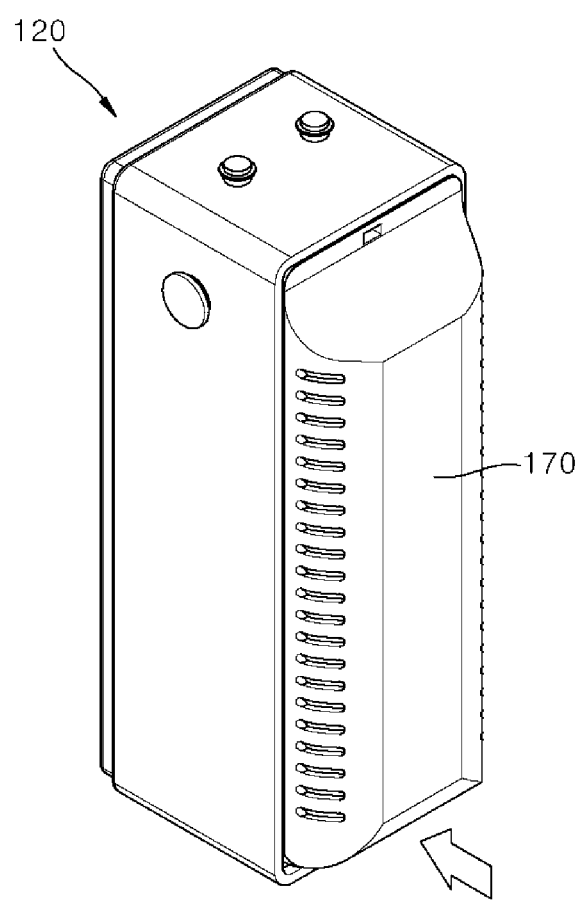

When the upper portion of the rear panel 170 is fixed to the case 120, as shown in FIGS. 9 and 10, a lower portion of the rear panel 170 is moved to the case 120. Then, the magnet coupling portion 177 provided at a lower portion of the rear panel 170 approaches to be close to the magnet 124a provided inside the case 120.

When the magnet coupling portion 177 approaches to be close to the magnet 124a, the magnet coupling portion 177 reacts with the magnet 124a and is coupled to the magnet 124a by mutual attraction. Due to such a configuration, the lower portion of the rear panel 170 may be easily coupled to the case 120, and the lower portion of the rear panel 170 may be firmly fixed.

As described above, since the filter unit 160 may be easily mounted in and detached from the case 120, the portable air purifier 10 has an advantage in that a filter of the portable air purifier 10 may be easily managed and maintained. In addition, since a dust collecting filter as well as a deodorizing filter or a sterilizing filter may be applied to the filter unit 160, there is an advantage in that a user may select and use a desired filter according to the user's preference.

[Air Flow of Portable Air Purifier]

Figure 11:
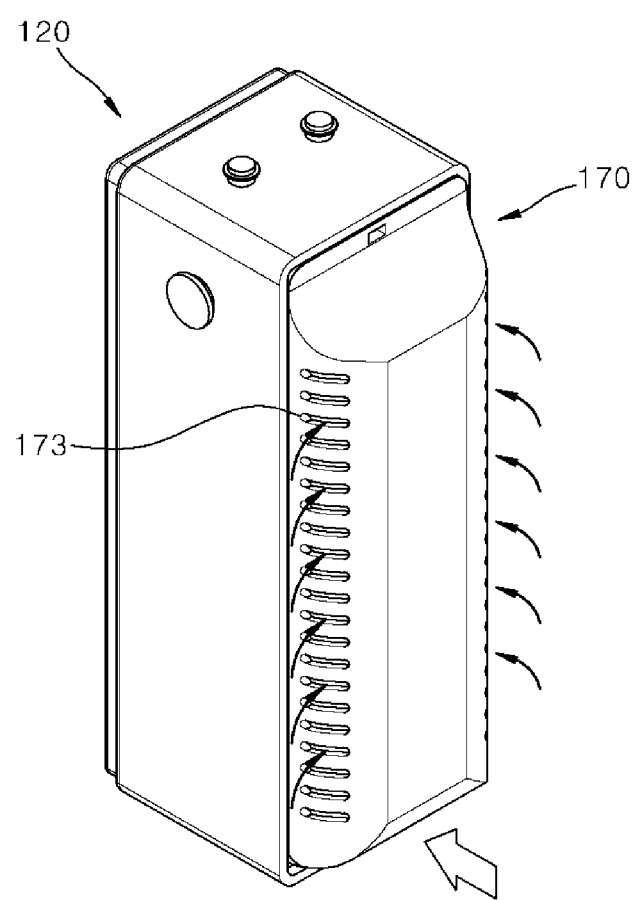
FIG. 11 is a perspective view illustrating an aspect of an air flow of the portable air purifier according to the first embodiment of the present invention.
Figure 12:
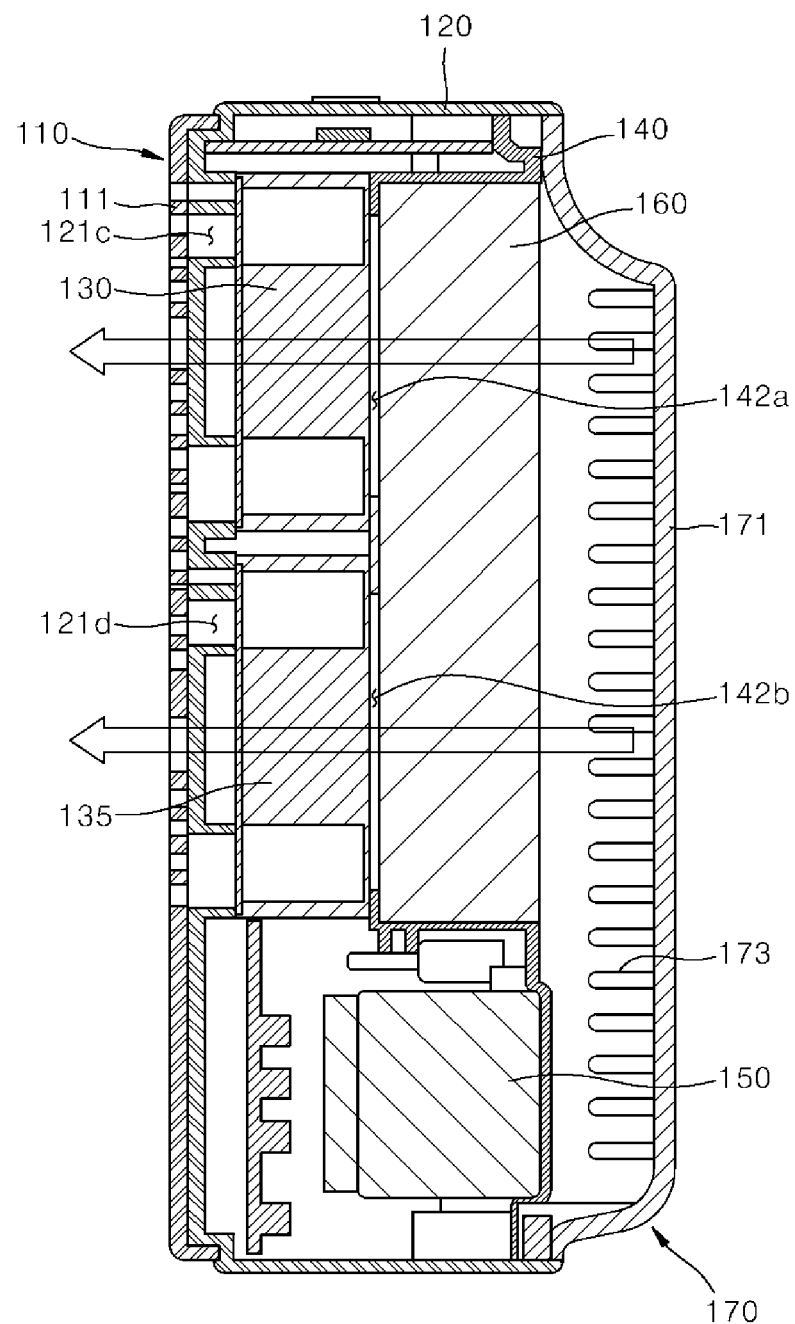
FIG. 12 is a cross-sectional view illustrating an aspect of an air flow of the portable air purifier according to the first embodiment of the present invention.

FIG. 11 is a perspective view illustrating an aspect of an air flow of the portable air purifier according to an embodiment of the present invention, and FIG. 12 is a cross-sectional view illustrating an aspect of an air flow of the portable air purifier according to an embodiment of the present invention.

Referring to FIGS. 11 and 12, when the portable air purifier 10 according to the embodiment of the present invention is operated, an air flow is generated in a direction from the rear to the front of the portable air purifier 10. That is, an air flow path of the portable air purifier 10 is straight.

Specifically, an air flow in the portable air purifier 10 is generated by the upper fan assembly 130 and the lower fan assembly 135 being driven. That is, when the upper fan 131 and the lower fan 136 are driven, outdoor air is suctioned into the case 120 through the inlet port 173 formed in the rear panel 170.

That is, the outdoor air suctioned into the case 120 through the inlet port 173 passes through the filter unit 160 positioned adjacent to the rear panel 170, and in such a process, physical particles such as dust, chemical substances such as gases, bacteria, and viruses are filtered from the air.

As described above, air purified by passing through the filter unit 160 is guided by the guide holes 142a and 142b of the filter mounting unit 140 and flows to the upper fan assembly 130 and the lower fan assembly 135 which are disposed in front of the filter unit 160. In the present embodiment, since two fan assemblies 130 and 135 for generating an air flow are provided, there is an advantage in that a suction air flow rate and a discharge air flow rate of the portable air purifier 10 are significantly increased. In addition, since the two fan assemblies 130 and 135 are disposed to vertically overlap each other, it is possible to implement the portable air purifier 10 which is compact in size while an air flow rate is increased.

After air passing through the upper fan assembly 130 and the lower fan assembly 135 passes through the upper air discharge portion 121c and the lower air discharge portion 121d of the front surface portion 121 of the case, the air is externally discharged through the discharge port 111 formed in the front panel 110. Due to such a configuration, an air flow inside the portable air purifier 10 may be straight so that purified air may be quickly supplied toward a user facing the portable air purifier 10.

[Example of Use of Portable Air Purifier]

The portable air purifier 10 may be used in a studio, an office, a vehicle interior, and a partitioned indoor space. In particular, since the portable air purifier 10 may have a relatively low purifying capacity as compared with a large air purifier, the portable air purifier 10 may be used in an indoor space having an area that is less than a certain area.

Hereinafter, an example will be described in which the portable air purifier 10 is used in a vehicle.

Figure 13:
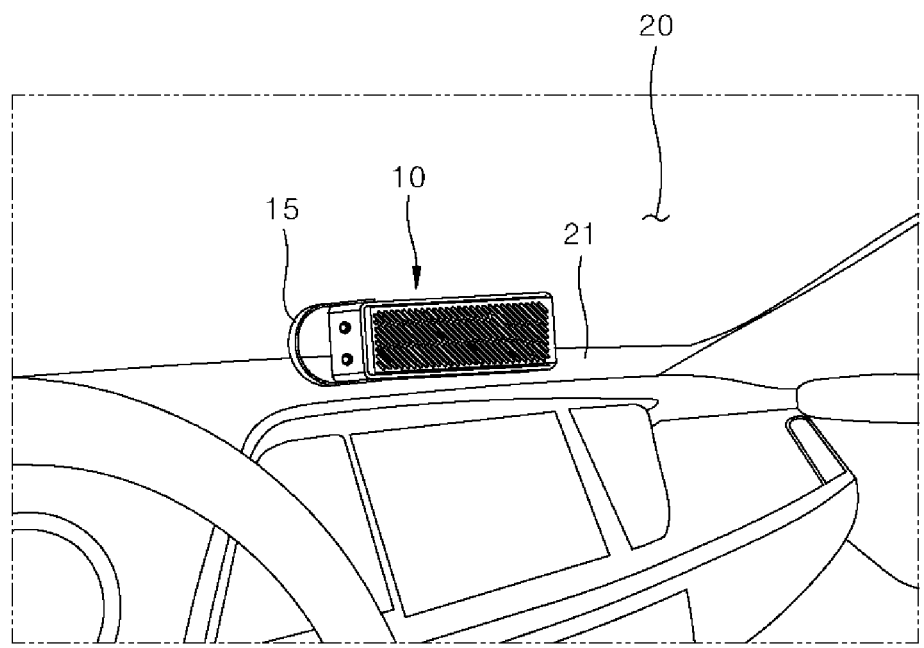
FIG. 13 is a view illustrating an application state of the portable air purifier according to the embodiment of the present invention.

FIG. 13 is a view illustrating an application state of the portable air purifier according to the embodiment of the present invention.

Referring to FIG. 13, the portable air purifier 10 may be positioned in a vehicle interior 20. The portable air purifier 10 may be disposed on a structure in the vehicle interior 20. Since the portable air purifier 10 is formed to have an approximately hexahedral shape, the portable air purifier 10 may be disposed in a form which is stood up or laid down on a relatively flat surface. That is, since there is no restriction on the posture or installation position of the portable air purifier 10, the portable air purifier 10 may be disposed and used in various postures.

In addition, the portable air purifier 10 may be disposed on, for example, a dashboard 21 in the vehicle interior 20. Furthermore, the portable air purifier 10 may be disposed in a state of being laid down such that the discharge port, through which air is discharged, is directed toward a user who sits in a driver's seat. Then, air purified through the portable air purifier 10 may be supplied toward the user who sits in the driver's seat through the discharge port.

The strap 15 having a band shape may be provided at one side of the portable air purifier 10. Accordingly, the user may also use the portable air purifier 10 by hanging the strap 15 on any structure in the vehicle interior 20.

As described above, the portable air purifier 10 may be disposed in various spaces and in various postures and thus stably supply purified air to the user.

<Portable Air Purifier According to Second Embodiment of the Present Invention>

[Exterior of Portable Air Purifier]

Figure 14:
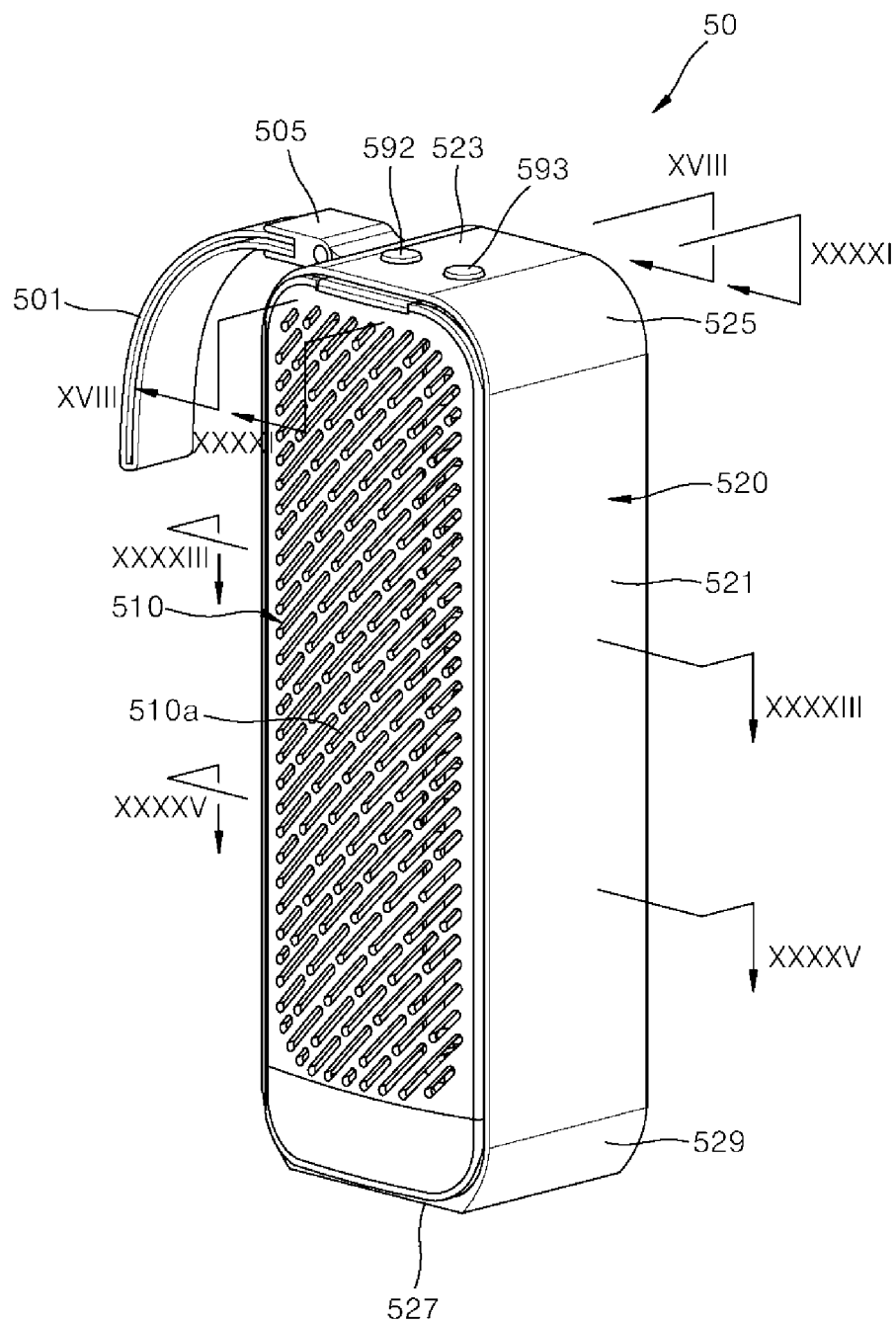
FIG. 14 is a front perspective view illustrating a front side of a portable air purifier according to a second embodiment of the present invention
Figure 15:
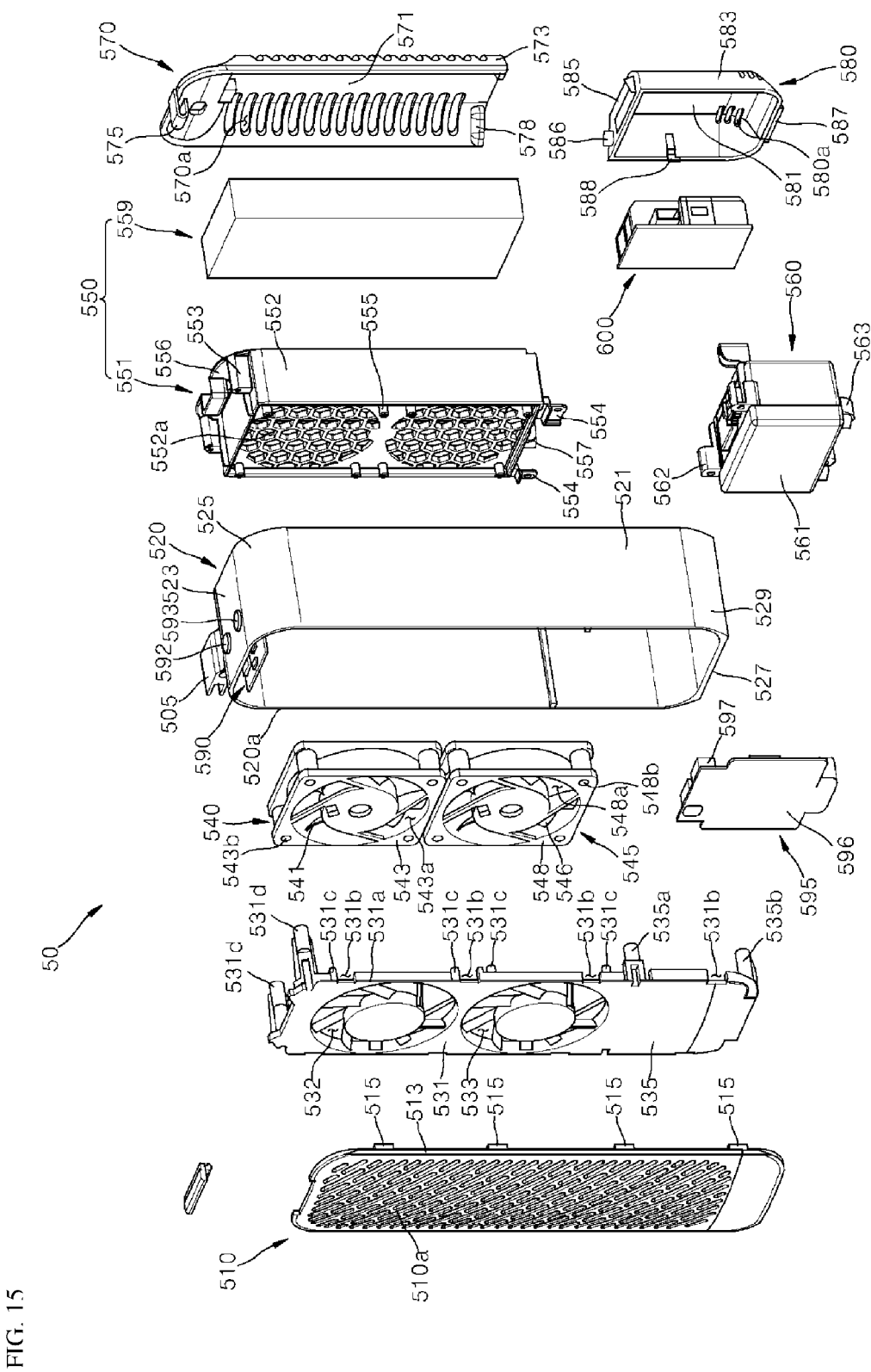
FIG. 15 is an exploded perspective view illustrating an exploded state of the portable air purifier shown in FIG. 14.
Figure 16:
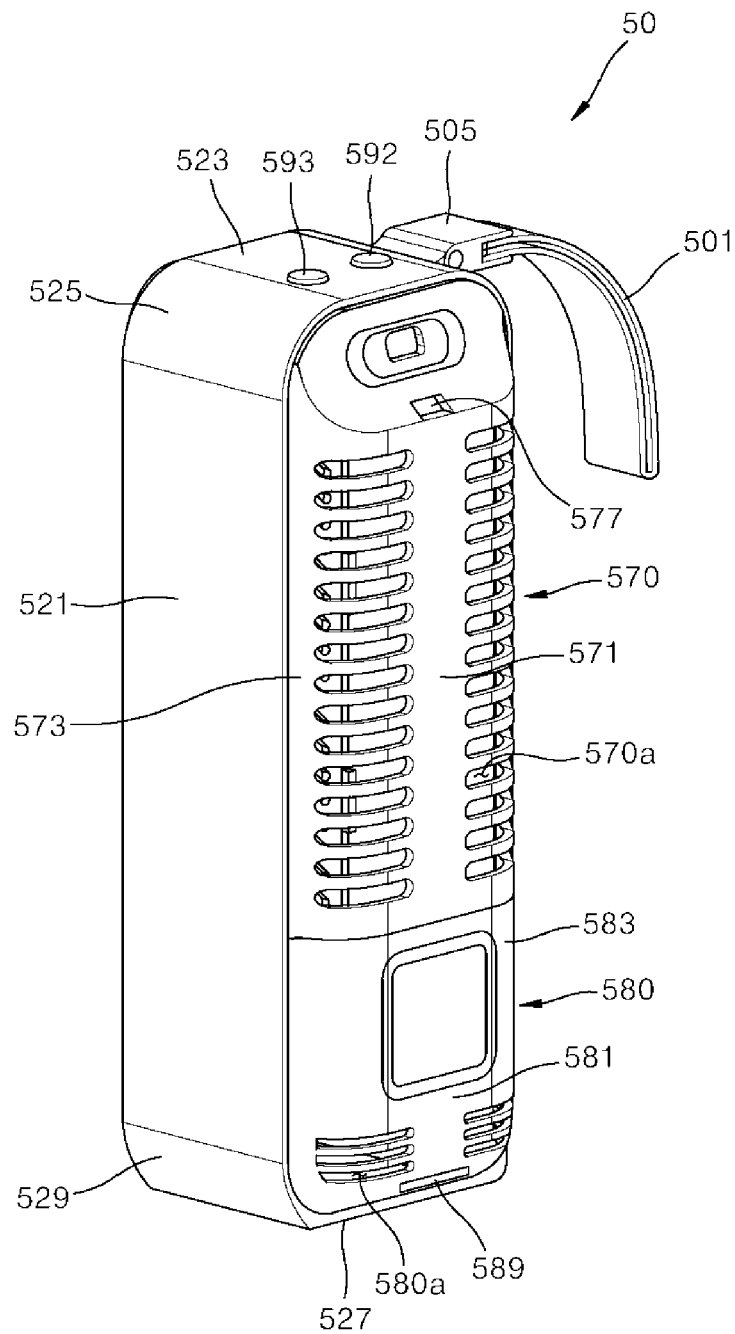
FIG. 16 is a rear perspective view illustrating a rear side of the portable air purifier shown in FIG. 14.
Figure 17:
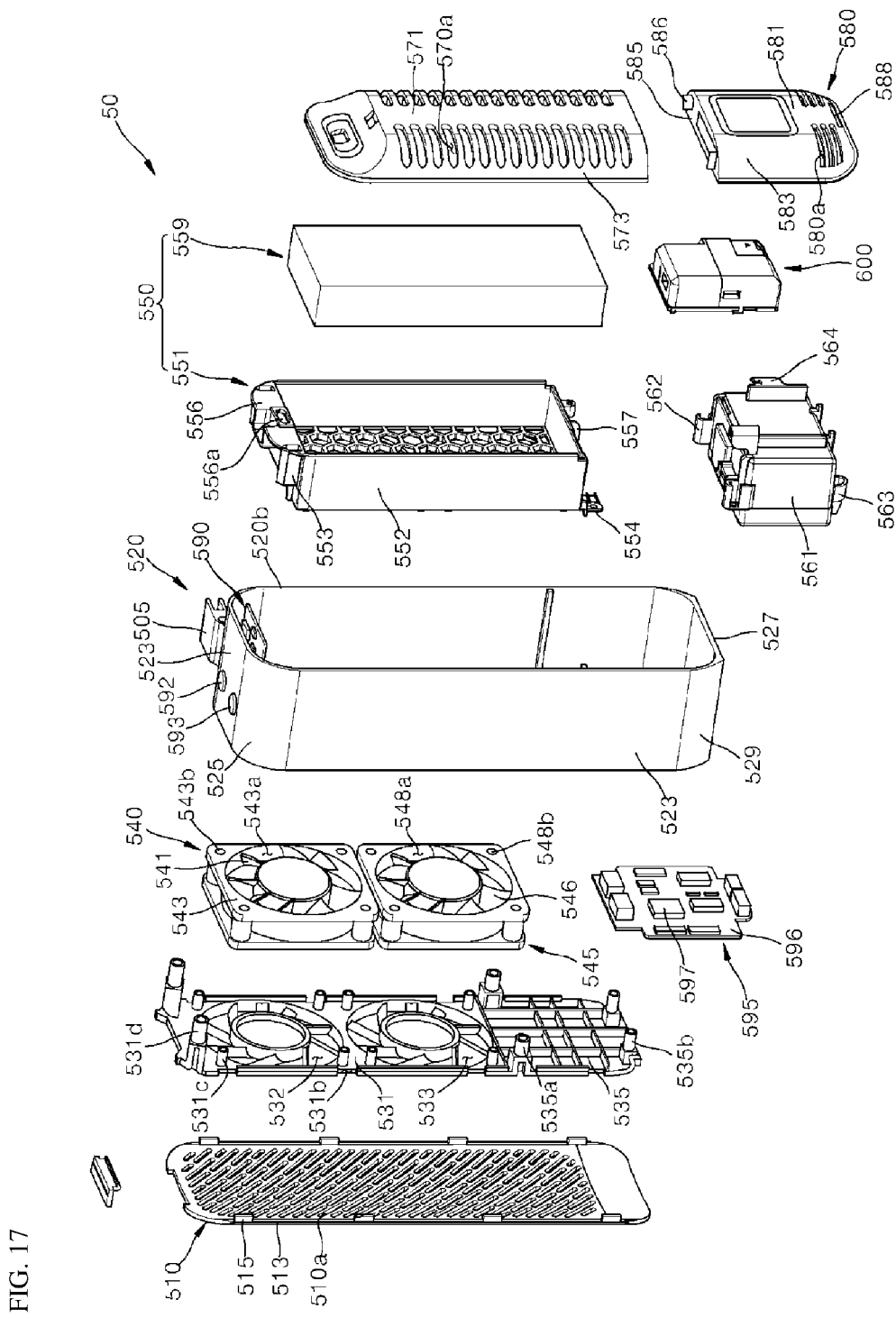
FIG. 17 is a rear exploded perspective view illustrating an exploded state of the portable air purifier shown in FIG. 16.
Figure 18:
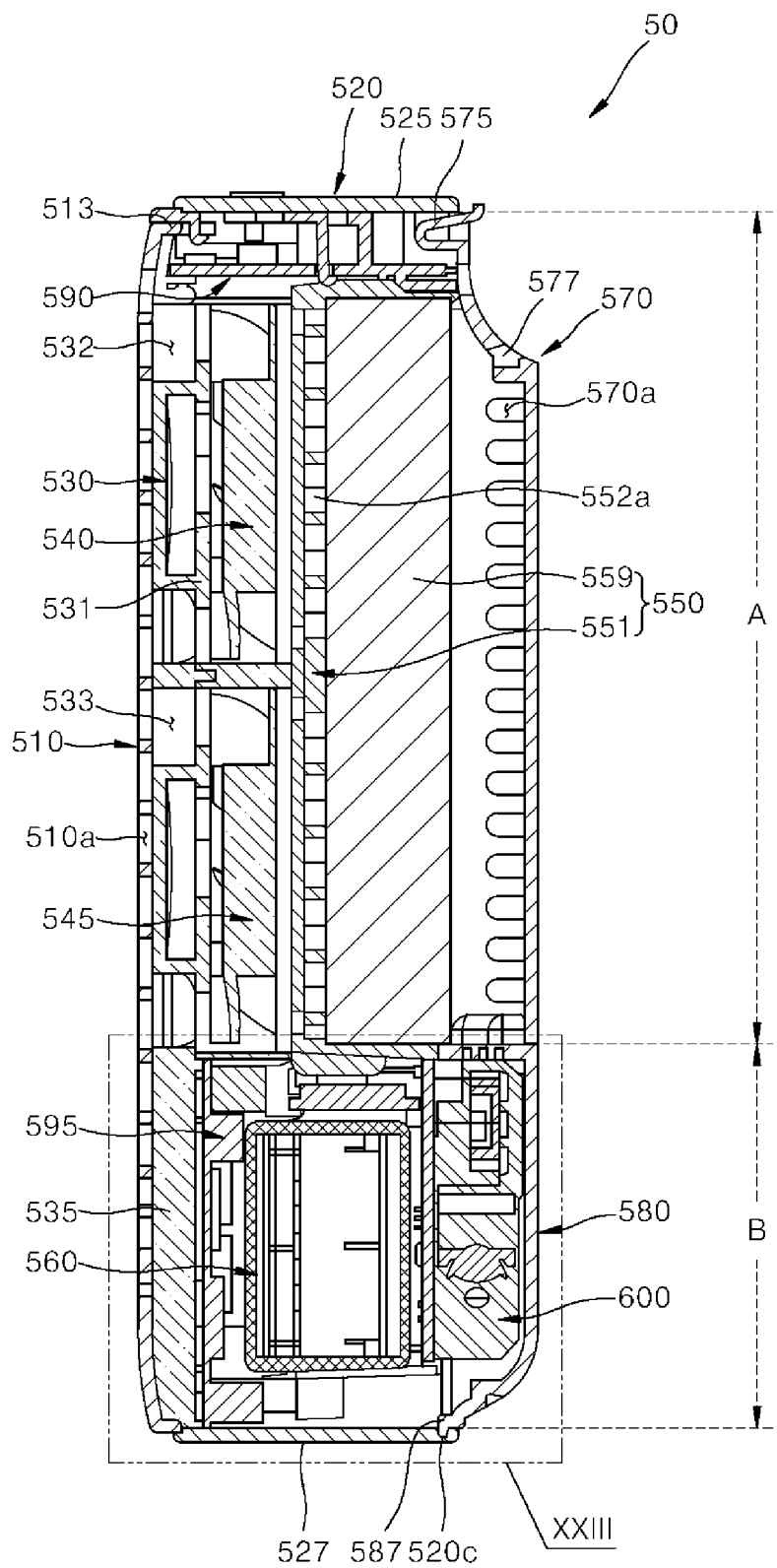
FIG. 18 is a cross-sectional view taken along line "XVIII-XVIII" of FIG. 14.

FIG. 14 is a front perspective view illustrating a front side of a portable air purifier according to a second embodiment of the present invention, and FIG. 15 is an exploded perspective view illustrating an exploded state of the portable air purifier shown in FIG. 14. In addition, FIG. 16 is a rear perspective view illustrating a rear side of the portable air purifier shown in FIG. 14. FIG. 17 is a rear exploded perspective view illustrating an exploded state of the portable air purifier shown in FIG. 16. FIG. 18 is a cross-sectional view taken along line "XVIII-XVIII" of FIG. 14.

Referring to FIGS. 14 to 17, a portable air purifier 50 according to the embodiment of the present invention may be formed to have an approximately hexahedral shape. The portable air purifier 50 includes a case 520, a front panel 510, and a rear panel 570.

The case 520 constitutes an external framework of the portable air purifier 50. The case 520 accommodates a plurality of components.

The front panel 510 is coupled to a front of the case 520. The front panel 510 constitutes a front exterior of the portable air purifier 50.

The rear panel 570 is coupled to the rear side of the case 520. The rear panel 570 constitutes a rear exterior of the portable air purifier 50.

The portable air purifier 50 may have an overall standing hexahedral shape which is vertically long. Therefore, a user may use the portable air purifier 50 by standing up or laying down the portable air purifier 50. In addition, even when the portable air purifier 50 is used in a place such as a vehicle interior in which shaking occurs, the portable air purifier 50 may not be rolled and may stably maintain a position thereof.

Directions will be defined. The term "frontward" refers to a direction in which the front panel 510 is positioned from the case 520, and the term "rearward" refers to a direction opposite to the front and a direction in which the rear panel 520 is positioned from the case 520

[Overall Structure of Portable Air Purifier]

The portable air purifier 50 of the present embodiment includes the front panel 510, the case 520, a fan cover 530, fan assemblies 540 and 545, a filter module 550, a battery 560, the rear panel 570, and a rear cover 580.

The front panel 510 is disposed at a foremost side of the portable air purifier 50 to constitute the front exterior of the portable air purifier 50. Air purified by the portable air purifier 50 is externally discharged through the front panel 510. To this end, a plurality of discharge ports 510a are formed in the front panel 510.

The case 520 constitutes the external framework of the portable air purifier 50. Upper, side, and lower exteriors of the portable air purifier 50 are formed by the case 520. An accommodation space is formed in the case 520. Various components, such as the fan cover 530, the fan assemblies 540 and 545, the battery 560, and the filter module 550, which constitutes the portable air purifier 50, are accommodated in the accommodation space. The case 520 may be formed to have sufficient strength capable of protecting the accommodated components from an external impact.

The fan cover 530 is accommodated in the accommodation space in the case 520 and is disposed in front of the fan assemblies 540 and 545. That is, the fan cover 530 is disposed between the front panel 510 and the fan assemblies 540 and 545 in the case 520.

The fan cover 530 fixes the fan assemblies 540 and 545 to an interior of the case 520. In addition, fan cover 530 also performs a function of guiding an air flow such that air blown by the fan assemblies 540 and 545 is not spread around and moves straight forward. In addition, the fan cover 530 may be involved in fixing the filter module 550 and the battery 560.

The fan assemblies 540 and 545 are accommodated in the accommodation space in the case 520 and are disposed between the fan cover 530 and the filter module 550. That is, the fan assemblies 540 and 545 are disposed behind the fan cover 530 and in front of the filter module 550. The fan assemblies 540 and 545 serve to suction air from behind the portable air purifier 50 and discharge the air toward a front of the portable air purifier 50.

The filter module 550 is accommodated in the accommodation space in the case 520 and is disposed between the fan assemblies 540 and 545 and the rear panel 570. That is, the filter module 550 is disposed behind the fan assemblies 540 and 545 and in front of the rear panel 570. The filter module 550 serves to purify air suctioned through the rear side of the portable air purifier 50. Air purified by passing through the filter module 550 passes through the fan assemblies 540 and 545, the fan cover 530, and the front panel 510 and is discharged forward from the portable air purifier 50.

The battery 560 is accommodated in the accommodating space in the case 520 and is disposed below the fan assemblies 540 and 545 and the filter module 550. The battery 560 may supply power for driving the portable air purifier 50. To this end, the battery 560 may be electrically connected to any one of the fan assemblies 540 and 545, the filter module 550, and a sub PCB 590 and a main PCB 595, which are to be described below.

The rear panel 570 is disposed at a rearmost side of the case 520 to constitute the rear exterior of the portable air purifier 50 together with the rear cover 580. The rear panel 570 is disposed behind the filter module 560. Outside air is suctioned into the portable air purifier 50 through the rear panel 570. To this end, a plurality of first inlet ports 570a are formed in the rear panel 570.

The rear cover 580 is disposed at a rearmost side of the case 520 to constitute the rear exterior of the portable air purifier 50 together with the rear panel 570. The rear cover 580 is disposed behind the battery 560. According to the present embodiment, a rear region of the filter module 550 is covered by the rear panel 570. A rear region of the battery 560 is covered by the rear cover 580.

[Structure of Case]

The portable air purifier 50 includes the case 520 which constitutes the external framework of the portable air purifier 50. The accommodation space is formed in the case 520, and a front side and a rear side of the accommodation space are open.

According to the present embodiment, the case 520 is formed to have a hexahedral shape of which a front surface and a rear surface are open, and the accommodation space, of which the front side and the rear side are open, is formed in the case 520. The case 520 may be made of a metal material. In the present embodiment, the case 520 is illustrated as being made of a light and high strength aluminum material.

The rear surface of the case 520 is open to suction outside air. The front surface of the case 520 is open to discharge air purified in the accommodation space in the case 520. Through the open front and rear surfaces of the case 520, various components constituting the portable air purifier 50 may be installed in the accommodation space of the case 520.

A filter 559 to be described below is mounted in or detached from the case 520 through the open rear surface of the case 520. The rear panel 570 is coupled to the open rear surface of the case 520. The rear panel 570 coupled to the case 520 covers the open rear surface of the case 520.

The case 520 may be formed to have the hexahedral shape of which the front surface and the rear surface are open and may include a side surface portion 521, an upper surface portion 523, a first connection surface portion 525, a lower surface portion 527, and a second connection surface portion 529.

The side surface portion 521 constitutes a side surface of the case 520. The side surface portion 521 is formed as a vertical plane surface which forms a wall surface for blocking a side portion of the accommodation space in the case 520. The case 520 is provided with a pair of side surface portions 521, and the pair of side surface portions 521 face each other and are disposed to be spaced apart from each other by a certain interval. In this case, the pair of side surface portions 521 are disposed to be parallel in a lateral direction.

The upper surface portion 523 is disposed above the side surface portion 521 and forms a plane surface parallel to a separation direction of the pair of side surface portions 521, that is, forms a horizontal plane surface. The upper surface portion 523 constitutes an upper surface of the case 520.

The first connection surface portion 525 is disposed between the side surface portion 521 and the upper surface portion 523. The first connection surface portion 525 is disposed between one end portion of the upper surface portion 523 and the side surface portion 521 disposed below the one end portion of the upper surface portion 523 and between the other end portion of the upper surface portion 523 and the side surface portion 521 disposed below the other end portion of the upper surface portion 523.

Each first connection surface portion 525 connects the side surface portion 521 and the upper surface portion 523 in a round form. The first connection surface portion 525 forms an upper corner of the case 520, at which the side surface portion 521 and the upper surface portion 523 are connected, in a round form, thereby serving to improve safety and an exterior appearance of a product.

The lower surface portion 527 is disposed below the upper surface portion 523 and the side surface portion 521 and forms a plane surface parallel to the upper surface portion 523. The lower surface portion 527 constitutes a lower surface of the case 520. In addition, the lower surface portion 527 is also a portion which supports the portable air purifier 50 so that the portable air purifier 50 may maintain a standing posture.

The second connection surface portion 529 is disposed between the side surface portion 521 and the lower surface portion 527. The second connection surface portion 529 is disposed between one end portion of the lower surface portion 527 and the side surface portion 521 disposed above the one end portion of the lower surface portion 527 and between the other end portion of the lower surface portion 527 and the side surface portion 521 disposed above the other end portion of the lower surface portion 527.

Each second connection surface portion 529 connects the side surface portion 521 and the lower surface portion 527 in a round form. The second connection surface portion 529 forms the lower corner of the case 520, at which the side surface portion 521 and the lower surface portion 527 are connected, in a round form, thereby serving to improve safety and an exterior appearance of a product.

A front groove 520a is formed in a front edge of the case 520. The front groove 520a is formed in a shape in which a portion of the front edge of the case 520 is recessed rearward. As a result, a stepped portion, in which an inner side thereof facing the accommodation space is concave further rearward from the case 520 as compared with an outer side thereof, is formed at the front edge of the case 520.

In addition, a rear groove 520b may be formed in a rear edge of the case 520. The rear groove 520b is formed in a shape in which a portion of the rear edge of the case 520 is recessed forward. As a result, a stepped portion, in which an inner side thereof facing the accommodation space is concave further forward from the case 520 as compared with an outer side thereof, is formed at the rear edge of the case 520.

Meanwhile, a power button 592 may be provided on an upper portion of the case 520, that is, the upper surface portion 523 of the case 520. The power button 592 is provided as an operation button for turning power of the portable air purifier 50 on or off.

In addition, an air flow rate adjustment button 593 may also be provided on the upper portion of the case 520. The air flow rate adjustment button 593 is provided as an operation button for increasing or decreasing an air flow rate of the portable air purifier 50. The air flow rate adjustment button 593 may be disposed adjacent to the power button 592 such that a user may easily identify the air flow rate adjustment button 593.

The case 520 include button through-holes 523a for externally exposing the power button 592 and the air flow rate adjustment button 593. The button through-holes 523a are formed as holes for externally exposing the power button 592 and the air flow rate adjustment button 593 positioned in the case 520 from the case 520.

In the present embodiment, two button through-holes 523a are illustrated as being formed in the upper surface portion 523 of the case 520. One of the two button through-holes 523a is for externally exposing the power button 592 from the portable air purifier 50, and the other thereof is for externally exposing the air flow rate adjustment button 593 from the portable air purifier 50.

As another example, one or three more button through-holes 523a may be formed according to the number of buttons provided in the portable air purifier 50 or may be formed in other surfaces instead of the upper surface portion 523.

In addition, the case 520 may be provided with a strap coupling portion 505 for coupling a strap 501 to the case 520. The strap 501 is provided such that a user may grasp the strap 501 in his or her hand. The user may lift the portable air purifier 50 by grasping the strap 501 instead of directly grasping the portable air purifier 50 in his or her hand. That is, due to the strap 501, portability of the portable air purifier 50 may be improved.

The strap coupling portion 505 and the strap 501 may be disposed at a boundary between the upper surface portion 523 and the first connection surface portion 525 or on the first connection surface portion 525. The strap coupling portion 505 and the strap 501 being disposed at such a position is to minimize the presence of the strap 501 adversely affecting use of the portable air purifier 50.

That is, when the strap coupling portion 505 and the strap 501 are disposed at the boundary between the upper surface portion 523 and the first connection surface portion 525 or on the first connection surface portion 525, it is possible to reduce a possibility that the strap 501 disturbs operation of the power button 592 or the air flow rate adjustment button 593 when the portable air purifier 50 is used in a state of being stood up.

In addition, when the strap coupling portion 505 and the strap 501 are disposed as described above, it is possible to reduce a probability that the strap 501 is trapped under the portable air purifier 50 when the portable air purifier 50 is used in a state of being laid down thus causing a seated state of the portable air purifier 50 to be unstable.

The accommodation space in the case 520 may be divided into a first region A and a second region B. When the accommodation space is vertically divided, an upper region becomes the first region A, and a lower region becomes the second region B. The first region A and the second region B are not physically divided regions and are only conceptually divided regions.

According to the present embodiment, among components accommodated in the accommodation space, the fan assemblies 540 and 545 and the filter module 550 are disposed in the first region A, and the battery 560 is disposed in the second region B.

[Front Panel]

The front panel 510 is disposed at the foremost side of the portable air purifier 50 to constitute the front exterior of the portable air purifier 50. The plurality of discharge ports 510a are formed in the front panel 510.

As an example, the plurality of discharge ports 510a may be formed by perforating or cutting at least a portion of the front panel 510. Air purified in the portable air purifier 50 may be discharged forward from the portable air purifier 50 through the plurality of discharge ports 510a formed as described above.

In the present embodiment, the front panel 510 is illustrated as being formed to have a plate shape. The front panel 510 is provided with a front panel coupling portion 513 formed by at least a portion of an edge of the front panel 510 extending rearward.

The front panel coupling portion 513 is a component provided for fixing the front panel 510 to the front side of the case 520. The front panel coupling portion 513 may be fixed to the front side of the case 520 by being coupled to the fan cover 530 disposed at the foremost side inside the case 520. In this case, the front panel 510 and the fan cover 530 may be coupled in a form in which the front panel coupling portion 513 is fitted into and coupled to a front panel coupling groove 531a formed in the fan cover 530.

As another example, the front panel coupling portion 513 may be fixed to the front side of the case 520 in a form in which the front panel coupling portion 513 is coupled directly to the front edge of the case 520. In this case, a coupling groove, to which the front panel coupling portion 513 is fitted into and coupled, may be formed in the front edge of the case 520.

In addition, the front panel 510 may be further provided with a front panel locking portion 515. The front panel locking portion 515 is provided to firmly mount the front panel 510 to the front side of the case 520 together with the front panel coupling portion 513.

The front panel locking portion 515 is formed to have a shape protruding from one side of the front panel coupling portion 513. The front panel locking portion 515 is coupled to the fan cover 530 through a front panel locking groove 531b formed in an edge of the fan cover 530.

As an example, the front panel locking portion 515 may be formed to have a hook shape. The front panel locking portion 515 may be coupled to the fan cover 530 in a hook manner. A plurality of front panel locking portions 515 may be disposed in the front panel coupling portion 513 so as to be spaced apart from each other by a certain interval.

[Structure of Fan Cover]

The fan cover 530 is accommodated in the accommodation space in the case 520. The fan cover 530 is disposed between the front panel 510 and the fan assemblies 540 and 545 and between the front panel 510 and the battery 560. That is, the front panel 510 is disposed in front of the fan cover 530, and the fan assemblies 540 and 545 and the battery 560 are disposed behind the fan cover 530.

The fan cover 530 may include the front panel coupling groove 531a into which the front panel 510 is inserted. As an example, the front panel coupling groove 531a may be formed by the edge of the fan cover 530 being recessed inward. The front panel 510 and the fan cover 530 may be coupled by the front panel coupling portion 513 being inserted into and coupled to an outer side of the front panel coupling groove 531a.

In addition, the fan cover 530 may include the front panel locking groove 531b coupled to the front panel locking portion 515 of the front panel 510. As an example, the front panel locking groove 531b may be formed by a portion of the front panel coupling groove 531a being further recessed.

The front panel locking portion 515 of the front panel 510 may be coupled to the front panel locking groove 531b in a hook manner. A plurality of front panel locking grooves 531b may be formed at points of the fan cover 530 corresponding to the front panel locking portions 515.

Meanwhile, the fan cover 530 may include an upper cover portion 531 and a lower cover portion 535. When the fan cover 530 is vertically divided, an upper region becomes the upper cover portion 531, and a lower region becomes the lower cover portion 535.

The upper cover portion 531 is disposed in front of the fan assemblies 540 and 545. The upper cover portion 531 is provided with air discharge portions 532 and 533. The air discharge portions 532 and 533 are formed by perforating or cutting a portion of the upper cover portion 531. The air discharge portions 532 and 533 form passages in the fan cover 530 that connect the front side of the case 520 and blower fans 541 and 546 of the fan assemblies 540 and 545.

In the present embodiment, two fan assemblies 540 and 545 are illustrated as being provided in the portable air purifier 50. That is, an upper fan assembly 540 and a lower fan assembly 545 are vertically disposed in the accommodation space in the case 520.

Accordingly, the fan cover 530 is also provided with two air discharge portions 532 and 533. That is, an upper air discharge portion 532 and a lower air discharge portion 533 are vertically formed in the upper cover portion 531.

Air passing through the upper fan assembly 540 may be discharged forward through the upper air discharge portion 532, and air passing through the lower fan assembly 545 may be discharged forward through the lower air discharge portion 533.

As another example, one or three more fan assemblies may be provided in the portable air purifier, and thus, one or three more air discharge portions may also be formed in the fan cover.

In addition, the upper cover portion 531 is provided with first coupling bosses 531c. The first coupling boss 531c is formed to protrude rearward from a rear surface of the upper cover portion 531. The first coupling bosses 531c may be fitted into and coupled to the fan assemblies 540 and 545. The fan cover 530 and the fan assemblies 540 and 545 may be coupled by the first coupling bosses 531c and the fan assemblies 540 and 545 being coupled.

In addition, the upper cover portion 531 may be further provided with second coupling bosses 531d. The second coupling boss 531d is formed to protrude rearward from the rear surface of the upper cover portion 531. The second coupling boss 531d may be fitted into and coupled to the filter module 550. Since the second coupling boss 531d should be coupled to the filter module 550 disposed behind the fan assemblies 540 and 545, the second coupling boss 531d protrudes to be longer than the first coupling boss 531c.

The lower cover portion 535 is disposed below the upper cover portion 531 provided with the air discharge portions 532 and 533. The lower cover portion 535 is disposed in the second region B in the case 520. In contrast, the upper cover portion 531 is disposed in the first region A in the case 520.

The lower cover portion 535 is disposed in front of the battery 560. The lower cover portion 535 shields a front side of the battery 560 and supports the battery 560 in front thereof.

The lower cover portion 535 may be provided with third coupling bosses 535a. The third coupling boss 535a is formed to protrude rearward from a rear surface of the lower cover portion 535. The third coupling boss 535a may be fitted into and coupled to the filter module 550. That is, the second coupling boss 531d becomes a coupling point between the fan cover 530 and the filter module 550 in the first region A, and the third coupling boss 535a becomes a coupling point between the fan cover 530 and the filter module 550 in the second region B.

The fan cover 530 and the filter module 550 may be coupled to each other at a plurality of points by the second coupling bosses 531d disposed at an upper side and the third coupling bosses 535a disposed at a lower side. Accordingly, the fan cover 530 and the filter module 550 may be more strongly and stably coupled. The fan assemblies 540 and 545 disposed between the fan cover 530 and the filter module 550 may also be stably fixed between the fan cover 530 and the filter module 550.

In addition, the lower cover portion 535 may further be provided with fourth coupling bosses 535b. The fourth coupling boss 535b is formed to protrude rearward from the rear surface of the lower cover portion 535. The fourth coupling boss 535b may be fitted into and coupled to the battery 560. The fan cover 530 and the battery 560 may be coupled by the fourth coupling boss 535b being fitted into and coupled to the battery 560.

[Structure of Fan Assembly]

The portable air purifier 50 of the present embodiment includes the fan assemblies 540 and 545 which suction air from the rear side of the portable air purifier 50 and discharge the air forward from the portable air purifier 50.

The fan assemblies 540 and 545 are disposed between the fan cover 530 and the filter module 550. That is, the fan cover 530 is disposed in front of the fan assemblies 540 and 545, and the filter module 550 is disposed behind the fan assemblies 540 and 545.

The fan assemblies 540 and 545 are accommodated in the accommodating space in the case 520 and are disposed in the first region A. Accordingly, the fan assemblies 540 and 545 are disposed at positions facing the rear surface of the upper cover portion 531 of the upper cover portion 531 and the lower cover portion 535 of the fan cover 530.

In the present embodiment, two fan assemblies 540 and 545 are illustrated as being provided in the portable air purifier 50. Thus, the upper fan assembly 540 and the lower fan assembly 545 are provided in the portable air purifier 50.

The upper fan assembly 540 and the lower fan assembly 545 are vertically disposed. That is, the upper fan assembly 540 and the lower fan assembly 545 are disposed on the same vertical line.

The upper fan assembly 540 and the lower fan assembly 545 may be disposed to face the air discharge portions 532 and 533 formed in the fan cover 530. Accordingly, air suctioned into each of the upper fan assembly 540 and the lower fan assembly 545 through the rear panel 570 may pass through each of the upper air discharge portion 532 and the lower air discharge portion 533 and then may be discharged forward through the front panel 510.

In the present embodiment, the upper fan assembly 540 and the lower fan assembly 545 are illustrated as being formed to have the same size and shape. However, alternatively, the upper fan assembly 540 and the lower fan assembly 545 may be formed to have different sizes and shapes.

The upper fan assembly 540 and the lower fan assembly 545 include the blower fans 541 and 546, fan motors (not shown), and fan brackets 543 and 548.

The blower fans 541 and 546 are provided to generate an air flow. As an example, the blower fans 541 and 546 may include axial-flow fans. Air suctioned into the case 520 through the rear panel 570 may be suctioned in axial directions of the blower fans 541 and 546 and then discharged in the axial directions of the blower fans 541 and 546.

The fan motors are connected to the blower fans 541 and 546 to provide rotational forces to the blower fans 541 and 546. The fan motor may include a BLDC motor capable of adjusting a frequency.

At least one of the blower fans 541 and 546 and the fan motors are coupled to the fan brackets 543 and 548. The fan brackets 543 and 548 are provided as components for coupling the blower fans 541 and 546 to the fan cover 530.

Openings 543a and 548a are formed in the fan brackets 543 and 548. The openings 543a and 548a form passages for guiding air to be suctioned toward the blower fans 541 and 546 and guiding air to be discharged from the blower fans 541 and 546.

The openings 543a and 548a are formed to pass through the fan brackets 543 and 548 in a circular shape. The blower fans 541 and 546 are inserted into the openings 543a and 548a. That is, the openings 543a and 548a form spaces for installing the blower fans 541 and 546 and form the passages for guiding air to be suctioned toward the blower fans 541 and 546 and guiding air to be discharged from the blower fans 541 and 546 in the fan brackets 543 and 548.

In addition, the fan brackets 543 and 548 may be further provided with bracket coupling portions 543b and 548b. The bracket coupling portions 543b and 548b are provided as portions for coupling the fan assemblies 540 and 545 to the fan cover 530.

The first coupling bosses 531c provided in the upper cover portion 531 of the fan cover 530 may be fitted into and coupled to the bracket coupling portions 543b and 548b. As described above, in a state in which the first coupling bosses 531c are fitted into and coupled to the bracket coupling portions 543b and 548b, when the first coupling bosses 531c and the bracket coupling portions 543b and 548b are coupled using certain coupling members, the fan assemblies 540 and 545 and the fan cover 530 may be coupled.

[Structure of Filter Module]

The filter module 550 is disposed between the fan assemblies 540 and 545 and the rear panel 570. That is, the fan assemblies 540 and 545 are disposed in front of the filter module 550, and the rear panel 570 is disposed behind the filter module 550.

The filter module 550 is accommodated in the accommodation space in the case 520 and is disposed in the first region A. Accordingly, the filter module 550 is disposed at a position facing the fan assemblies 540 and 545 of the fan assemblies 540 and 545 and the battery 560 disposed thereunder. The filter module 550 may include a filter case 551 and the filter 559.

The filter case 551 constitutes an external framework of the filter module 550. The filter case 551 may include a case main body 552 and fan cover coupling portions 553 and 554.

The case main body 552 constitutes a framework of the filter case 551. In the present embodiment, the case main body 552 is illustrated as being formed to have a hexahedral shape of which a rear surface is open. An insertion space for accommodating the filter 559 is formed in the case main body 552. A rear side of the case main body 552 is open, and thus, a passage for inserting the filter 559 into the insertion space in the case main body 552 is formed.

The filter 559 is mounted in the insertion space in the case main body 552. A seating groove or a seating protrusion for allowing the filter 559 to be firmly mounted in the filter case 551 may be formed in or on an inner surface of the case main body 552.

In addition, through-holes 552a forming passages between the insertion space and the fan assemblies 540 and 545 may be formed in the case main body 552. The through-hole 552*a* is formed to pass through a front surface of the case main body 552 in a front-rear direction thereof. The through-holes 552*a* form passages through which air passing through the filter 559 flows toward the blower fans 541 and 546.

A plurality of through-holes 552*a* are formed in the front surface of the case main body 552, and each through-hole 552*a* is formed to pass through the front surface of the case main body 552 in a front-rear direction.

In the present embodiment, the plurality of through-holes 552*a* are illustrated as being formed in the front surface of the case main body 552 and each through-hole 552*a* is illustrated as being formed to have a hexagonal shape. In addition, the plurality of through-holes 552*a* may be formed in a honeycomb shape, and thus, a honeycomb structure may be formed on the front surface of the case main body 552.

As described above, since the honeycomb structure is formed on the front surface of the case main body 552, it is possible to achieve a purpose of securing a passage for an air flow together with purposes of securing rigidity of the filter case 551 and lightening weight of the filter case 551.

The fan cover coupling portions 553 and 554 may include a first fan cover coupling portion 553 provided at an upper portion of the case main body 552 and a second fan cover coupling portion 554 provided at a lower portion of the case main body 552.

The first fan cover coupling portion 553 is coupled to the second coupling boss 531*d* of the fan cover 530 at the upper portion of the case main body 552. The second fan cover coupling portion 554 is coupled to the third coupling boss 535*a* of the fan cover 530 at the lower portion of the case main body 552.

The second coupling boss 531*d* may be fitted into and coupled to the first fan cover coupling portion 553. The third coupling boss 535*a* may be fitted into and coupled to the second fan cover coupling portion 554. As described above, in a state in which the second and third coupling bosses 531*d* and 531*a* are fitted into and coupled to the first and second fan cover coupling portions 553 and 554, when the first and second fan cover coupling portions 553 and 554 and the second and third coupling bosses 531*d* and 531*a* are respectively coupled using certain coupling members, the fan cover 530 and the filter module 550 may be coupled.

As described above, in a process in which the first and second fan cover coupling portions 553 and 554 and the second and third coupling bosses 531*d* and 531*a* are coupled using the coupling members, the fan cover 530 and the filter case 551 receive forces in a direction in which the fan cover 530 and the filter case 551 approach each other. That is, the fan cover 530 receives a force to move the fan cover 530 rearward, and the filter case 551 receives a force to move the filter case 551 forward.

Accordingly, the fan cover 530 and the filter case 551 act to press the fan assemblies 540 and 545 disposed between the fan cover 530 and the filter module 550 in the front and rear sides of the fan assemblies 540 and 545. As a result, the fan assemblies 540 and 545 may be firmly fixed between the fan cover 530 and the filter module 550 without a separate coupling operation.

That is, the fan cover 530, the fan assemblies 540 and 545, and the filter case 551 may be coupled together using the coupling members used to couple the fan cover 530 and the filter case 551. As a result, the fan cover 530, the fan assemblies 540 and 545, and the filter module 550 may be easily and quickly assembled.

In addition, the filter case 551 may be further provided with fan coupling bosses 555. The fan coupling bosses 555 may be fitted into and coupled to the bracket coupling portions 543*b* and 548*b* in the rear sides of the blower fans 541 and 546.

According to the present embodiment, the first coupling bosses 531*c* are fitted into and coupled to the bracket coupling portions 543*b* and 548*b* in front of the blower fans 541 and 546, and the fan coupling bosses 555 are fitted into and coupled to the bracket coupling portions 543*b* and 548*b* in the rear sides of the blower fans 541 and 546.

That is, the first coupling bosses 531*c* and the fan coupling bosses 555 are fitted into and coupled to one bracket coupling portion 543*b* and one bracket coupling portion 548*b* in both forward and rearward directions. As a result, the fan assemblies 540 and 545 may be fitted between the fan cover 530 and the filter module 550 and may be firmly fixed between the fan cover 530 and the filter module 550.

In addition, a first coupling portion 562 provided at an upper portion of the battery 560 to be described below may be interposed between the second fan cover coupling portion 554 and the third coupling boss 531*a*. The second fan cover coupling portion 554 and the third coupling boss 531*a* may be coupled to each other with the first coupling portion 562 of the battery 560 interposed therebetween. As a result, the fan cover 530, the filter module 550, and the battery 560 may be coupled together by performing a coupling operation once using one coupling member.

In addition, the filter case 551 may further include a protruding support 556. The protruding support 556 is formed to protrude from the case main body 552. In the present embodiment, the protruding support 556 is illustrated as being formed to have a shape protruding upward from an upper end of the case main body 552. The protruding support 556 forms a plane surface protruding upward from the upper end of the case main body 552. In this case, the protruding support 556 is disposed at a rear side of the case main body 552 and forms a plane surface parallel to a front surface of the case main body 552.

A rear panel locking groove 555*a* is formed in the protruding support 556. The rear panel locking groove 555*a* is formed to be concave in the protruding support 556, and a rear side of the rear panel locking groove 555*a* is open toward the rear panel 570. The rear panel locking groove 555*a* is provided for coupling the filter case 551 and the rear panel 570.

In addition, the filter case 551 may further include a sensor coupling portion 557. The sensor coupling portion 557 is provided for coupling the filter case 551 and a sensor module 600 to be described below.

The portable air purifier 50 is provided with the filter 559 which purifies air by filtering at least one of physical particles such as dust, fine particles, and ultrafine particles, chemical substances such as odor particles and harmful gases, and microorganisms such as bacteria and viruses.

The filter 559 may be any one of a dust collecting filter for filtering physical particles such as dust, a deodorizing filter for filtering chemical substances such as gases, and a sterilizing filter for filtering microorganisms such as bacteria and viruses The portable air purifier 50 may be equipped with the filter 559 including any one of the dust collecting filter, the deodorizing filter, and the sterilizing filter. Therefore, any one of the dust collecting filter, the deodorizing filter, and the sterilizing filter may be selected and used according to a user's preference. That is, the purpose or performance of the portable air purifier 50 may vary according to a type of the selected filter.

As an example, the dust collecting filter may include a HEPA filter. In addition, the deodorizing filter may include a carbon filter. The sterilizing filter may include an ionizer. However, the present invention is not limited thereto, and the dust collecting filter, the deodorizing filter, and the sterilizing filter may include various types of filters.

The filter 559 may be inserted into the insertion space in the filter case 551 through the open rear surface of the filter case 551. That is, the filter 559 may be detachably mounted in the filter case 551. According to the present embodiment, the filter 559 is installed by simply inserting the filter 559 into the filter case 551, and the filter 559 is removed by simply unloading the filter 569 from the filter case 551. That is, the filter 559 may be quickly and easily mounted or detached. In addition, since the filter 559 may be easily and quickly replaced when necessary, maintenance of the portable air purifier 50 may be facilitated, and a type of a filter may be easily replaced as necessary.

[Structure of Battery]

The battery 560 may supply power for driving the portable air purifier 50. To this end, the battery 560 may be electrically connected to at least one of the fan assemblies 540 and 545, the sub PCB 590, the main PCB 595, and the filter module 550.

The battery 560 is accommodated in the accommodation space in the case 520 and is disposed in the second region B. The second region B is a region disposed below the first region A in which the fan assemblies 540 and 545 and the filter module 550 are disposed. An upper boundary surface of the second region B may be defined by the fan assemblies 540 and 545 and the filter module 550, and lower and side boundary surfaces of the second region B may be defined by the lower surface portion 527 and side surface portions 521 of the case 520.

The battery 560 positioned in the second region B is disposed below the fan assemblies 540 and 545 and the filter module 550. In addition, the battery 560 is disposed between the fan cover 530 and the rear cover 580. That is, the fan assemblies 540 and 545 and the filter module 550 are disposed above the battery 560, the lower cover portion 535 of the fan cover 530 is disposed in front of the battery 560, and the rear cover 580 is disposed behind the battery 560.

The battery 560 may be provided with the first coupling portion 562 and the second coupling portion 563. The first coupling portion 562 is provided for coupling the battery 560 and the filter module 550. The second coupling portion 563 is provided for coupling the battery 560 and the fan cover 530.

The first coupling portion 562 is provided at the upper portion of the battery 560. In a state in which the first coupling portion 562 is in contact with the second fan cover coupling portion 554 of the filter case 551, the first coupling portion 562 may be coupled to the second fan cover coupling portion 554 using a coupling member. The battery 560 and the filter module 550 may be coupled by the first coupling portion 562 and the second fan cover coupling portion 554 being coupled as described above.

In this case, the first coupling portion 562 is disposed between the third coupling boss 535*a* of the fan cover 530 and the second fan cover coupling portion 554. In a state in which a front surface of the first coupling portion 562 is in contact with the third coupling boss 535*a* and a rear surface thereof is in contact with the second fan cover coupling portion 554, the first coupling portion 562 may be coupled to the third coupling boss 535*a* and the second fan cover coupling portion 554 using a coupling member passing through the third coupling boss 535*a*, the first coupling portion 562, and the second fan cover coupling portion 554 at once. That is, the fan cover 530, the filter module 550, and the battery 560 may be coupled together by performing a coupling operation once using one coupling member.

The fourth coupling boss 535*b* of the fan cover 530 may be fitted into the second coupling portion. In a state in which the fourth coupling boss 535*b* is fitted into the second coupling portion 563, the second coupling portion 563 and the fourth coupling boss 535*b* may be coupled using a coupling member. The fan cover 530 and the battery 560 may be coupled by the second coupling portion 563 and the fourth coupling boss 535*b* being coupled as described above.

In addition, the battery 560 may be further provided with a third coupling portion 564. The third coupling portion 564 is provided for coupling the battery 560 and the rear cover 580.

[Structures of Sub PCB and Main PCB]

The portable air purifier 50 may further include the sub PCB 590 and the main PCB 595.

The sub PCB 590 includes a sub-substrate 591, and the power button 592 and the air flow rate adjustment button 593 which are installed on the sub-substrate 591. The power button 592 is provided as an operation button for turning power of the portable air purifier 50 on or off. In addition, the air flow rate adjustment button 593 is provided as an operation button for increasing or decreasing an air flow rate of the portable air purifier 50. The sub PCB 590 is electrically connected to the main PCB 595 to be described below.

The sub PCB 590 may be disposed at an uppermost side in the case 520. That is, the sub PCB 590 is disposed above the fan assemblies 540 and 545 and the filter module 550. The power button 592 and the air flow rate adjustment button 593 installed on the sub PCB 590 are externally exposed from the case 520 through the button through-holes 523*a* formed in the upper surface portion 523 of the case 520. The user may operate the above-described exposed buttons to turn the portable air purifier 50 on or off or adjust an air flow rate of the portable air purifier 50.

In addition, the portable air purifier 50 may further include the main PCB 595 for managing all hardware modules of the portable air purifier 50. The main PCB 595 may serve as a control unit of the portable air purifier 50.

The main PCB 595 is disposed below the fan assemblies 540 and 545 in the accommodation space in the case 520. That is, the main PCB 595 may be accommodated in the second region B in the case 520 and may be disposed between the lower cover portion 535 of the fan cover 530 and the battery 560.

As an example, the main PCB 595 may be disposed in a form which stands up to be parallel to the lower cover portion 535. The main PCB 595 may be supported by the lower cover portion 535 and the battery 560 in both forward and rearward directions thereof between the lower cover portion 535 and the battery 560.

The main PCB 595 may include a main substrate 596 and a plurality of elements 597 installed on the main substrate 596. The main substrate 596 may be electrically connected to the fan assemblies 540 and 545, the battery 560, the sub PCB 590, and the sensor module 600. The main PCB 595 may control operations of the upper fan assembly 540 and the lower fan assembly 545 based on a command input through the power button 592 and the air flow rate adjustment button 593 or data sensed through the sensor module 600.

In addition, the main PCB 595 may be electrically connected to the filter module 550. As an example, when the filter 559 includes an ionizer, the main PCB 595 may be electrically connected to the ionizer and may allow power to be supplied to the ionizer. Alternatively, the filter 559 may be electrically connected to the battery 560 to receive power directly from the battery 560.

[Structure of Rear Panel]

The portable air purifier 50 includes the rear panel 570 disposed behind the case 520. As an example, the rear panel 570 may be made of a plastic resin material.

The rear panel 570 is a portion through which outside air is suctioned into the portable air purifier 50. The plurality of first inlet ports 570a are formed in the rear panel 570. The plurality of first inlet ports 570a may be formed by perforating or cutting at least a portion of the rear panel 570. Outside air may be easily suctioned into the portable air purifier 50 through the plurality of first inlet ports 570a.

The rear panel 570 is disposed behind the case 520 to cover the open rear surface portion of the case 520. The rear panel 570 may include a plane surface portion 571 and inclined surface portions 573.

The plane surface portion 571 is disposed at a lateral center portion of the rear panel 570. The plane surface portion 571 is formed as a plane surface parallel to the front panel 510 to cover the open rear surface portion of the case 520. The plane surface portion 571 may be formed as a rigid plane surface at the central portion of the rear panel 570, thereby contributing to an improvement in rigidity of the rear panel 570.

The inclined surface portions 573 are disposed at both lateral sides of the plane surface portion 571. The inclined surface portion 573 is formed as an inclined surface inclined from the plane surface portion 571 toward the front side of the case 520. In this case, the inclined surface portion 573 may be formed to have a curved shape which is convex rearward. At least a portion of the first inlet port 570a is formed in the inclined surface portion 573.

In the present embodiment, most region of the first inlet port 570a is illustrated as being formed in the inclined surface portion 573. The plurality of first inlet ports 570a are illustrated as being formed in the inclined surface portions 573 disposed at both sides of the rear panel 570 so as to be spaced apart from each other vertically by a certain interval.

As described above, since the first inlet port 570a is formed in the inclined surface portion 573, the first inlet port 570a faces in a direction between a rearward direction and a sideward direction of the portable air purifier 50 rather than the rearward direction or the sideward direction.

When the first inlet port 570a is formed to face the rear side of the portable air purifier 50, the first inlet port 570a is blocked by a floor when the portable air purifier 50 is laid down such that the rear panel 570 is directed to the floor. In this case, air may not be properly suctioned into the portable air purifier 50.

Even so, when the first inlet port 570a is formed to face in the sideward direction of the portable air purifier 50, a direction in which air is suctioned into the portable air purifier 50 is approximately perpendicular to and misaligned with a direction in which air is discharged from the portable air purifier 50. This causes passage resistance inside the portable air purifier 50 to increase, resulting in an increase in noise of the portable air purifier 50 and degradation in air purification performance thereof.

In consideration of such a point, in the present embodiment, the first inlet port 570a is formed to face in the direction between the rearward direction and the sideward direction rather than the rearward direction or the sideward direction of the portable air purifier 50. Thus, even when the portable air purifier 50 is laid down in any direction, a separation space between the first inlet port 570a and the floor may be secured. Therefore, a sufficient air suction passage may be secured irrespective of a state in which the portable air purifier 50 is laid down. In addition, since the first inlet port 570a is formed in a direction close to the rearward direction of the portable air purifier 50, it is possible to prevent an increase in noise of the portable air purifier 50 and degradation in air purification performance thereof.

The rear panel 570 is coupled to the filter case 551 to cover the open rear surface portion of the case 520. The rear panel 570 may be further provided with a rear panel locking portion 575. The rear panel locking portion 575 is provided to firmly mount the rear panel 570 to the rear side of the case 520.

The rear panel locking portion 575 is formed to have a shape protruding from an upper end portion of the rear panel 570. The rear panel locking portion 575 is inserted into the rear panel locking groove 555a provided at the upper portion of the filter case 551 and restricted by the filter case 551.

As an example, the rear panel locking portion 575 may be formed to have a hook shape. The rear panel locking portion 575 may be coupled to the filter case 551 in a hook manner.

In addition, the rear panel 570 may be further provided with a rear cover coupling portion 577. The rear cover coupling portion 577 is provided at a lower end of the rear panel 570 facing the rear cover 580. The rear cover coupling portion 577 is provided for coupling the rear panel 570 and the rear cover 580.

[Structure of Rear Cover]

The portable air purifier 50 of the present embodiment may further include the rear cover 580 disposed behind the case 520 and below the rear panel 570. As an example, the rear cover 580 may be made of the same plastic resin material as the rear panel 570.

The rear cover 580 is disposed behind the case 520 to cover the open rear surface portion of the case 520 together with the rear panel 570. That is, the open rear surface portion of the case 520 is covered by the rear panel 570 at an upper side and the rear cover 580 at a lower side.

According to the present embodiment, the rear panel 570 is a component for shielding a rear side of the first region A of the accommodating space in the case 520, and the rear cover 580 is a component for shielding a rear side of the second region B.

Components related to suction, purification, and discharge of air are disposed in the first region A. That is, the filter module 550 and the fan assemblies 540 and 545 are disposed in the first region A, and thus, air flows in the first region A. Therefore, the plurality of first inlet ports 570a are formed in the rear panel 570 as passages for suctioning air.

Components which are not directly related to an air flow for air purification are disposed in the second region B. That is, the main PCB 595, the battery 560, and the sensor module 600 are disposed in the second region B. The rear cover 580 covers an open rear side of a space in which the components are disposed.

The rear cover 580 is formed to have a shape similar to that of the rear panel 570. That is, the rear panel 570 and the rear cover 580 are provided to be recognized as one member when coupled to each other.

Accordingly, the rear cover 580 may include a plane surface portion 581 and inclined surface portions 583 similar to the rear panel 570. The plane surface portion 581 is disposed at a lateral center portion of the rear cover 580 and is formed as a plane surface parallel to the plane surface portion 571 of the rear panel 570.

The inclined surface portions 583 are disposed at both lateral sides and a lower side of the plane surface portion 581. The inclined surface portion 583 is formed as an inclined surface inclined from the plane surface portion 581 toward the front side of the case 520.

In addition, the rear cover 580 may further include a horizontal surface portion 585. The horizontal surface portion 585 forms a horizontal plane surface at an upper end of the rear cover 580 facing the rear panel 570. That is, a rear surface of the rear cover 580 is formed by the plane surface portion 581, both side surfaces and a lower surface of the rear cover 580 are formed by the inclined surface portions 583, and an upper surface of the rear cover 580 is formed by the horizontal surface portion 585.

In addition, second inlet ports 580a may be formed in the rear cover 580. The second inlet port 580a is formed to pass through the rear cover 580. The second inlet ports 580a form passages connecting the rear side of the case 520, and the battery 560 and the sensor module 600. Outside air may be introduced into the battery 560 and the sensor module 600 in the second region B through the second inlet ports 580a formed as described above.

The rear cover 580 is provided separately from the rear panel 570 and is coupled to the case 520 and the rear panel 570 to shield a rear side of the battery 560. The rear cover 580 may further include a rear panel coupling portion 586 and a case coupling portion 587.

The rear panel coupling portion 586 is provided for coupling the rear panel 570 and the rear cover 580. The rear panel coupling portion 586 is formed to protrude upward from the upper surface of the rear cover, that is, the horizontal surface portion 585 facing the rear panel 570.

The rear panel coupling portion 586 is coupled to the rear cover coupling portion 577 provided at the lower end of the rear panel 570. A lower portion of the rear panel 570 is fixed by the rear panel coupling portion 586 and the rear cover coupling portion 577 being coupled. That is, the rear panel 570 is stably fixed by the coupling of the rear panel locking portion 575 and the filter case 551 formed at the upper portion of the rear panel 570 and the coupling of the rear panel coupling portion 586 and the rear cover coupling portion 577 formed at the lower portion of the rear panel 570.

In the present embodiment, the rear panel coupling portion 586 and the rear cover coupling portion 577 are illustrated as being coupled in a form in which the rear panel coupling portion 586 having a protrusion shape is fitted into a fitting groove formed in an inner side the rear cover coupling portion 577.

The case coupling portion 587 is provided for coupling the rear cover 580 and the case 520. The case coupling portion 587 is inserted into a rear cover coupling groove 520c formed at a rear lower portion of the case 520 and is restricted by the case 520.

As an example, the rear cover coupling groove 520c may be formed to vertically pass through the lower surface portion 527 of the case 520. The case coupling portion 587 may be formed to have a protrusion shape protruding downward from the lower surface of the rear cover 580.

A lower portion of the rear cover 580 may be fixed to the case 520 by the coupling of the case coupling portion 587 and the rear cover coupling groove 520c. That is, a fixing structure of the rear cover 580 may be formed in which an upper portion of the rear cover 580 is fixed to the rear panel 570 and the lower portion of the rear cover 580 is fixed to the case 520. As a result, the rear cover 580 may be stably fixed to the rear side of the case 520, and a fixing structure of the rear panel 570 and the rear cover 580, in which the rear panel 570 and the rear cover 580 mutually support a fixed state, may be provided.

In addition, the rear cover 580 of the present embodiment may further include a battery latch portion 588. The battery latch portion 588 is provided for coupling the rear cover 580 and the battery 560. The battery latch portion 588 is disposed between the rear panel coupling portion 586 at an upper side and the case coupling portion 587 at a lower side. The battery latch portion 588 is inserted into a third coupling portion 564 provided on a rear surface of the battery 560 and is restricted by the battery 560.

In addition, the battery 560 may further include a fourth coupling portion 568. The fourth coupling portion is provided for coupling the rear cover 580 and the battery 560 like the third coupling portion 564. The fourth coupling portion 568 is formed in the form of a structure protruding from a rear surface 561a of the battery case 561 toward the rear cover 580.

Coupling holes are formed to vertically pass through an interior of the fourth coupling portion 568 and the horizontal surface portion 585 of the rear cover 580. In a state in which the coupling holes of the fourth coupling portion 568 and the horizontal surface portion 585 overlap each other, when the fourth coupling portion 568 and the horizontal surface portion 585 are coupled using a certain coupling member, the battery 560 and the rear cover 580 may be coupled.

The battery 560 is in a state of being fixed to the filter case 551 and the fan cover 530 by the coupling of the first coupling portion 562 and the second fan cover coupling portion 554 and the coupling of the second coupling portion 563 and the fourth coupling boss 535b. Therefore, when the battery latch portion 588 is inserted into the third coupling portion 564 and restricted by the battery 560, movement of the rear cover 580 may be restricted such that the rear cover 580 does not deviate in a rearward direction of the case 520.

That is, a fixing structure of the rear cover 580 may be provided in which the upper portion of the rear cover 580 is fixed to the rear panel 570, the lower portion of the rear cover 580 is fixed to the case 520, and a vertical middle portion of the rear cover 580 is restricted by the battery 560. Thus, the rear cover 580 may be more stably fixed.

[Structure of Sensor Module]

The portable air purifier 50 of the present embodiment may further include the sensor module 600. The sensor module 600 is disposed in the accommodation space in the case 520 and is disposed in the second region B. The sensor module 600 is disposed between the battery 560 and the rear cover 580. That is, the battery 560 is disposed in front of the sensor module 600, and the rear cover 580 is disposed behind the sensor module 600.

The sensor module 600 may include various sensors which sense air quality of a periphery of the portable air purifier 50 or an indoor space in which the portable air purifier 50 is disposed. For example, the sensors may include a dust sensor, a gas sensor, and the like. The sensor module 600 may sense air quality using the sensors and transmit sensed information to the main PCB 595 for managing all hardware modules of the portable air purifier 50.

[Component Arrangement Structure of Portable Air Purifier]

Figure 19:
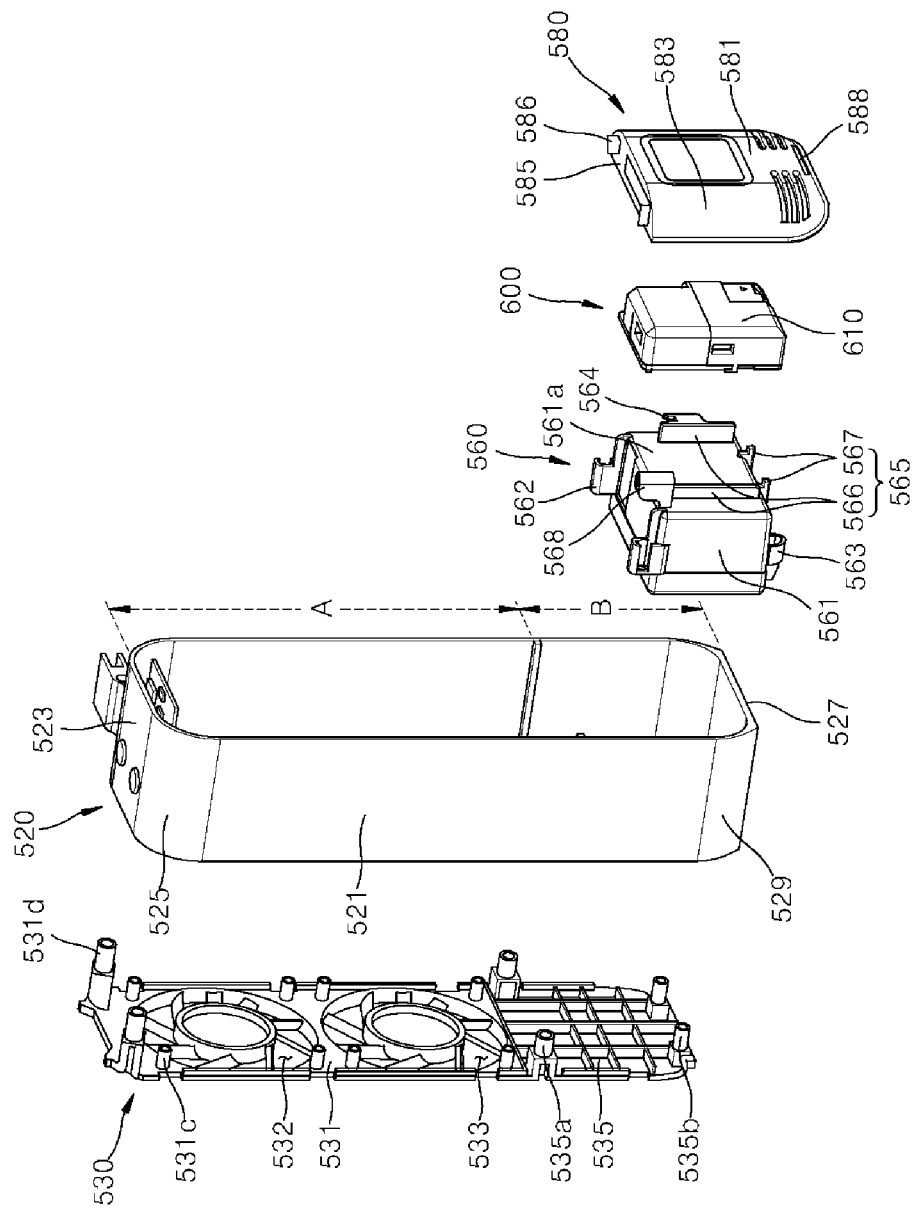
FIG. 19 is an exploded perspective view illustrating a state in which some components of the portable air purifier shown in FIG. 18 are separated.
Figure 20:
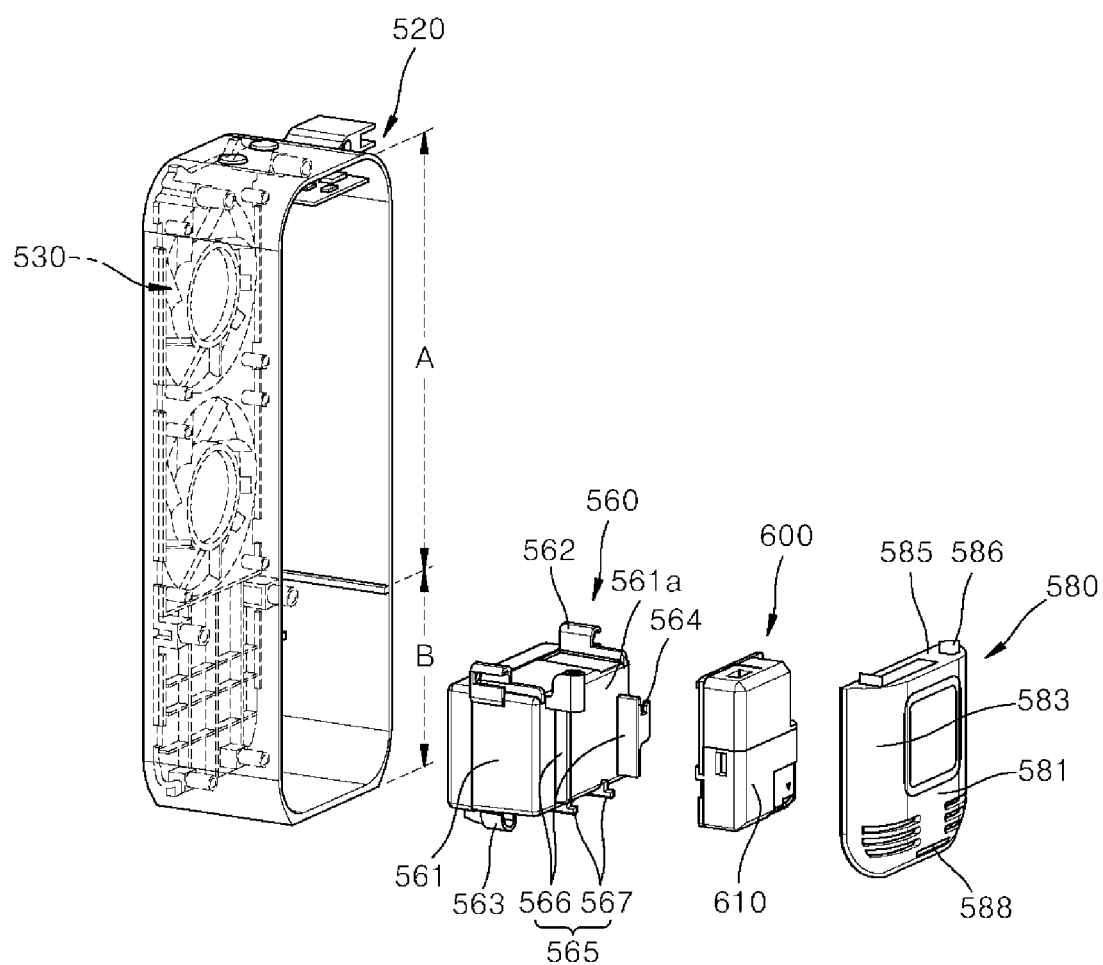
FIG. 20 is a view illustrating a coupled state of a fan cover and a case shown in FIG. 19.
Figure 21:
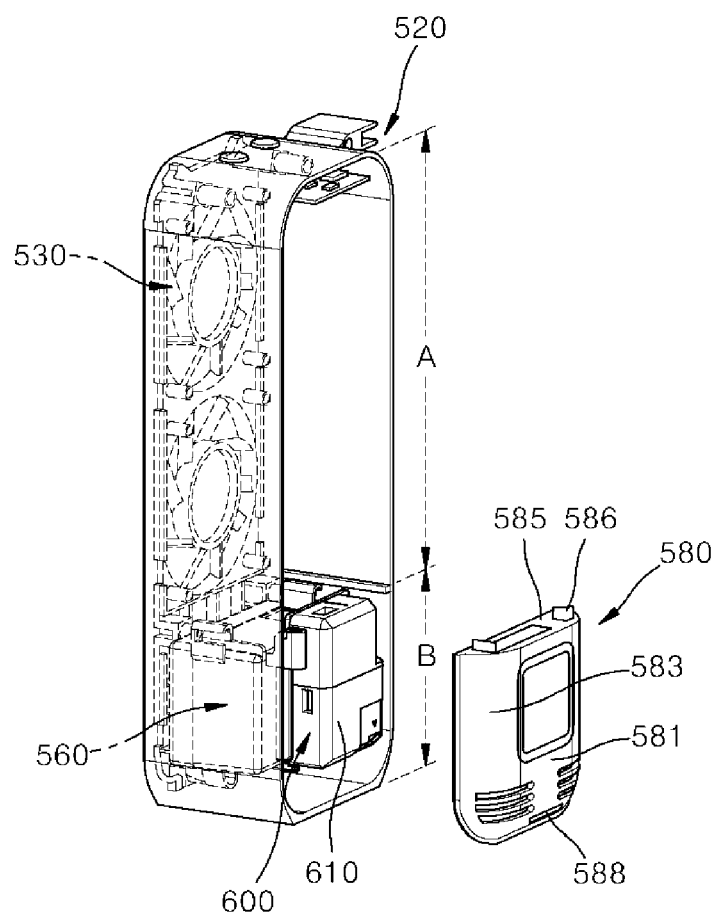
FIG. 21 is a view showing a mounted state of a battery shown in FIG. 20.
Figure 22:
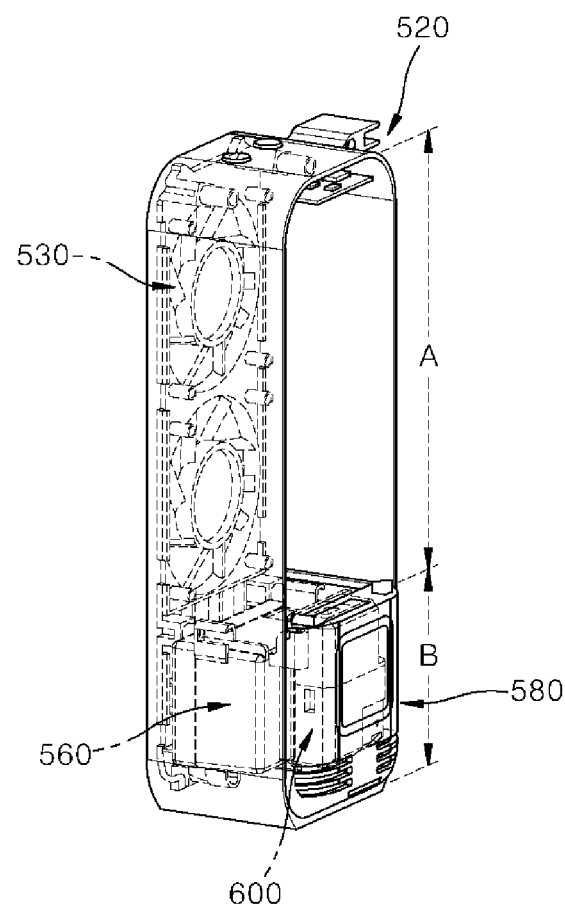
FIG. 22 is a view illustrating a coupled state of the fan cover and a rear cover shown in FIG. 21.
Figure 23:
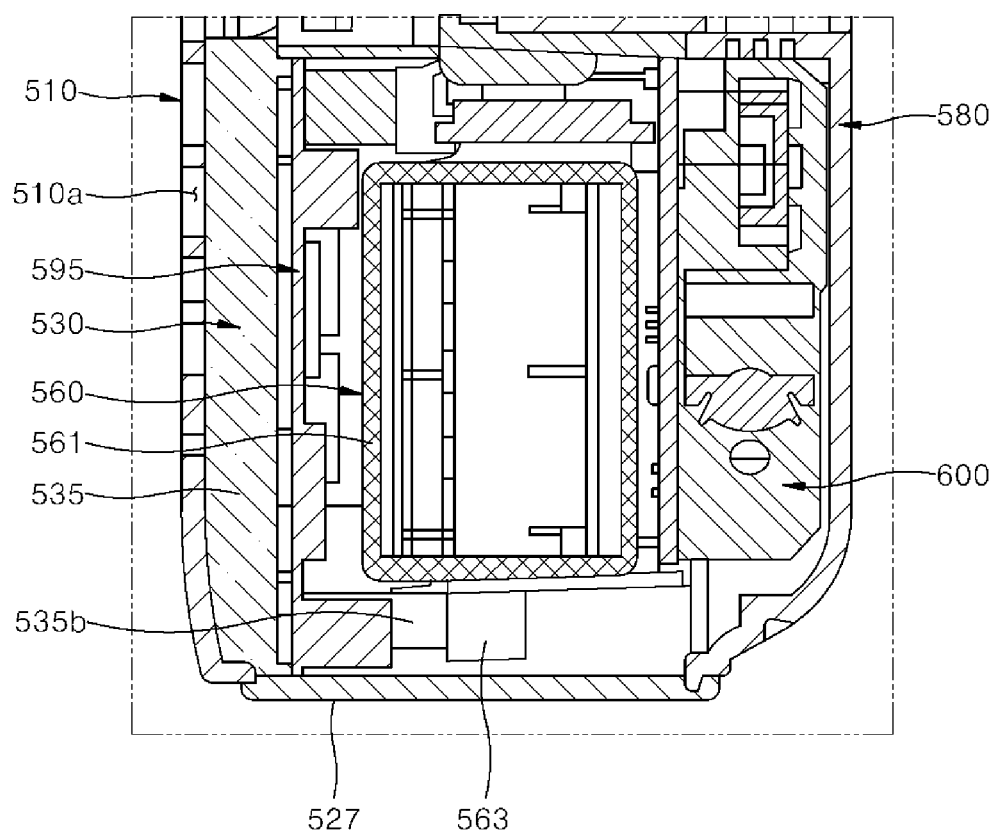
FIG. 23 is an enlarged view illustrating portion "XXIII" of FIG. 18.
Figure 24:
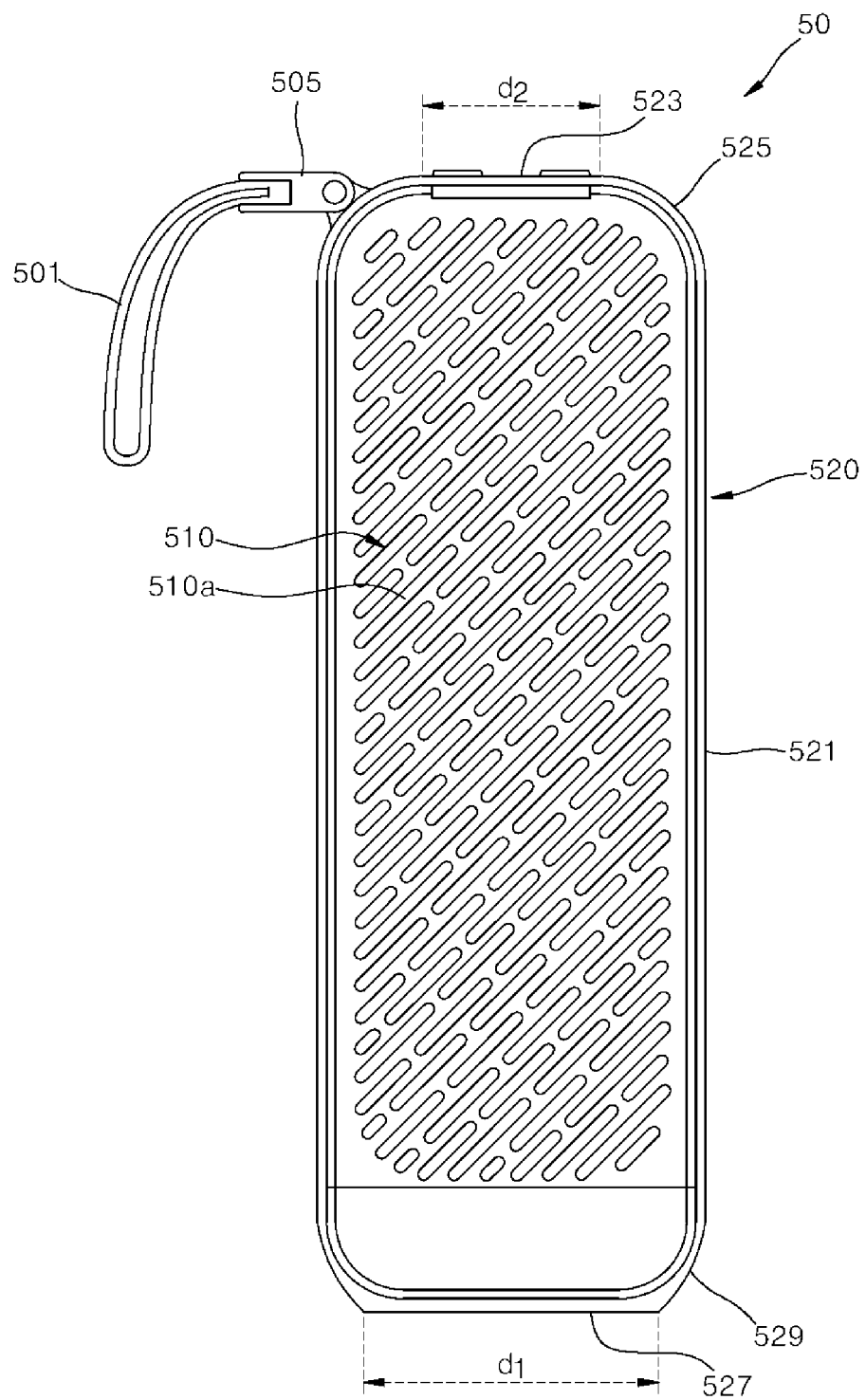
FIG. 24 is a front view illustrating the front surface of the portable air purifier according to the second embodiment of the present invention.
Figure 25:
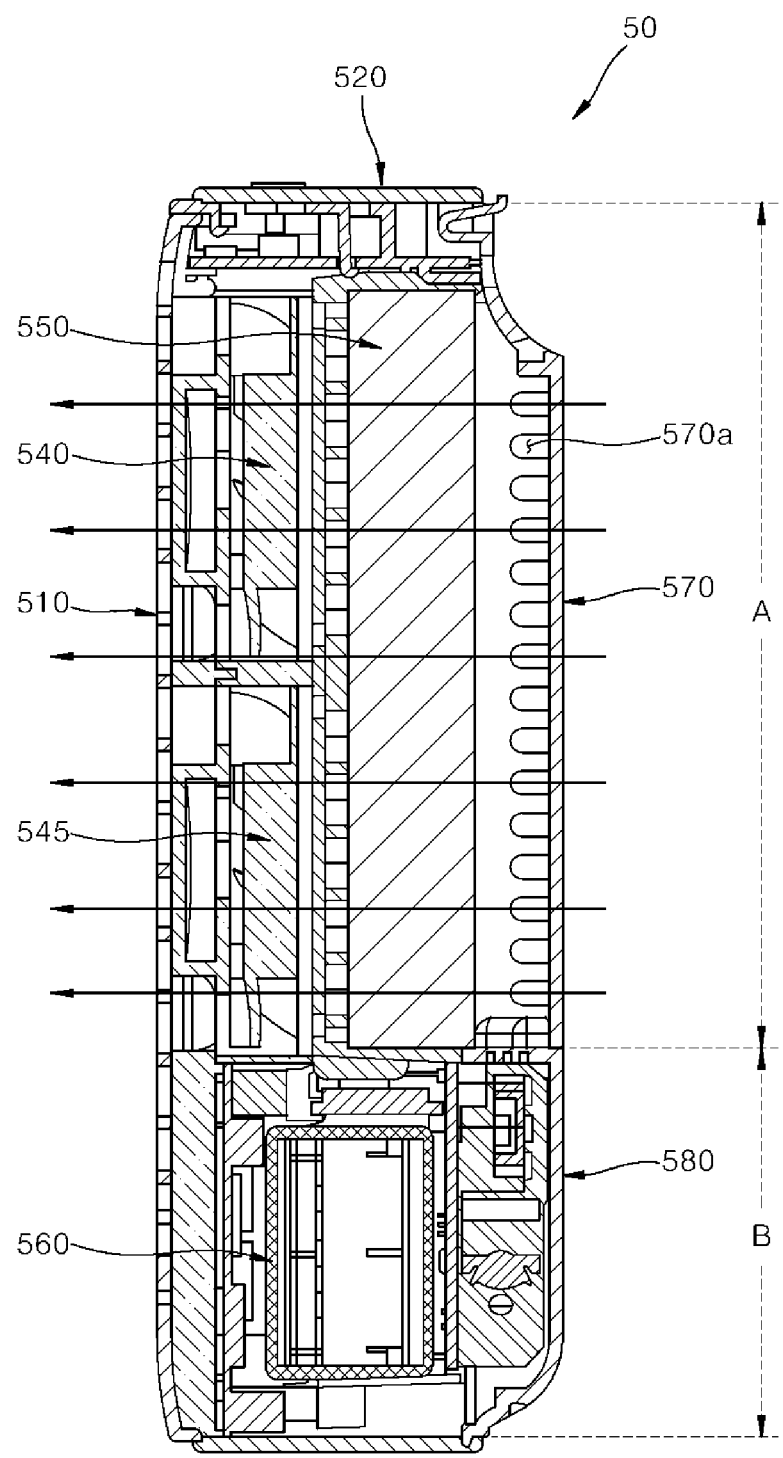
FIG. 25 is a view illustrating an aspect of an air flow of the portable air purifier according to the second embodiment of the present invention.
Figure 26:
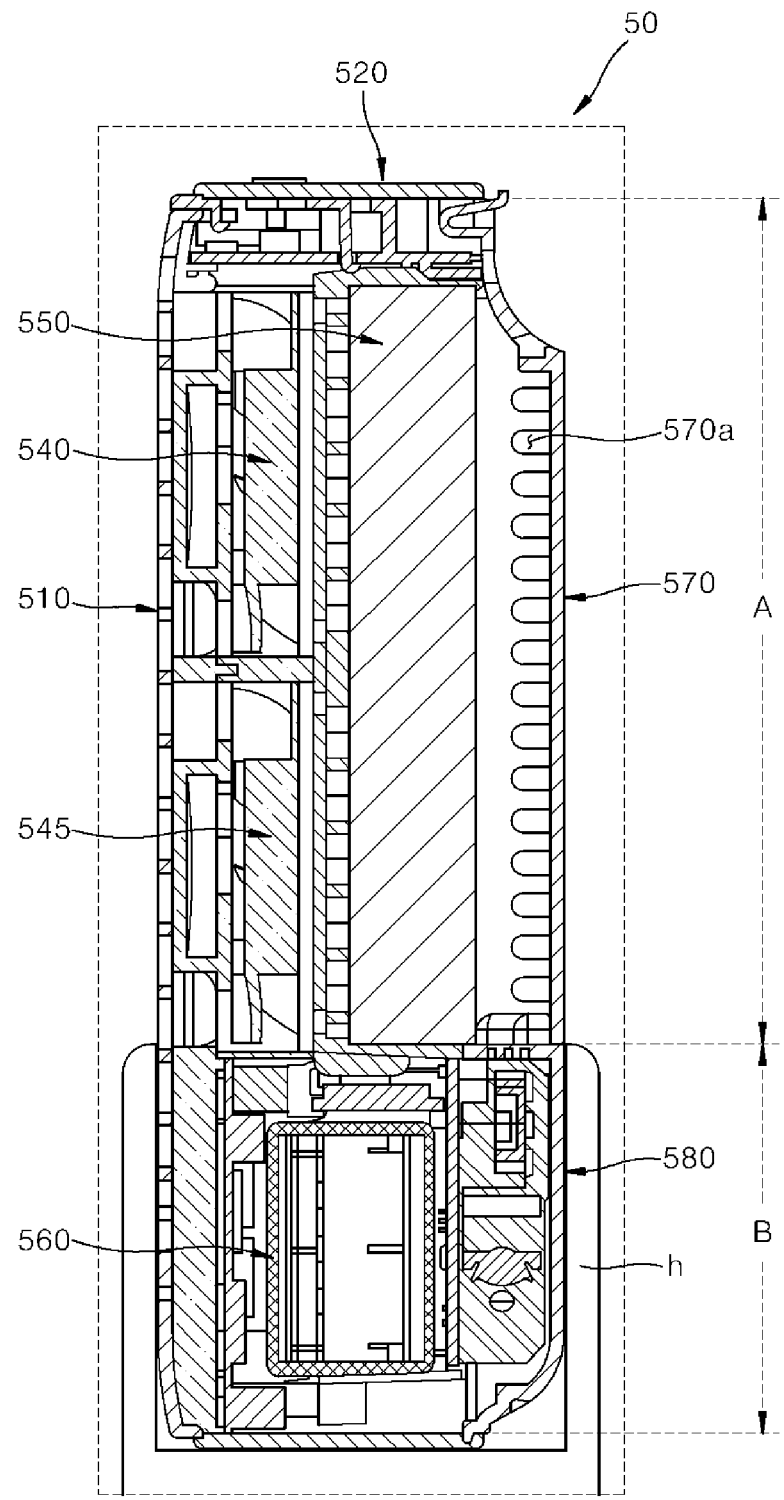
FIG. 26 is a view illustrating a state in which the air purifier shown in FIG. 25 is mounted in a cup holder.

FIG. 19 is an exploded perspective view illustrating a state in which some components of the portable air purifier shown in FIG. 18 are separated, FIG. 20 is a view illustrating a coupled state of the fan cover and the case shown in FIG. 19, and FIG. 21 is a view showing a mounted state of the battery shown in FIG. 20. FIG. 22 is a view illustrating a coupled state of the fan cover and the rear cover shown in FIG. 21, and FIG. 23 is an enlarged view illustrating portion "XXIII" of FIG. 18. FIG. 24 is a front view illustrating the front surface of the portable air purifier according to the second embodiment of the present invention, FIG. 25 is a view illustrating an aspect of an air flow of the portable air purifier according to the second embodiment of the present invention, and FIG. 26 is a view illustrating a state in which the air purifier shown in FIG. 25 is mounted in a cup holder.

First, referring to FIGS. 18 to 23, the accommodation space in the case 520 constituting a framework of the portable air purifier 50 is divided into the first region A at an upper side and the second region B.

The components related to the suction, purification, and discharge of air are disposed in the first region A. That is, the filter module 550 and the fan assemblies 540 and 545 are disposed in the first region A, and thus, air flows in the first region A. Therefore, the plurality of first inlet ports 570a are formed in the rear panel 570 as passages for suctioning air. The fan covers 530 and the front panel 510 are provided with the air discharge portions 532 and 533 and the discharge ports 510a as passages for discharging air purified in the first region A. Paths connecting the first inlet ports 570a, the air discharge portions 532 and 533, and the discharge ports 510a are formed in the first region A.

That is, the first inlet ports 570a, the filter module 550, the fan assemblies 540 and 545, the air discharge portions 532 and 533, and the discharge ports 510a are provided in the first region A. A flow path required for air suctioned into the portable air purifier 50 to pass through an inside of the air purifier 50 is formed in the first region A.

The components which are not directly related to an air flow for air purification are disposed in the second region B. That is, the main PCB 595, the battery 560, and the sensor module 600 are disposed in the second region B. The rear cover 580 covers an open rear side of a space in which the components are disposed.

According to the present embodiment, the case 520 is formed to have a hexahedral shape of which a vertical length is longer than a lateral length. The first region A disposed at an upper side has a vertical length that is greater than that of the second region B disposed at a lower side. That is, when the portable air purifier 50 is vertically stood up, in the case 520, the first region A at an upper side occupies a larger area as compared with the second region B at a lower side.

The lower cover portion 535 of the fan cover 530 is disposed at a foremost side of the second region B. The battery 560 is disposed in the second region B and is disposed behind the lower cover portion 535. The fan assemblies 540 and 545 and the filter module 550 are disposed above the battery 560, and the rear cover 580 is disposed behind the battery 560. The sensor module 600 may be disposed between the battery 560 and the rear cover 580.

That is, an upper boundary surface of the battery 560 is defined by the fan assemblies 540 and 545 and the filter module 550, side and lower boundary surfaces thereof are defined by the side surface portions 521 and the lower surface portion 527 of the case 520, and a rear boundary surface thereof is accommodated in a space defined by the rear cover 580.

According to the present embodiment, the battery 560 is provided as a heavy weight part as compared with the fan assemblies 540 and 545 and the filter module 550. The battery 560 may be provided to have a weight that is greater than a combined weight of the fan assemblies 540 and 545 and the filter module 550.

Typically, since a weight per unit volume of the battery 560 is much greater than a weight per unit volume of the fan assemblies 540 and 545 and the filter module 550, even when the weight or size of the battery 560 is not artificially increased, it is not difficult for the battery 560 to be provided as a heavy weight part as compared with the fan assemblies 540 and 545 and the filter module 550.

That is, even when the battery 560 having a capacity required for normal use of the portable air purifier 50 is applied to the portable air purifier 50, the battery 560 may be naturally provided as a heavy weight part as compared with the fan assemblies 540 and 545 and the filter module 550.

When the battery 560, which is the heavy weight part, is disposed at a lower portion of the portable air purifier 50, the following effects may be provided.

First, when the battery 560, which is the heavy weight part, is disposed at the lower portion of the portable air purifier 50, a center of gravity of the portable air purifier 50 is disposed to be shifted downward from a vertical center of the portable air purifier 50. That is, the center of gravity of the portable air purifier 50 is shifted to the lower portion of the portable air purifier 50, at which the battery 560 is disposed.

As described above, when the center of gravity of the portable air purifier 50 is shifted to the lower portion of the portable air purifier 50, at which the battery 560 is disposed, a risk that the portable air purifier 50 will fall down is decreased when the portable air purifier 50 is vertically stood up.

That is, when the portable air purifier 50 is vertically stood up, the center of gravity of the portable air purifier 50 is positioned at a lower side due to the battery 560 disposed at the lower portion of the portable air purifier 50. Thus, the portable air purifier 50 does not easily fall down.

Meanwhile, according to the portable air purifier 50 of the present embodiment, as shown in FIG. 24, the lower surface portion 527 of the case 520 forms a plane surface having an area that is wider than that of the upper surface portion 523. That is, the lower surface portion 527 forms a plane surface having a lateral length that is greater than that of the upper surface portion 523. In other words, when the lateral length of the lower surface portion 527 is d1 and the lateral length of the upper surface portion 523 is d2, a relationship of d1>d2 is satisfied. The second connection surface portion 529 connecting the lower surface portion 527 and the side surface portion 521 forms a curved surface having an R value that is smaller than that of the first connection surface portion 525.

The lower surface portion 527 of the case 520 is a portion which comes into contact with a floor surface when the portable air purifier 50 is vertically stood up. That is, the lower surface portion 527 is a portion which supports the portable air purifier 50 such that the portable air purifier 50 may maintain a standing posture.

Since the lower surface portion 527 of the case 520 forms a plane surface having an area that is wider than that of the upper surface portion 523, the lower surface portion 527 of the case 520 may more stably support the portable air purifier 50 which is vertically stood up.

That is, due to a combination of a structure in which the battery 560 is disposed at the lower portion of the portable air purifier 50 such that the center of gravity of the portable air purifier 50 is positioned at a lower side and a structure in which the lower surface portion 527 of the case 520, which supports the vertically stood portable air purifier 50, forms a plane surface having an area that is wider than that of the upper surface portion 523, it is possible to effectively suppress the portable air purifier 50 from falling down and to stably maintain a posture of the vertically stood portable air purifier 50.

Second, when the battery 560, which is the heavy weight part, is disposed at the lower portion of the portable air purifier 50, other components constituting the portable air purifier 50, for example, the filter module 550 and the fan assembly 540 and 545, should be disposed above the battery 560. That is, the components related to the suction, purification, and discharge of air should be disposed at a higher level than the battery 560.

In order to secure a charge capacity of the battery 560 required for smooth use of the portable air purifier 50, the battery 560 is required to have a certain size or more. Therefore, an installation space having a certain size or more for installing the battery 560 is required even in the portable air purifier 50. Since it is unreasonable to form a flow path for an air flow in a space in which the battery 560 is installed, the components related to the suction, purification, and discharge of air are inevitably disposed at a position avoiding the battery 560, that is, a position at a higher level than the battery 560.

Due to such an arrangement structure, as shown in FIG. 25, a flow path for suction, purification, and discharge of air in the portable air purifier 50 is formed in the first region A at a higher level than the battery 560. Therefore, the suction of air into the portable air purifier 50 and the discharge of purified air from the portable air purifier 50 are performed at a position at a higher level than a position at which the battery 560 is installed.

As described above, when the discharge of purified air is performed from an upper portion of the portable air purifier 50, it is easier for air purified in the portable air purifier 50 to reach a user's face.

When the portable air purifier 50 is disposed and used on a floor surface at a lower level than the user's face, in order to increase an amount of air purified in the portable air purifier 50 which reaches the user's face, it is advantageous to use the portable air purifier 50 by vertically standing up the portable air purifier 50 rather than horizontally laying down the portable air purifier 50.

To this end, in a case in which the portable air purifier 50 is vertically stood up, when the discharge of the purified air is performed at the upper portion of the portable air purifier 50, an amount of air purified in the portable air purifier 50 which reaches the user's face may be further increased.

According to the present embodiment, since the battery 560 is disposed at the lower portion of the portable air purifier 50, a flow path for suction, purification, and discharge of air in the portable air purifier 50 is performed at a position at a higher level than a position at which the battery 560 is installed. As a result, the discharge of the purified air is also performed at the upper portion of the portable air purifier 50, and thus, an amount of air purified in the portable air purifier 50 which reaches the user's face may be further increased.

That is, due to a structure in which the battery 560 is disposed at the lower portion of the portable air purifier 50, structural stability of the portable air purifier 50 may be improved such that a risk that the portable air purifier 50 will fall down is decreased, and at the same time, an efficient flow path may be formed such that an amount of air purified in the portable air purifier 50, which reaches the user's face, is increased.

Third, due to a structure in which the battery 560 which is the heavy weight part is disposed at the lower portion of the portable air purifier 50 and thus the components related to the suction, purification, and discharge of air are disposed at a higher level than the battery 560, the battery 560 may also contribute to an extension of an installation range of the portable air purifier 50.

As an example, as shown in FIG. 26, when the portable air purifier 50 is used in a state of being inserted into a cup holder h in a vehicle, a region into which air is suctioned and a region from which purified air is discharged may be disposed at a higher level than the cup holder. Accordingly, the portable air purifier 50 may be stably mounted in the vehicle while maintaining a high level of air purification performance. To this end, a vertical length of the second region B in which the battery 560 is disposed may be set to be greater than or equal to a depth of the cup holder h.

As another example, when a lower region of the portable air purifier 50 is fixed using a holder in a type of tongs or the like, even in this case, without blocking a region of the portable air purifier 50 into which air is suctioned and a region thereof from which purified air is discharged, the portable air purifier 50 may be stably fixed.

That is, the components such as the battery 560, which are not directly related to an air flow for air purification, may be disposed at the lower portion of the portable air purifier 50, and the portable air purifier 50 may be mounted and fixed through the lower portion of the portable air purifier 50. Accordingly, the portable air purifier 50 may provide a high level of air purification performance and may be stably fixed at the same time.

[Detailed Structure of Sensor Module]

Figure 27:
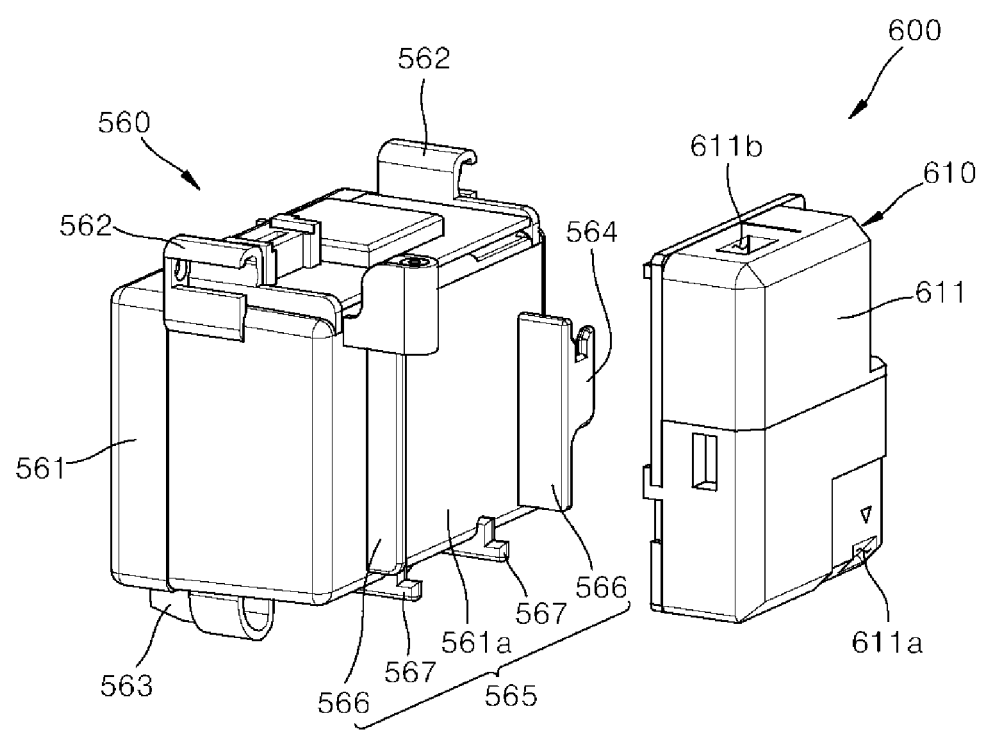
FIG. 27 is an exploded perspective view illustrating a state in which the battery is separated from a sensor module of the portable air purifier according to the second embodiment of the present invention.
Figure 28:
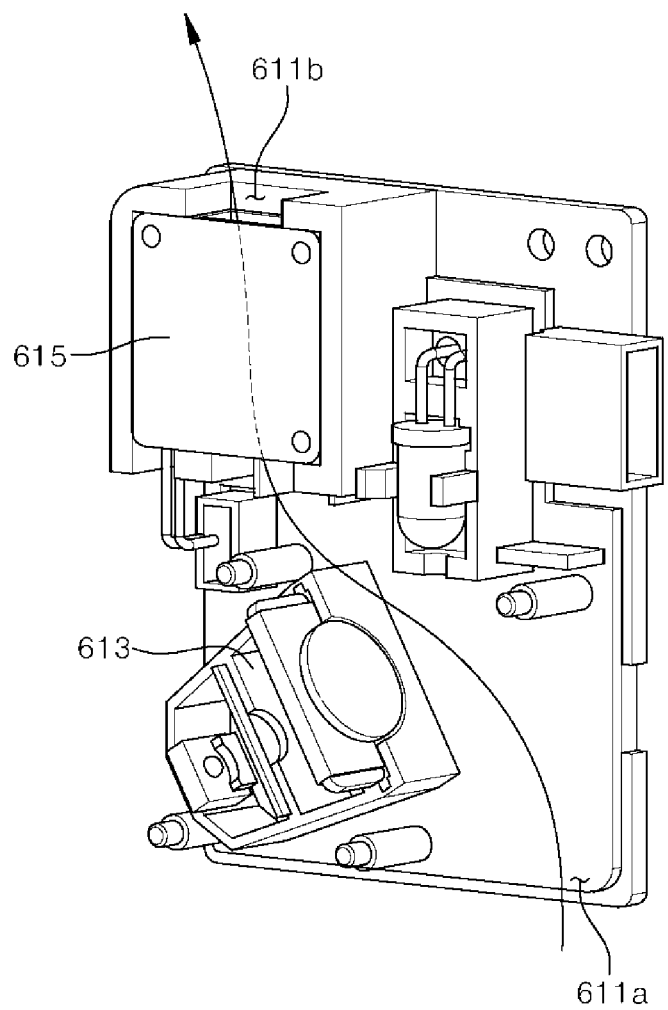
FIG. 28 is a cross-sectional view illustrating an internal structure of the sensor module shown in FIG. 27.

FIG. 27 is an exploded perspective view illustrating a state in which the battery is separated from the sensor module of the portable air purifier according to the second embodiment of the present invention, and FIG. 28 is a cross-sectional view illustrating an internal structure of the sensor module shown in FIG. 27.

Referring to FIGS. 22, 23, 27, and 28, the portable air purifier 50 according to the present embodiment may further include the sensor module 600. The sensor module 600 is disposed in the accommodation space in the case 520 and is disposed in the second region B. The sensor module 600 is disposed between the battery 560 and the rear cover 580 and is installed in rear side of the battery 560.

In the present embodiment, the sensor module 600 is illustrated as including a dust sensor 610. The dust sensor 610 may include a sensing case 611, a sensing unit 613, and a fan 615.

The sensing case 611 constitutes an exterior of the dust sensor 610, and the sensing unit 613 and the fan 615 are accommodated in the sensing case 611. The sensing case 611 is provided with an inlet 611a and an outlet 611b.

The inlet 611a forms a passage through which air outside the dust sensor 610 is introduced into the sensing case 611. The outlet 611b forms a passage through which air introduced into the sensing case 611 is externally discharged from the sensing case 611. In the present embodiment, the inlet 611a is illustrated as being formed in a lower portion of the sensing unit 613, and the outlet 611b is illustrated as being formed in an upper portion of the sensing unit 613.

The sensing unit 613 is accommodated in the sensing case 611. The sensing unit 613 may include a sensor for sensing quality of air introduced into the sensing case 611. For example, the sensing unit 613 may include at least one of a dust sensor and a gas sensor. The sensing unit 613 may sense quality of air using sensors and may transmit sensed information to the main PCB 595 for managing all hardware modules of the portable air purifier 50.

The fan 615 is accommodated in the sensing case 611 together with the sensing unit 613. The fan 615 is operated to form an air current such that outside air is introduced into the sensing case 611 through the inlet 611a and the air introduced into the sensing case 611 is externally discharged from the sensing case 611 through the outlet 611b.

When the air current is formed by the operation of the fan 615, air outside the portable air purifier is introduced into the second region B through the second inlet port 580a. As described above, the air introduced into the second region B is introduced into the sensing case 611 through the inlet 611a.

The air introduced into the sensing case 611 passes through the sensing unit 613 accommodated in the sensing case 611, and thus, the sensing unit 613 senses quality of the air passing through the sensing unit 613 as described above. The air passing through the sensing unit 613 is externally discharged from the dust sensor 610 through the outlet 611b.

In the present embodiment, the fan 615 is illustrated as being disposed between the sensing unit 613 and the outlet 611b. Accordingly, the air introduced into the sensing case 611 through the inlet 611a passes through the fan 615 only after passing through the sensing unit 613. That is, the air introduced into the dust sensor 610 passes through the sensing unit 613 before passing through the fan 615.

A concentration of dust or a gas in the air introduced into the sensing case 611 may be changed while the air passes through the fan 615. Such a phenomenon may be caused due to dust attached to the fan 615 being mixed in the air or dust in the air being attached to the fan 615.

When the air introduced into the sensing case 611 passes through the fan 615 first before moving to the sensing unit 613, a difference in dust or gas concentration between outside air and air passing through the sensing unit 613 occurs. The difference causes degradation in sensing accuracy of the sensing unit 613.

In addition, when the fan 615 is disposed at a position closer to the inlet 611a than the sensing unit 613, the sensing unit 613 should be disposed at a position far from the inlet 611a. In this case, the air introduced into the sensing case 611 may be affected by an environment inside the sensing case 611, which increases a probability that a difference in dust or gas concentration occurs between outside air and air passing through the sensing unit 613. This also causes degradation in sensing accuracy of the sensing unit 613.

In consideration of such a point, in the present embodiment, the fan 615 is disposed between the sensing unit 613 and the outlet 611b, and thus, an air flow is formed in the dust sensor 610 such that the air introduced into the dust sensor 610 passes through the sensing unit 613 first before passing through the fan 615. Therefore, the dust sensor 610 may provide more accurate sensing results.

[Coupling Structure of Battery, Sensor Module, and Filter Module]

Figure 29:
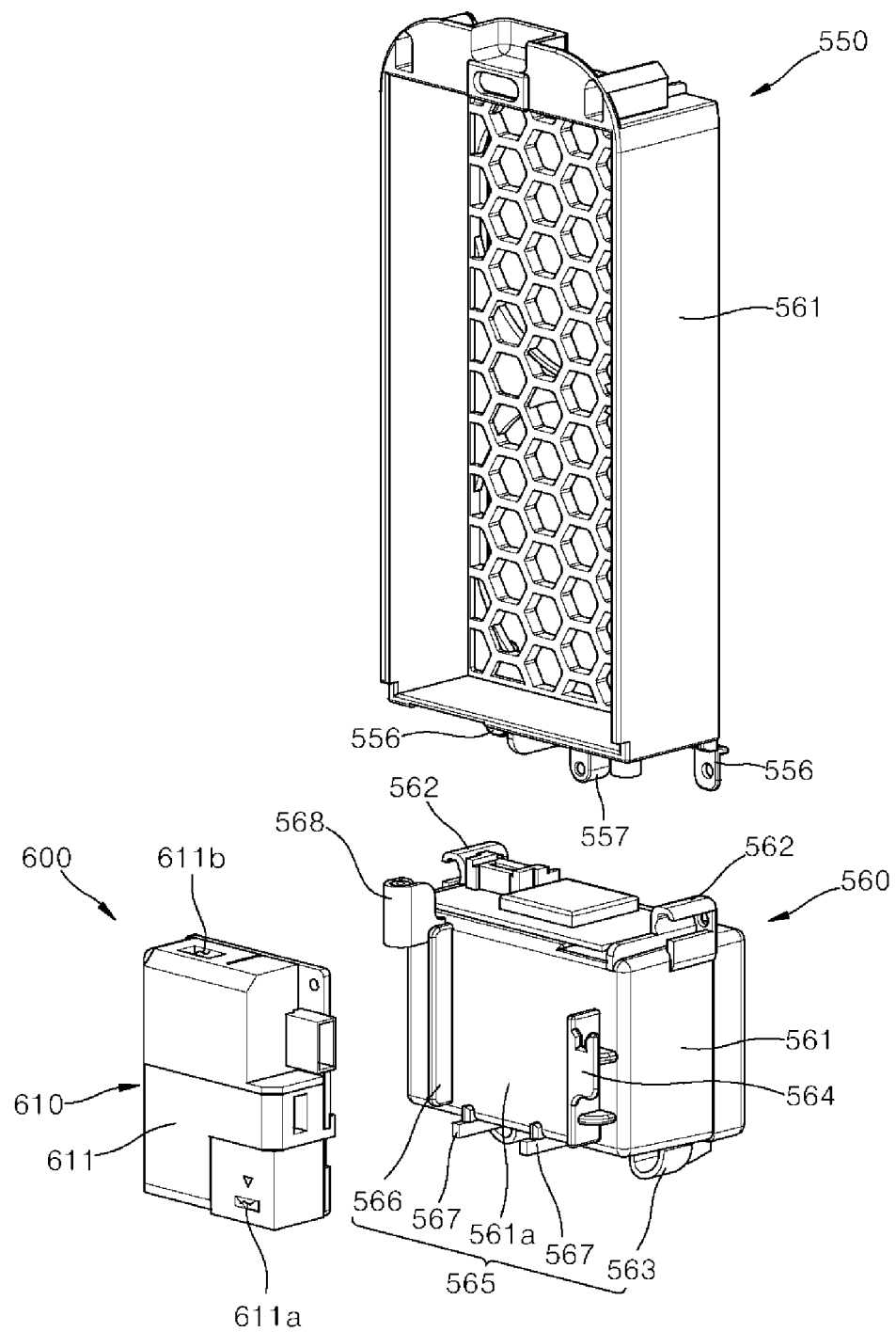
FIG. 29 is an exploded perspective view illustrating a state before a filter module, the battery, and the sensor module of the portable air purifier according to the second embodiment of the present invention are coupled.
Figure 30:
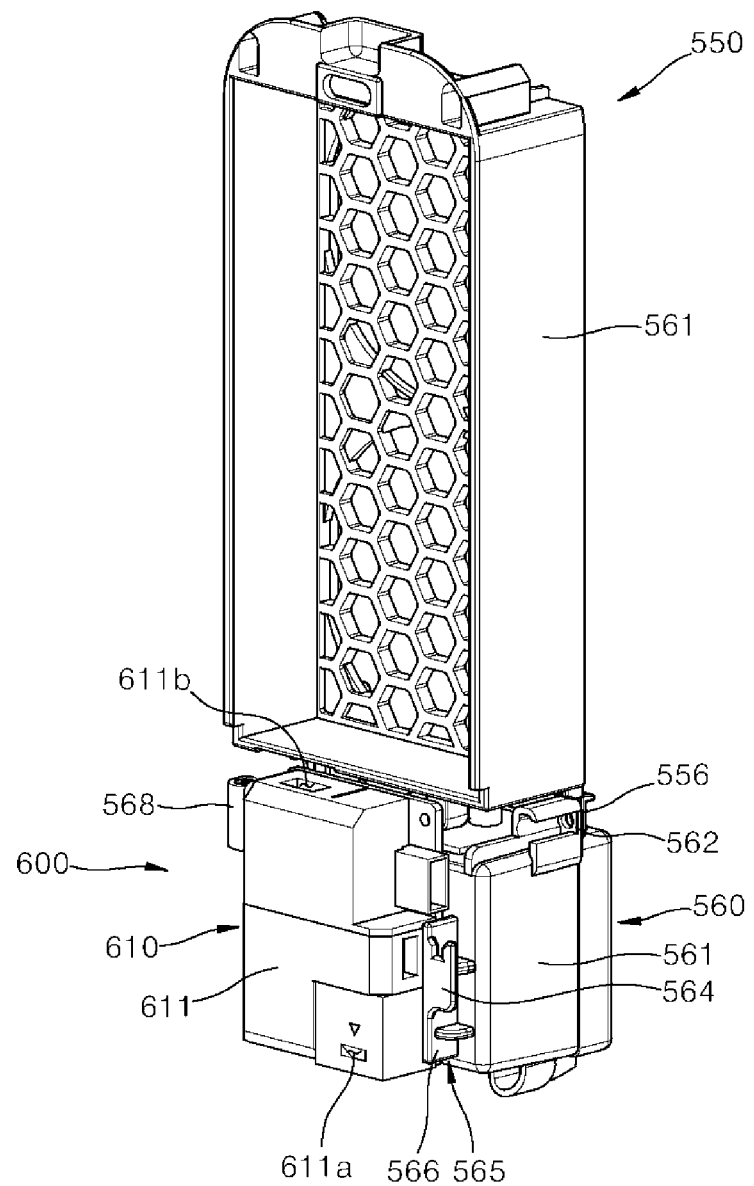
FIG. 30 is a coupled state of the filter module, the battery, and the sensor module shown in FIG. 29.

FIG. 29 is an exploded perspective view illustrating a state before the filter module, the battery, and the sensor module of the portable air purifier according to the second embodiment of the present invention are coupled, and FIG. 30 is view illustrating a coupled state of the filter module, the battery, and the sensor module shown in FIG. 29.

Referring to FIGS. 27 and 29, the battery 560 includes the battery case 561. The battery case 561 forms an exterior of the battery 560 and protects internal components constituting the battery 560.

In the present embodiment, the battery case 561 is illustrated as being formed to have a hexahedral shape. A rear surface 561a of the battery case 561, that is, a surface facing the dust sensor 610 is formed to have a plane surface. A mounting portion 565 is provided on the rear surface 561a of the battery case 561 formed as the plane surface as described above.

The mounting portion 565 is provided to restrict a coupling position between the dust sensor 610 and the battery 560. The mounting portion 565 may include the rear surface 561a of the battery case 561, a first rib 566, and a second rib 567.

The rear surface 561a of the battery case 561 is a component constituting the mounting portion 565 and is in contact with a front surface of the dust sensor 610, more specifically, a front surface of the sensing case 611 to form a vertical support wall which supports the dust sensor 610 in front of the dust sensor 610.

The first rib 566 is formed to protrude rearward from the rear surface 561a of the battery case 561. The mounting portion 565 is provided with a pair of first ribs 566, and the pair of first ribs 566 are disposed to be spaced apart from each other by a width corresponding to a width of the dust sensor 610. The pair of first ribs 566 are in contact with both side surfaces of the sensing case 611 and form vertical support walls which laterally support the dust sensor 610.

The second rib 567 is formed to protrude rearward from the rear surface 561a of the battery case 561 and is disposed below the first rib 566. In the present embodiment, the second rib 567 is illustrated as being formed to have a protrusion shape protruding rearward from a lower portion of the first rib 566. The second rib 567 is disposed below the first rib 566 and between the pair of first ribs 566 when viewed from behind. The second rib 567 provided as described above serves as a structure supporting a lower portion of the dust sensor 610 installed on the rear surface 561a of the battery case 561.

In addition, in the present embodiment, a pair of second ribs 567 are illustrated as being laterally spaced apart from each other by a certain interval below and being disposed between the pair of first ribs 566. However, the present invention is not limited thereto, and the mounting portion 565 may be provided with one second rib 567 or may also be provided with three or more second ribs 567.

In addition, the second rib 567 may also be provided to have a shape which forms a lateral support wall laterally connecting the lower portions of the first ribs 566 in stead of the protrusion shape.

As described above, the mounting portion 565 includes the front vertical support wall formed by the rear surface 561a of the battery case 561, the side vertical support walls formed by the pair of first ribs 566, and a lower support structure formed by the second rib 567.

Due to the mounting portion 565 provided as described above, a coupling position between the dust sensor 610 and the battery 560 may be restricted, and the dust sensor 610 and the battery 560 may be coupled.

When the dust sensor 610 is installed in the mounting portion 565, the front surface of the dust sensor 610 is in contact with the rear surface 561a of the battery case 561, and both side surfaces of the dust sensor 610 are in contact with inner side surfaces of the first ribs 566. A lower surface of the dust sensor 610 is in contact with inner side surfaces of the second ribs 567.

In this case, since the front surface of the dust sensor 610 is in contact with the rear surface 561a of the battery case 561, a front-rear position of the dust sensor 610 are restricted. Since both side surfaces of the dust sensor 610 are in contact with the inner side surfaces of the first ribs 566, a lateral position of the dust sensor 610 is restricted. Since the lower surface of the dust sensor 610 is in contact with the inner surfaces of the second ribs 567, a vertical position of the dust sensor 610 is restricted.

That is, since front-rear, lateral, and vertical coupling positions between the dust sensor 610 and the battery 560 are restricted by the mounting portion 565, the sensor module 600 and the battery 560 may be easily and quickly coupled by simply inserting the dust sensor 610 into the mounting portion 565.

The mounting portion 565 is integrally formed with the battery 560, and more specifically, the battery case 561. Accordingly, among components constituting the mounting portion 565, the rear surface 561a itself of the battery case 561 itself is a part of the battery case 561, and the first rib 566 and the second rib 567 are also structures integrally formed with the battery case 561.

That is, without adding a separate structure such as a bracket for coupling the dust sensor 610 and the battery 560, the dust sensor 610 and the battery 560 may be coupled using the mounting portion 565 formed in the battery 560 itself Due to characteristics of the portable air purifier 50 that should be easy to carry, the portable air purifier 50 may preferably be designed to have a light weight and a small size. To this end, when sizes of the fan assemblies 540 and 545 and the filter module 550 are reduced, air purification performance is inevitably degraded. In addition, when a size of the battery 560 is reduced, an operation time of the portable air purifier 50 is inevitably reduced by as much as the reduced size.

That is, in order to provide the portable air purifier 50 having a small size and light weight as well as high air purification performance, a design is required for efficiently arranging components disposed in the case 520 in a narrow space.

To this end, in the present embodiment, the dust sensor 610 and the battery 560 are coupled using the mounting portion 565 formed in the battery 560 itself. Therefore, without adding a separate structure such as a bracket for coupling the dust sensor 610 and the battery 560, the dust sensor 610 and the battery 560 may be coupled.

When a separate structure for coupling the dust sensor 610 and the battery 560 should be added, a size of an assembly of the dust sensor 610 and the battery 560 is inevitably increased by as much as a size occupied by the separate structure. Therefore, it becomes difficult to efficiently arrange both the sensor module 600 and the battery 560 in a narrow space in the case 120.

In particular, when sizes of the components related to the suction, purification, and discharge of air, that is, the sizes of the fan assemblies 540 and 545 and the filter module 550 are increased in order to increase air purification performance of the portable air purifier 50, a space, which is securable in the case 520 for installing the sensor module 600 and the battery 560, is inevitably reduced by as much as the increased size.

Even so, when the size of the battery 560 is reduced, there is a problem in that an operation time of the portable air purifier 50 is reduced by as much as the reduced size, and the size of the dust sensor 610 being rashly reduced is also not a desirable method. This is because, in the present embodiment, the fan 615 is provided in the dust sensor 610 and considering a size of the fan 615, realizing a design that reduces the size of the dust sensor 610 is not easy.

In consideration of such a point, in the present embodiment, the dust sensor 610 and the battery 560 may be coupled without a separate structure for coupling the dust sensor 610 and the battery 560, and thus, a structure allowing the size of the assembly, in which the battery 560 and the dust sensor 610 are coupled, to be reduced is adopted That is, the dust sensor 610 and the battery 560 may be coupled using the mounting portion 565 formed in the battery 560 itself, and thus, the size of the assembly in which the battery 560 and the dust sensor 610 are combined may be reduced by as much as a size occupied by a separate structure for coupling the dust sensor 610 and the battery 560.

As a result, both the sensor module 600 and the battery 560 may be efficiently disposed in the narrow space in the case 520 without reducing the sizes of the battery 560 and the dust sensor 610, thereby providing the portable air purifier which is capable of providing a high level of air purification performance and also maintaining a compact size.

Referring to FIGS. 29 and 30, the dust sensor 610 is disposed at a lower portion of the battery 560 and is disposed below the filter module 550, and more specifically, below the filter case 551. An upper region of the dust sensor 610 protrudes further upward as compared with the battery case 561 to which the dust sensor 610 is coupled and thus is disposed in a space between the battery 560 and the filter case 551. That is, a portion of the dust sensor 610 protrudes further upward than the battery 560, and the protruding upper region of the dust sensor 610 approaches the filter case 551 at a distance at which the upper region of the dust sensor 610 is almost in contact with the filter case 551.

The sensor coupling portion 557 is provided at a lower portion of the filter case 551 which faces the dust sensor 610. The sensor coupling portion 557 is disposed in a space between the battery 560 and the filter case 551 and is coupled to the upper region of the dust sensor 610.

The sensor coupling portion 557 may be formed to have a protrusion shape protruding downward from a lower surface of the filter case 551. A support surface for supporting the dust sensor 610 in front of the dust sensor 610 is formed on a rear surface of the sensor coupling portion 557, that is, a surface facing the upper region of the dust sensor 610. The support surface is coplanar with the rear surface 561a of the battery case 561.

According to the present embodiment, most of the front surface of the dust sensor 610 is in contact with the rear surface 561a of the battery case 561, and a partial region of the dust sensor 610 which is not in contact with the battery case 561, that is, the upper region of the dust sensor 610 protruding above the battery case 561, is in contact with the support surface formed on the rear surface of the sensor coupling portion 557. That is, the rear surface 561a of the battery case 561 and the rear surface of the sensor coupling portion 557 together become the support surface for supporting the dust sensor 610 in front of the dust sensor 610.

The upper region of the dust sensor 610 and the sensor coupling portion 557 may be coupled using a coupling member. Accordingly, the dust sensor 610 and the filter module 550 are coupled. As described above, the dust sensor 610 coupled to the filter module 550 is fitted into and coupled to the mounting portion 565 and coupled to the battery 560. The battery 560 is coupled to the filter module 550 through the coupling of the first coupling portion 562 and the second fan cover coupling portion 554.

That is, the coupling of the filter module 550 and the battery 560, the coupling of the battery 560 and the dust sensor 610, and the coupling of the dust sensor 610 and the filter module 550 are performed together. As described above, due to the couplings between the filter module 550, the battery 560, and the dust sensor 610 being performed to complement each other, coupling stability between the battery 560 and the dust sensor 610 may be further improved.

In addition, the filter case 551 may be provided with a pair of battery coupling portions. In the present embodiment, a pair of second fan cover coupling portions 554 are illustrated as serving as the pair of battery coupling portions. The pair of second fan cover coupling portions 554 are disposed to be laterally spaced apart from each other by a certain interval. In this case, the pair of second fan cover coupling portions 554 are spaced apart from each other by a distance that is greater than a length of the dust sensor 610 in a width direction thereof. That is, the pair of second fan cover coupling portions 554 are laterally disposed outside the dust sensor 610 when viewed from behind. In addition, a pair of first coupling portions 562 are also provided and disposed at positions corresponding to the second fan cover coupling portions 554.

The sensor coupling portion 557 is disposed between the pair of second fan cover coupling portions 554. Accordingly, the coupling of the first coupling portion 562 and the second fan cover coupling portion 554 and the coupling of the upper region of the dust sensor 610 and the sensor coupling portion 557 may be performed together, and the coupling portions may be disposed such that interference does not occur between the coupling portions.

[Cooling Structure of Battery]

Referring to FIGS. 23 and 28, the fan 615 is provided in the dust sensor 610. The fan 615 is operated to form an air current such that outside air is introduced into the sensing case 611 through the inlet 611a and the air introduced into the sensing case 611 is externally discharged from the sensing case 611 through the outlet 611b.

When the air current is formed by the operation of the fan 615, air outside the portable air purifier is introduced into the second region B through the second inlet port 580a. In this case, a portion of the air introduced into the second region B is introduced into the sensing case 611 through the inlet 611a, and the rest thereof flows around the dust sensor 610 and the battery 560.

That is, by the above-described operation of the fan 615, an air current in which air passes through an interior of the dust sensor 610 and an air current in which air flows around the dust sensor 610 and the battery 560 may be guided together.

The air flowing around the dust sensor 610 and the battery 560 may come into contact with the battery 560. As described above, the air in contact with the battery 560 serves to cool the battery 560 heated during operation of the portable air purifier.

The air, which is introduced into the dust sensor 610 due to a current passing through the dust sensor 610, is externally discharged from the dust sensor 610 through the outlet 611b. As described above, the air externally discharged from the dust sensor 610 may also come into contact with the battery 560, and thus, a cooling action with respect to the battery 560 may occur.

That is, due to a structure in which the dust sensor 610 and the battery 560 are coupled using the mounting portion 565 in order to efficiently arrange both the dust sensor 610 and the battery 560 in the narrow space in the portable air purifier, it is possible to obtain an effect of securing a space for efficiently arranging both the dust sensor 610 and the battery 560 and to also obtain an effect of suppressing an excessive temperature rise of the battery 560.

[Overall Structure of Mounting Device]

Figure 31:
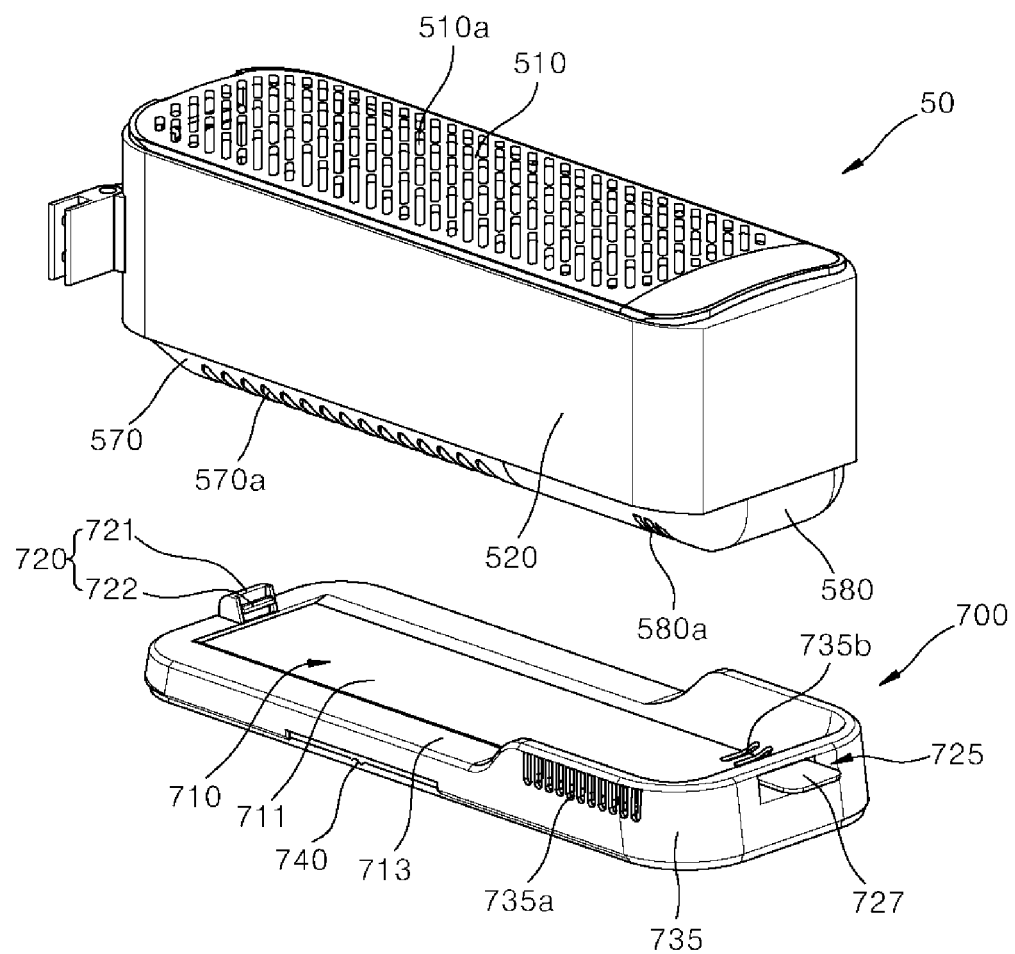
FIG. 31 is a perspective view illustrating a state in which the portable air purifier according to the second embodiment of the present invention is separated from a mounting device.
Figure 32:
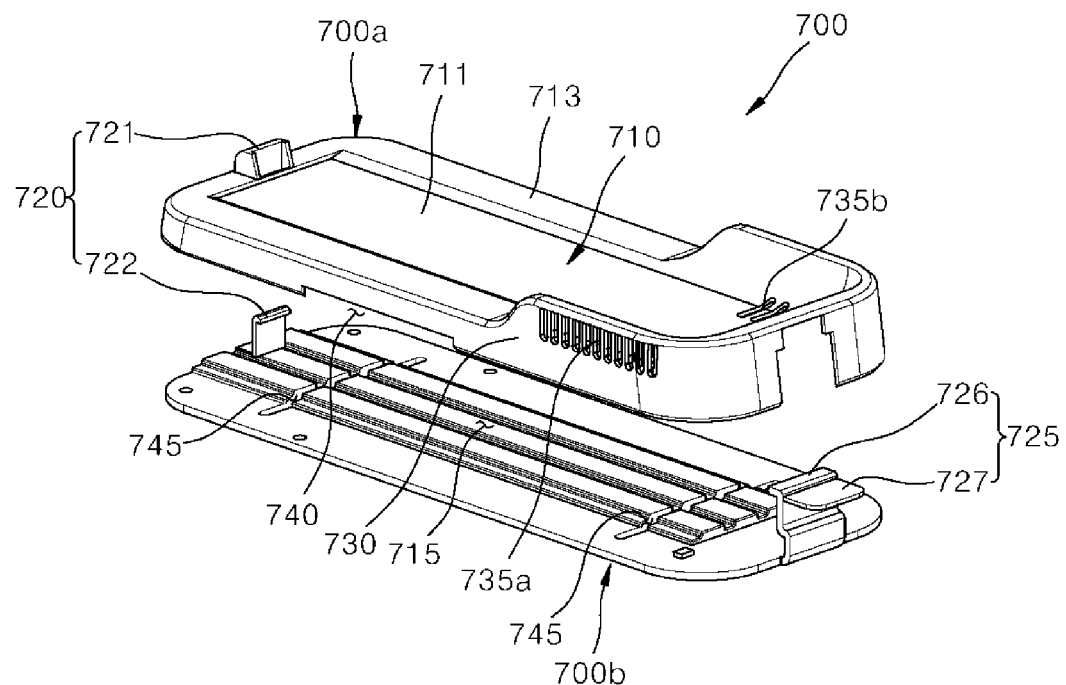
FIG. 32 is a perspective view illustrating the mounting device shown in FIG. 31.

FIG. 31 is a perspective view illustrating a state in which the portable air purifier according to the second embodiment of the present invention is separated from a mounting device, and FIG. 32 is a perspective view illustrating the mounting device shown in FIG. 31.

Referring to FIGS. 31 and 32, the portable air purifier 50 of the present embodiment may be coupled to a mounting device 700 to constitute one air purifier. The mounting device 700 performs a function of fixing the portable air purifier 50. The portable air purifier 50 may be mounted on the mounting device 700 and fixed at a position desired by a user.

According to the present embodiment, the mounting device 700 may include a support portion 710, fixing portions 720 and 725, and a protrusion 730.

The support portion 710 constitutes an external framework of the portable air purifier 50. The support portion 710 supports most region of the rear surface of the portable air purifier 50. In the present embodiment, the support portion 710 is illustrated as being formed to have a rear shape of the portable air purifier 50, for example, a rectangular plate shape.

A seating surface 711 is formed at one side of the support portion 710, that is, at a side facing the rear surface of the portable air purifier 50. The rear surface of the portable air purifier 50, that is, the rear panel 570 and the rear cover 580 is seated on the seating surface 711.

In addition, the support portion 710 may further include a support wall 713. The support wall 713 is provided to have a shape surrounding an edge of the seating surface 711 and is formed to protrude from the seating surface 711. The support wall 713 is formed to protrude in a direction toward the portable air purifier 50 mounted on the mounting device 700, for example, a direction orthogonal to a plane surface formed by the seating surface 711.

As a result, the seating surface 711 may be formed in the form of a seating groove recessed in an inner side surrounded by the support wall 713. The rear surface of the portable air purifier 50 is mounted on the support portion 710 in a form in which a portion thereof is inserted into the above-described seating groove. As described above, a position of the portable air purifier 50 mounted on the support portion 710 is restricted by the seating surface 711 and the support wall 713, and thus, the portable air purifier 50 may be stably mounted on the support portion 710 without shaking.

The fixing portions 720 and 725 are components provided to detachably fix the portable air purifier 50, of which the rear surface is mounted on the seating surface 711, to the support portion 710. Structures of the fixing portions 720 and 725 will be described in detail below.

The protrusion 730 protrudes from the support portion 710 to have a shape surrounding the rear cover 580. The protrusion 730 may restrict a lateral position of the portable air purifier 50 mounted on the mounting device 700 so that the portable air purifier 50 may be more stably mounted on the mounting device 700.

Terms will be defined. The term "upper portion of the mounting device 700" refers to a portion of the mounting device 700 at which the upper portion of the portable air purifier 50 is positioned when the portable air purifier 50 is mounted on the mounting device 700. The term "lower portion of the mounting device 700" refers to a portion of the mounting device 700 at which the lower portion of the portable air purifier 50 is positioned when the portable air purifier 50 is mounted on the mounting device 700. In addition, the term "forward from the mounting device 700" refers to a direction toward the front side of the portable air purifier 50 when the portable air purifier 50 is mounted on the mounting device 700.

In the present embodiment, the protrusion 730 is illustrated as being disposed at the lower portion of the mounting device 700. The protrusion 730 protrudes toward the front side of the mounting device 700 from the support portion 710 and is formed to have a shape surrounding the lower portion and two side portions of the rear cover 580.

[Coupling Structure of Portable Air Purifier and Mounting Device]

The fixing portions 720 and 725 are the components provided to detachably fix the portable air purifier 50, of which the rear surface is mounted on the seating surface 711, to the support portion 710. In the present embodiment, the fixing portions 720 and 725 are illustrated as including a first fixing portion 720 and a second fixing portion 725.

The first fixing portion 720 and the second fixing portion 725 are disposed at the upper portion and the lower portion of the mounting device 700, respectively. In the present embodiment, the first fixing portion 720 is illustrated as being disposed at the upper portion of the mounting device 700, and the second fixing portion 725 is illustrated as being disposed at the lower portion of the mounting device 700.

The first fixing portion 720 is coupled to the upper portion of the portable air purifier 50 to fix the upper portion of the portable air purifier 50 to the support portion 710. The first fixing portion 720 may include an upper protrusion 721 and a fitting protrusion 722.

The upper protrusion 721 is disposed at the upper portion of the mounting device 700 and is formed to protrude from the support wall 713 toward the front side of the mounting device 700. The fitting protrusion 722 is formed to protrude toward the lower portion of the mounting device 700 from which the upper protrusion 721 protrudes. The fitting protrusion 722 is disposed at the upper portion of the mounting device 700 and is spaced a certain interval from the seating surface 711 toward the front side of the mounting device 700.

Meanwhile, an upper fitting portion 577 (see FIG. 16) is provided in the rear surface of the portable air purifier 50. In the present embodiment, the upper fitting portion 577 is illustrated as being formed in the rear panel 570. The upper fitting portion 577 is formed at a position adjacent to the rear panel locking portion 575 provided at the upper portion of the rear panel 570.

The upper fitting portion 577 is formed to pass through the rear panel 570. A curved portion (not shown) is formed at the upper portion of the rear panel 570 to connect the upper end of the rear panel 570 and the plane surface portion 571 of the rear panel 570 in the form of a concave curved surface. The upper fitting portion 577 is formed to pass through the curved portion to form a hole vertically passing through the rear panel 570.

The fitting protrusion 722 may be fitted into and coupled to the upper fitting portion 577. The upper portion of the portable air purifier 50 may be detachably coupled to the mounting device 700 by the fitting protrusion 722 being fitted into and coupled to the upper fitting portion 577.

The second fixing portion 725 is coupled to the lower portion of the portable air purifier 50 to detachably fix the lower portion of the portable air purifier 50 to the support portion 710. The second fixing portion 725 may include a hook portion 726 and an operation portion 727.

The hook portion 726 is disposed at the lower portion of the mounting device 700. In the present embodiment, the hook portion 726 is illustrated as being formed to have a hook shape protruding in a direction toward the upper portion of the mounting device 700 in the protrusion 730 to be described below.

The operation portion 727 is disposed at the lower portion of the mounting device 700. When the hook portion 726 is disposed in the inner side of the mounting device 700 surrounded by the support portion 710 and the protrusion 730, the operation portion 727 is disposed outside the mounting device 700. The operation portion 727 passes through the protrusion 730 and is connected to the hook portion 726.

Meanwhile, a lower fitting portion 589 (see FIG. 16) is provided in the rear surface of the portable air purifier 50. In the present embodiment, the lower fitting portion 589 is illustrated as being formed in the rear cover 580. The lower fitting portion 589 is formed at a position adjacent to the hook portion 726 provided at the lower portion of the rear cover 580.

The lower fitting portion 589 is formed to pass through the rear cover 580, more specifically, the inclined surface portion 583 disposed at the lower portion of the rear cover 580. The inclined surface portion 583 disposed at the lower portion of the rear cover 580 is formed as an inclined surface inclined toward the front side of the case 520 from the plane surface portion 581. The lower fitting portion 589 is formed to pass through the inclined surface portion 583 to form a hole vertically passing through the rear cover 580.

The hook portion 726 of the second fixing portion 725 may be fitted into and coupled to the lower fitting portion 589. The lower portion of the portable air purifier 50 may be detachably coupled to the mounting device 700 by the hook portion 726 being fitted into and coupled to the lower fitting portion 589.

The hook portion 726 may be made of an elastically deformable material. Accordingly, a shape of the hook portion 726 may be changed as the hook portion 726 comes into contact with the rear cover 580 and is pressed by the rear cover 580. When positions of the hook portion 726 and the lower fitting portion 589 are aligned with each other in a state in which the hook portion 726 is pressed by the rear cover 580, the hook portion 726 may be fitted and coupled to the lower fitting portion 589. A fitted and coupled state of the hook portion 726 and the lower fitting portion 589 may be stably maintained by an elastic force of the hook portion 726.

That is, by simply pushing the lower portion of the portable air purifier 50 toward the mounting device 700, the hook portion 726 may be fitted into and coupled to the lower fitting portion 589, and the fitted and coupled state of the hook portion 726 and the lower fitting portion 589 may be maintained as long as an external force is not applied.

In addition, the hook portion 726 is connected to the operation portion 727 and interlocked with movement of the operation portion 727. That is, when the operation portion 727 is pressed toward the rear side of the mounting device 700 by an operation of a user, the hook portion 726 is lifted toward the front side of the mounting device 700 by the operation portion 727, and thus, the hook portion 726 fitted into and coupled to the lower fitting portion 589 is in a state capable of being separated from the lower fitting portion 589.

Due to the fitting coupling of the first fixing portion 720 and the upper fitting portion 577 and the fitting coupling of the second fixing portion 725 and the lower fitting portion 589, the portable air purifier 50 and the mounting device 700 may be detachably coupled.

The portable air purifier 50 and the mounting device 700 may be detachably coupled in the following form.

First, the fitting protrusion 722 of the first fixing portion 720 provided in the mounting device 700 is fitted into the upper fitting portion 577 formed in the upper portion of the portable air purifier 50. Accordingly, the upper portion of the portable air purifier 50 is fixed to the upper portion of the mounting device 700.

When the upper portion of the portable air purifier 50 is fixed to the mounting device 700, the lower portion of the portable air purifier 50 is moved toward the mounting device 700. Accordingly, the lower fitting portion 589 provided at the lower portion of the portable air purifier 50 approaches the hook portion 726 of the second fixing portion 725 provided at the lower portion of the mounting device 700.

When the lower portion of the portable air purifier 50 is pushed toward the mounting device 700 in a state in which the lower fitting portion 589 approaches the hook portion 726, the hook portion 726 is fitted into and coupled to the lower fitting portion 589. Accordingly, the lower portion of the portable air purifier 50 is fixed to the lower portion of the mounting device 700, and thus, the portable air purifier 50 and the mounting device 700 are detachably coupled.

When the portable air purifier 50 mounted on the mounting device 700 as described above is to be detached from the mounting device 700, the operation portion 727 of the second fixing portion 725 is pressed, and the lower portion of the portable air purifier 50 is simply lifted toward the front side of the portable air purifier 50.

That is, the portable air purifier 50 may be stably mounted on the mounting device 700 by simply pushing the portable air purifier 50 toward the mounting device 700, and the portable air purifier 50 may be easily and quickly detached by pressing the operation portion 727 and simply lifting the lower portion of portable air purifier 50 toward the front side of the portable air purifier 50.

Meanwhile, a first through-hole 740 and a second through-hole 745 may be formed in the mounting device 700 of the present embodiment. The first through-hole 740 and the second through-hole 745 are formed for the purpose of inserting a fixing band (not shown) or the like, which fixes the mounting device 700 to an object, into the mounting device 700.

The first through-hole 740 is formed to laterally pass through the support wall 713 of the mounting device 700. In the mounting device 700, a pair of first through-holes 740 are disposed to laterally face each other. Through the pair of first through-holes 740 formed as described above, the fixing band may laterally pass through the mounting device 700 and may be fitted into the mounting device 700. As described above, the fixing band fitted into the mounting device 700 may be used to fix the mounting device 700 to an arm-rest of a vehicle or the like.

The second through-hole 745 is formed to vertically pass through a rear surface of the mounting device 700. In the mounting device 700, a pair of second through-holes 745 are formed to be spaced apart from each other by a certain interval in a front-rear direction. Through the pair of second through-holes 745 formed as described above, the fixing band may be fitted into the rear surface of the mounting device 700. As described above, the fixing band fitted into the mounting device 700 may be used to fix the mounting device 700 to a head-rest of a vehicle or the like.

[Air Suction Structure of Portable Air Purifier Mounted on Mounting Device]

Figure 33:
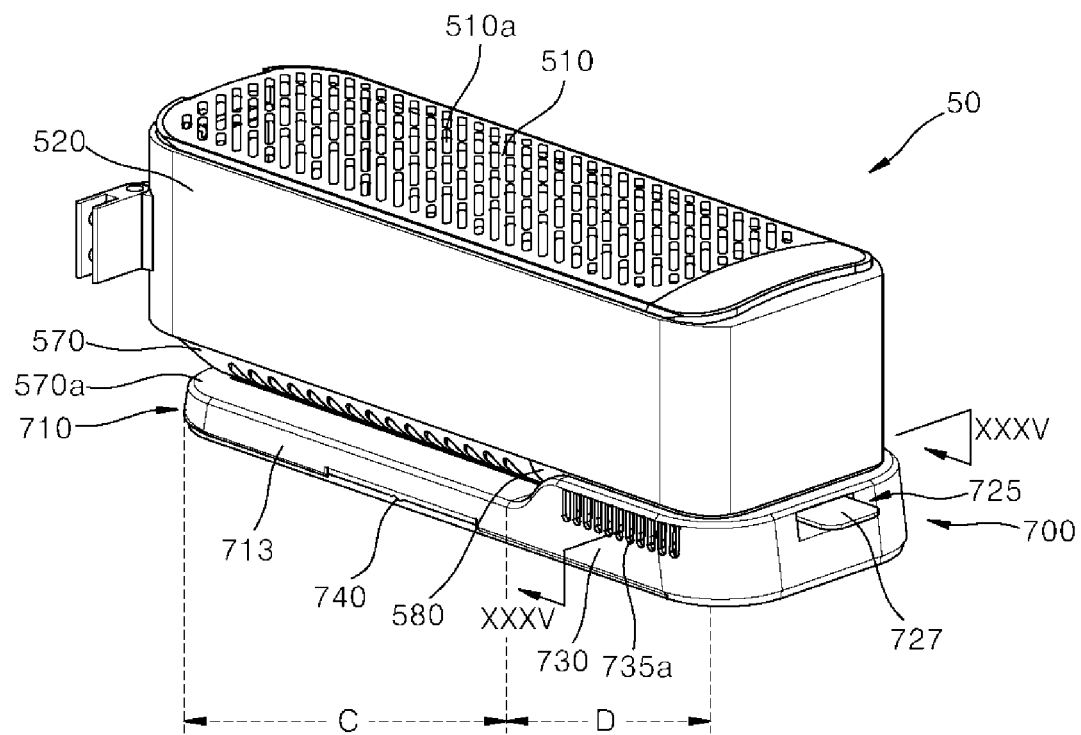
FIG. 33 is a perspective view illustrating a coupled state of the portable air purifier and the mounting device shown in FIG. 31.
Figure 34:
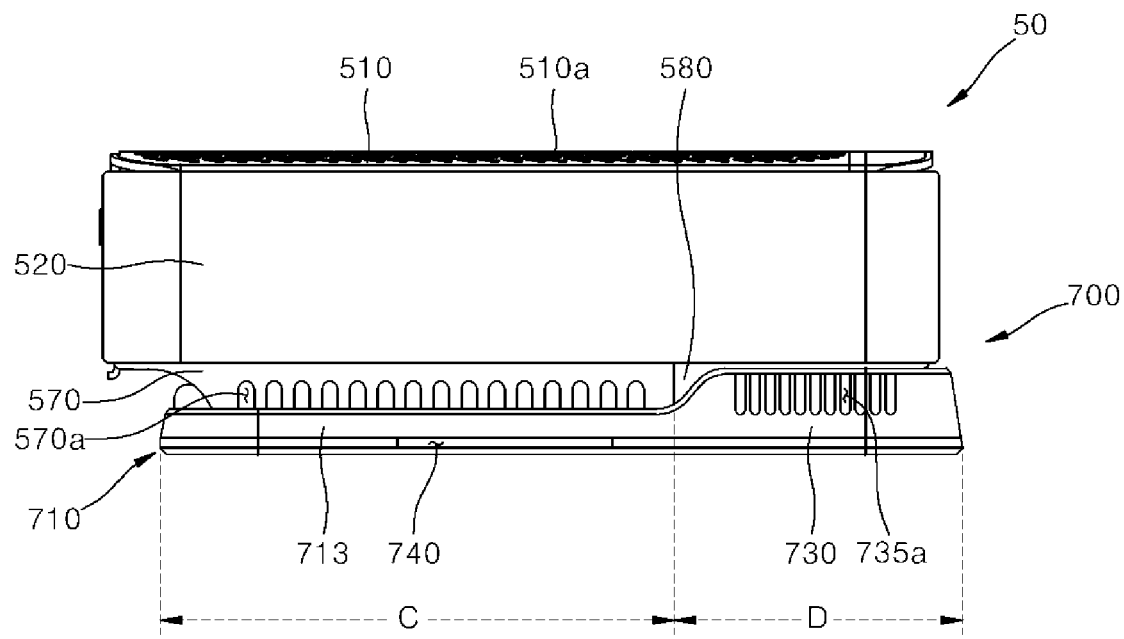
FIG. 34 is a side view illustrating a coupled state of the portable air purifier and the mounting device shown in FIG. 33.
Figure 35:
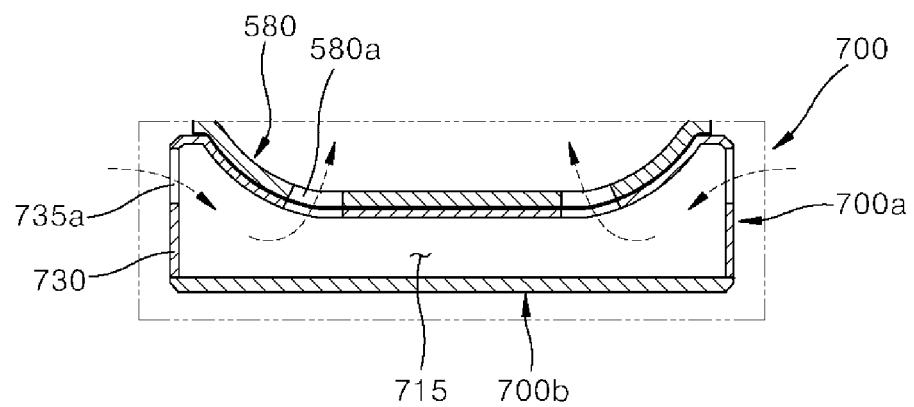
FIG. 35 is a cross-sectional view taken along line "XXXV-XXXV" of FIG. 33.
Figure 36:
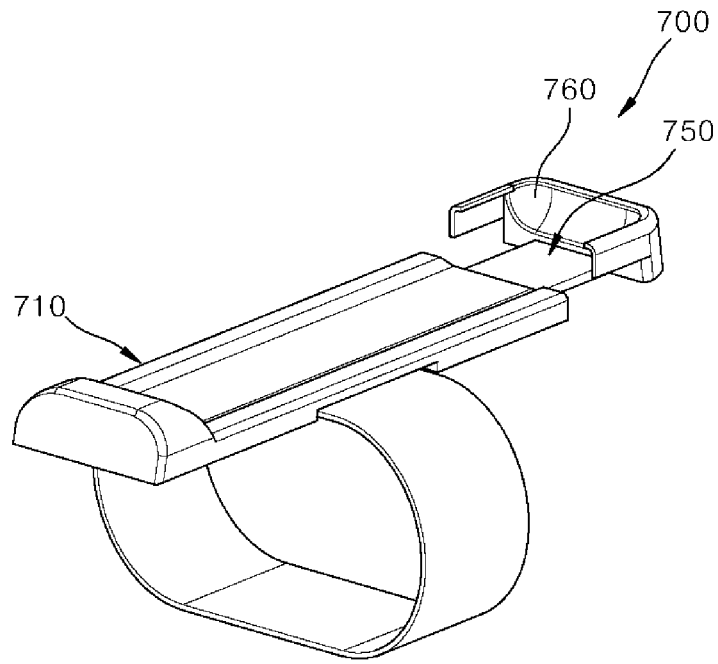
FIG. 36 is a perspective view of another example of a mounting device according to the second embodiment of the present invention.
Figure 37:
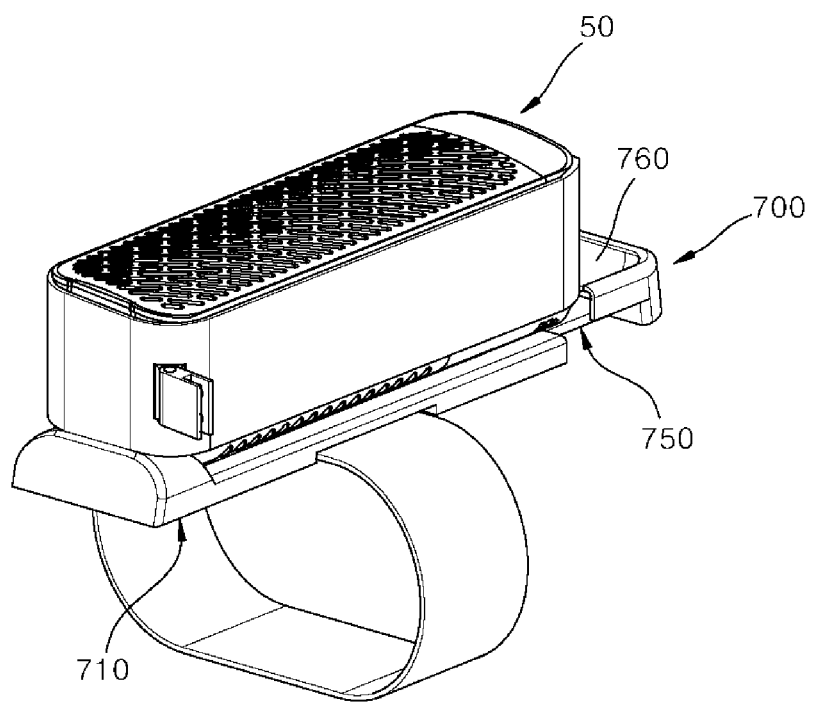
FIG. 37 is a view illustrating a process in which the portable air purifier is mounted on the mounting device shown in FIG. 36.
Figure 38:
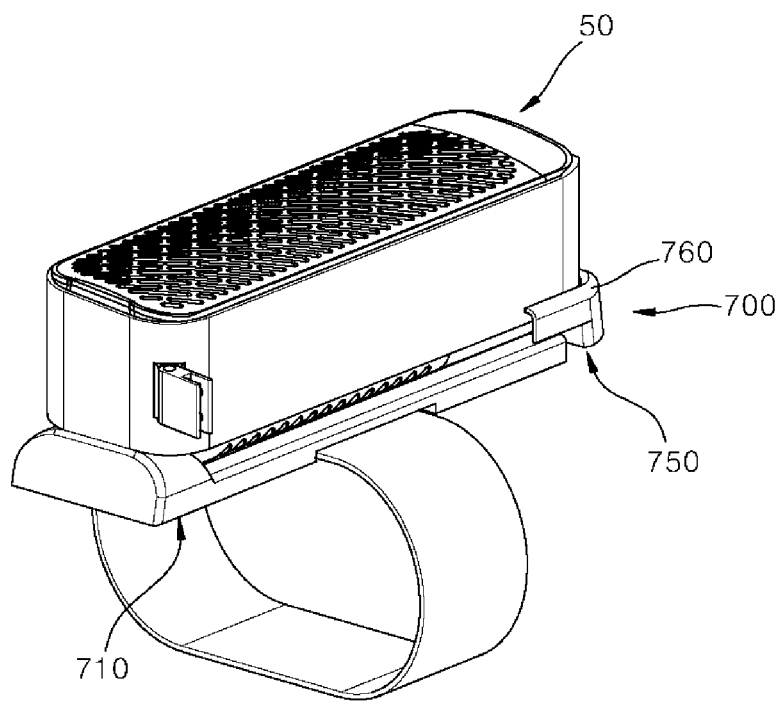
FIG. 38 is a view illustrating a state in which the portable air purifier is mounted on the mounting device shown in FIG. 37.

FIG. 33 is a perspective view illustrating a coupled state of the portable air purifier and the mounting device shown in FIG. 31, FIG. 34 is a side view illustrating a coupled state of the portable air purifier and the mounting device shown in FIG. 33, and FIG. 35 is a cross-sectional view taken along line "XXXV-XXXV" of FIG. 33. In addition, FIG. 36 is a perspective view illustrating another example of the mounting device according to the second embodiment of the present invention, FIG. 37 is a view illustrating a process in which the portable air purifier is mounted on the mounting device shown in FIG. 36, and FIG. 38 is a view illustrating a state in which the portable air purifier is mounted on the mounting device shown in FIG. 37.

Referring to FIGS. 31 to 34, the mounting device 700 may be divided into a first mounting region C and a second mounting region D. The first mounting region C is a region in which the support wall 713 is disposed and corresponds to a region disposed at the upper portion of the mounting device 700. The second mounting region D is a region in which the protrusion 730 is disposed and corresponds to a region disposed at the lower portion of the mounting device 700. That is, the mounting device 700 may be divided into the first mounting region C at the lower portion at which the support wall 713 is disposed and the second mounting region D at the lower portion at which the protrusion 730 is disposed.

When the portable air purifier 50 is mounted on the mounting device 700, a portion disposed in the first region of the portable air purifier 50, that is, the rear panel 570, is disposed in the first mounting region C. In addition, a portion disposed in the second region of the portable air purifier 50, that is, the rear cover 580 is disposed in the second mounting region D.

Therefore, when the portable air purifier 50 is mounted on the mounting device 700, the first inlet port 570a formed in the rear panel 570 is disposed in the first mounting region C, and the second inlet port 580a formed in the rear cover 580 is disposed in the second mounting region D.

In addition, when the portable air purifier 50 is mounted on the mounting device 700, when viewed from side, a protruding length of the support wall 713 disposed in the first mounting region C is less than a protruding length of the protrusion 730 disposed in the second mounting region D.

In the first mounting region C, a separation space is formed between the support wall 713 and the case 520. This is because the protrusion 730 disposed in the second mounting region D protrudes to have a length sufficient for completely covering the rear cover 580 at the rear side of the case 520 and the support wall 713 disposed in the first mounting region C protrudes to have a length insufficient for covering an entirety of the rear panel 570 at the rear side of the case 520.

As described above, since the separation space is formed between the support wall 713 and the case 520, when viewed from the side of the portable air purifier 50 mounted on the mounting device 700, the first inlet port 570a formed in the rear panel 570 is externally exposed from the mounting device 700 through the separation space.

In this case, the first inlet port 570a is formed to face in a direction between a rearward direction and a sideward direction of the portable air purifier 50, and thus, outside air be smoothly introduced into the portable air purifier 50 through the first inlet port 570*a*.

That is, even in a case in which the portable air purifier 50 is mounted on the mounting device 700, outside air may be smoothly introduced into the portable air purifier 50 through the first inlet port 570*a*.

On the other hand, in the second mounting region D in which the protrusion 730 is disposed, the protrusion 730 surrounds the rear cover 580 so as to mostly cover side and lower portions of the rear cover 580, and a rear side of the rear cover 580 is covered by the support portion 710.

That is, when the portable air purifier 50 is mounted on the mounting device 700, most of the rear cover 580 is covered by the support portion 710 and the protrusion 730, and in particular, the two side portions and the lower portion of the rear cover 580 are surrounded by the protrusion 730. As described above, the protrusion 730 surrounding the rear cover 580 serves to hold the lower portion of the portable air purifier 50 such that the portable air purifier 50 may be more stably mounted on the mounting device 700.

As described above, in a state in which the two side portions and the lower portion of the rear cover 580 are surrounded by the protrusion 730, the second inlet port 580*a* formed in the rear cover 580 is in a state of also being covered by the mounting device 700.

That is, as a result of increasing the protruding length of the protrusion 730 in order to increase fixing stability with respect to the lower portion of the portable air purifier 50 mounted on the mounting device 700, there is a problem in that the protrusion 730 blocks the second inlet port 580*a* outside the second inlet port 580*a*.

In order to solve the problem, in the present embodiment, as shown in FIGS. 32 and 35, inlet passage portions 735*a* and 735*b* are formed in the mounting device 700. The inlet passage portions 735*a* and 735*b* are formed to form passages between the outside of the mounting device 700 and the second inlet port 580*a*. In addition, a space 715 is formed inside the mounting device 700.

[537] The inlet passage portions 735*a* and 735*b* may include a third inlet port 735*a* and a fourth inlet port 735*b*. The third inlet port 735*a* forms a passage connecting the outside of the mounting device 700 and the space 715. The fourth inlet port 735*b* forms a passage connecting the space 715 and the second inlet port 580*a*.

The third inlet port 735*a* is formed to pass through the protrusion 730. In the present embodiment, a plurality of third inlet ports 735*a* are illustrated as being formed in the protrusion 730. Through the third inlet port 735*a* formed as described above, outside air may be introduced into the space 715 inside the mounting device 700.

The fourth inlet port 735*b* is formed to pass through the support portion 710. According to the present embodiment, the second inlet port 580*a* formed in the rear cover 580 faces the support portion 710 when the portable air purifier 50 is mounted on the mounting device 700. In consideration of such a point, the fourth inlet port 735*b* is formed to pass through the support portion 710 and is formed at a position facing the second inlet port 580*a*. Through the fourth inlet port 735*b* formed as described above, air introduced into the space 715 may be introduced into the second inlet port 580*a*.

That is, as shown in FIGS. 33 to 35, air outside the mounting device 700 may be introduced into the space 715 inside the mounting device 700 through the third inlet port 735*a* and may be introduced into the second inlet port 580*a* from the space 715 through the fourth inlet port 735*b*.

Likewise, air introduced into the second inlet port 580*a* by passing through the mounting device 700 may be introduced into the battery 560 and the sensor module 600 in the second region B. The introduced air may be used for detecting air quality of the sensor module 600 or for cooling the heated battery 560.

Considering the structure and function of the portable air purifier 50, a relatively wide passage is required to be formed around the first inlet port 570*a* which forms an air inlet passage toward components directly related to an air flow for air purification.

That is, in the first mounting region C in which the first inlet port 570*a* is formed, in order to secure a flow rate of air suctioned into the portable air purifier 50, it is important that a passage, through which outside air is introduced into the first inlet port 570*a*, is secured to have a width as wide as possible.

In consideration of such a point, the mounting device 700 according to the present embodiment may be provided such that the separation space is formed between the case 520 and the support portion 710 in the first mounting region C in which the first inlet port 570*a* is disposed and thus a wide passage is secured between the outside of the mounting device 700 and the first inlet port 570*a*. The mounting device 700 may allow outside air to flow into the portable air purifier 50 through the first inlet port 570*a* at a sufficient flow rate, and the portable air purifier 50 may suction outside air at a sufficient flow rate even in a state of being mounted on the mounting device 700, thereby providing a high level of air purification performance.

In contrast, a relatively narrow passage may be formed around the second inlet port 580*a*, which forms an air inlet passage toward components not directly related to an air flow for air purification, as compared with the passage around the first inlet port 570*a*. This is because an amount of air introduced through the second inlet port 580*a* has a small influence on improving air purification performance of the portable air purifier 50.

In consideration of such a point, the protrusion 730, which is a protruding structure that may hinder outside air from being introduced into the second inlet port 580*a*, is disposed in the second mounting region D. Due to the presence of the protrusion 730, a width of a passage through which outside air is introduced into the second inlet port 580*a* may be decreased, but instead, a structure may be provided in the second mounting region D to hold the lower portion of the portable air purifier 50 such that the portable air purifier 50 may be more stably mounted on the mounting device 700.

Furthermore, since the inlet passage portions 735*a* and 735*b* forming passages between the protrusion 730 and the second inlet port 580*a* are formed in the second mounting region D, a passage, through which outside air is supplied to the second inlet port 580*a*, may also be secured at a sufficient level.

Accordingly, the mounting device 700 may provide the structure for holding the lower portion of the portable air purifier 50 such that the portable air purifier 50 may be more stably mounted on the mounting device 700 and may also allow a passage for suctioning air required for measuring a dust concentration or cooling the battery to be sufficiently secured.

According to the portable air purifier 50 provided with the mounting device 700, while the portable air purifier 50 is stably mounted on the mounting device 700, air at a sufficient flow rate for improving air purification performance may be introduced into the portable air purifier 50.

As a result, the portable air purifier 50 of the present embodiment may be stably fixed in a desired place and may also effectively maintain air suction and discharge performance, thereby providing more improved air purification performance.

In addition, according to the portable air purifier 50 provided with the mounting device 700, the portable air purifier 50 may be mounted on the mounting device 700 or detached from the mounting device 700 quickly and conveniently, and a mounted state of the air purifier 50 may also be stably maintained.

As another example, as shown in FIGS. 36 to 38, the mounting device 700 may be provided such that a distance between an upper end and a lower end of the mounting device 700 is changed. Accordingly, the mounting device 700 further includes an extension support portion 750.

The extension support portion 750 is installed in the support portion 710 so as to be slidable in a vertical direction. The extension support portion 750 is inserted into the support portion 710. When the extension support portion 750 is pulled rearward, the extension support portion 750 may be unloaded from the support portion 710. When the extension support portion 750 is moved forward again, the extension support portion 750 may be inserted into the support portion 710.

A lower fixing portion 760 is provided at an end portion of the extension support portion 750. The lower fixing portion 760 is provided to move integrally with the extension support portion 750 and is interlocked with the lower portion of the portable air purifier 50 to fix the lower portion of the portable air purifier 50.

Although not shown, an elastic member may be further provided in the mounting device 700. The elastic member is provided to provide an elastic force for returning the extension support portion 750, which is moved in a direction in which the lower fixing portion 760 is spaced from the upper end of the mounting device 700, to the original position thereof.

In a state in which the extension support portion 750 is inserted into the support portion 710, when a force for pulling the extension support portion 750 and the lower fixing portion 760 rearward is applied, the extension support portion 750 slides rearward so that a distance between the lower fixing portion 760 and the upper end of the mounting device 700 is increased. In this state, when the force for pulling the extension support portion 750 and the lower fixing portion 760 rearward is released, the extension support portion 750 and the lower fixing portion 760 are returned forward again by an elastic force of the elastic member. Accordingly, the distance between the lower fixing portion 760 and the upper end of the mounting device 700 is decreased to the original state thereof.

According to the mounting device 700 having such a configuration, by only an easy operation in which, in a state in which the extension support portion 750 and the lower fixing portion 760 are pulled rearward, the portable air purifier 50 is mounted on the mounting device 700 and then the pulled extension support portion 750 and lower fixing portion 760 are released, the portable air purifier 50 may be stably fixed to the mounting device 700.

[Coupling Structure of Case and Other Components]

Figure 39:
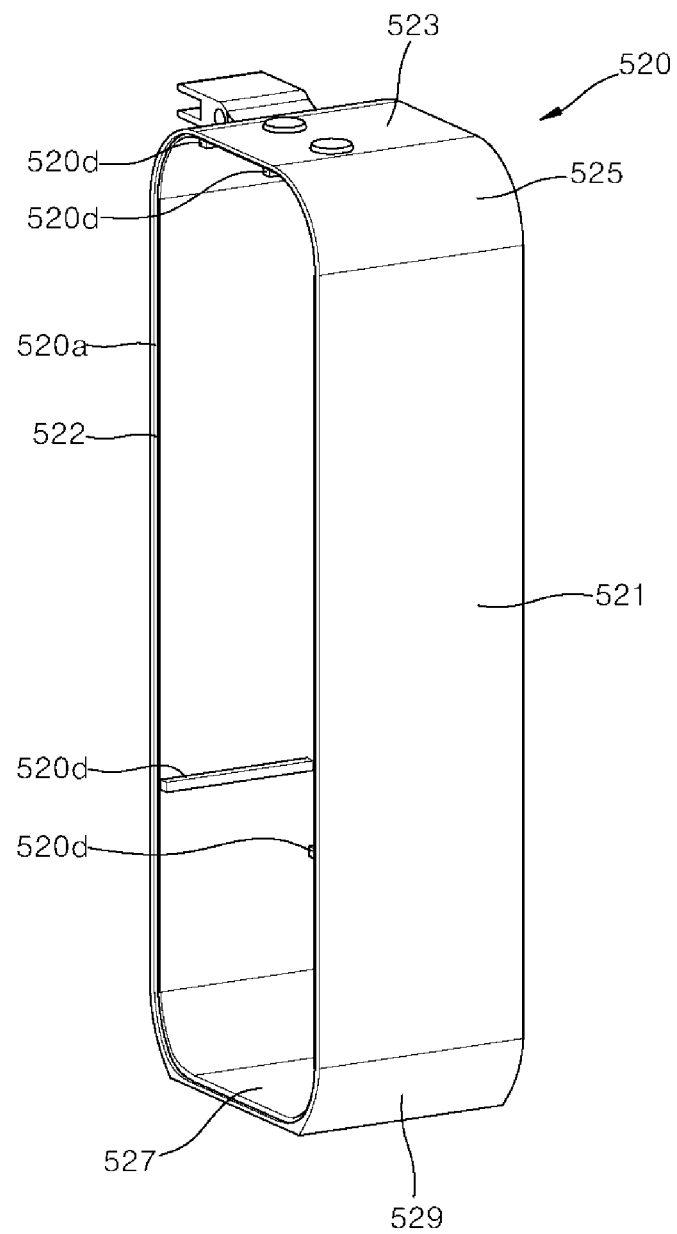
FIG. 39 is a front perspective view illustrating the case according to the second embodiment of the present invention.
Figure 40:
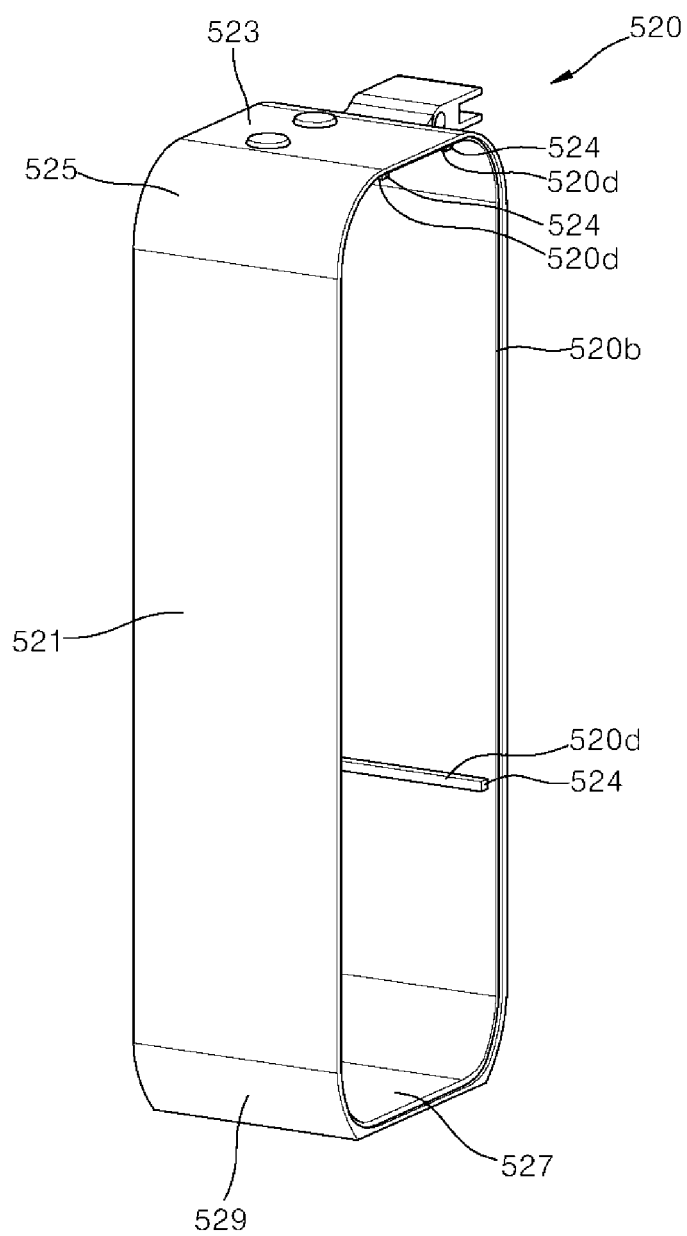
FIG. 40 is a rear perspective view illustrating the case according to the second embodiment of the present invention.
Figure 41:
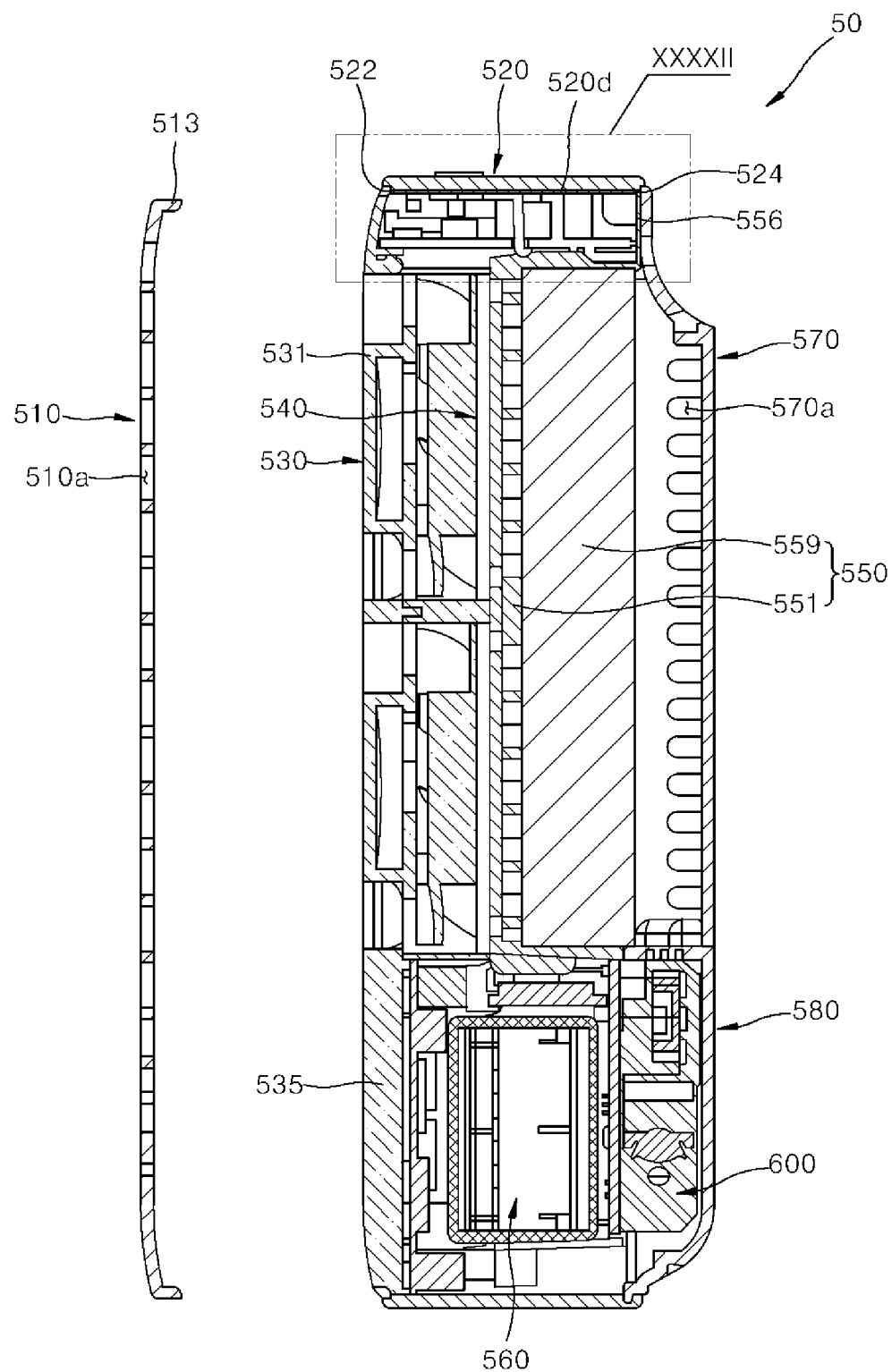
FIG. 41 is a cross-sectional view taken along line "XXXXI-XXXXI" of FIG. 14.
Figure 42:
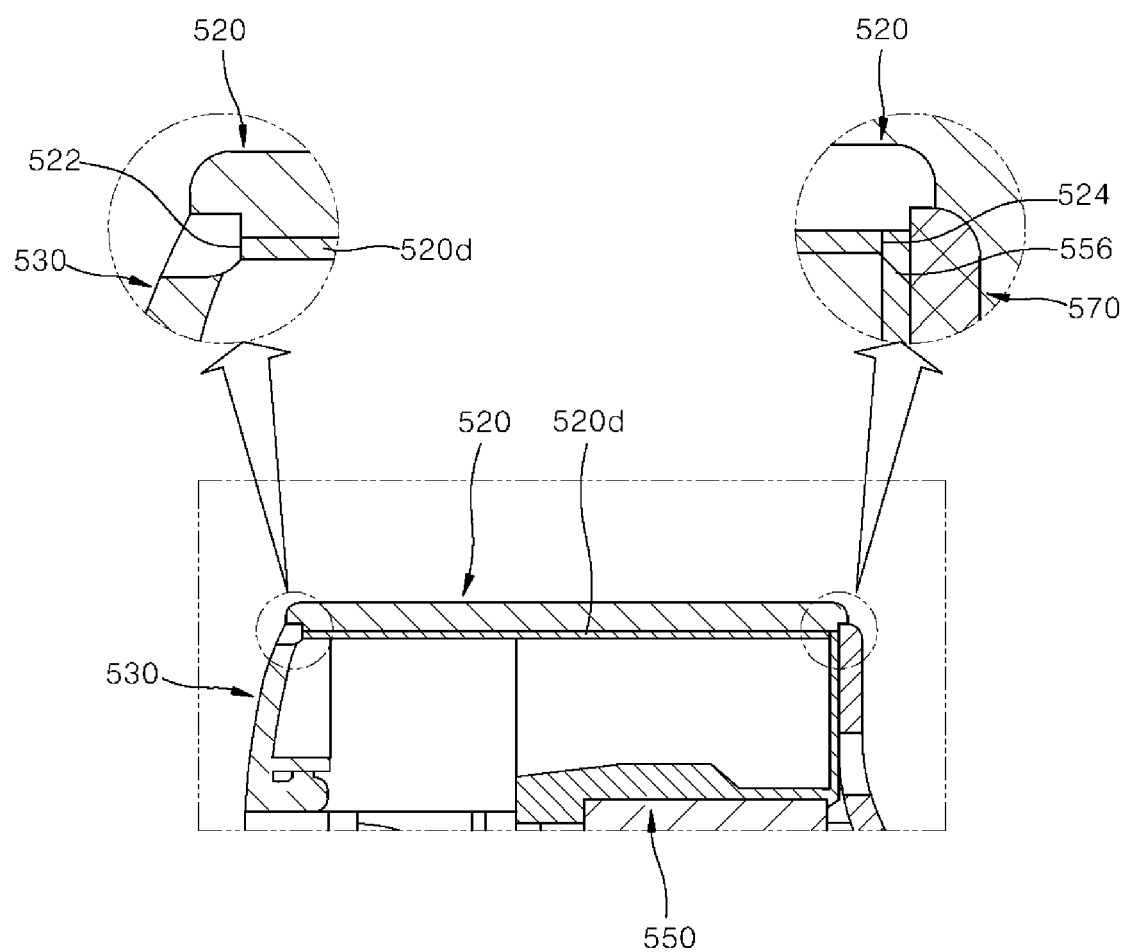
FIG. 42 is a schematic view illustrating a coupling structure of the fan cover, the case, and the filter case shown in FIG. 41.
Figure 43:
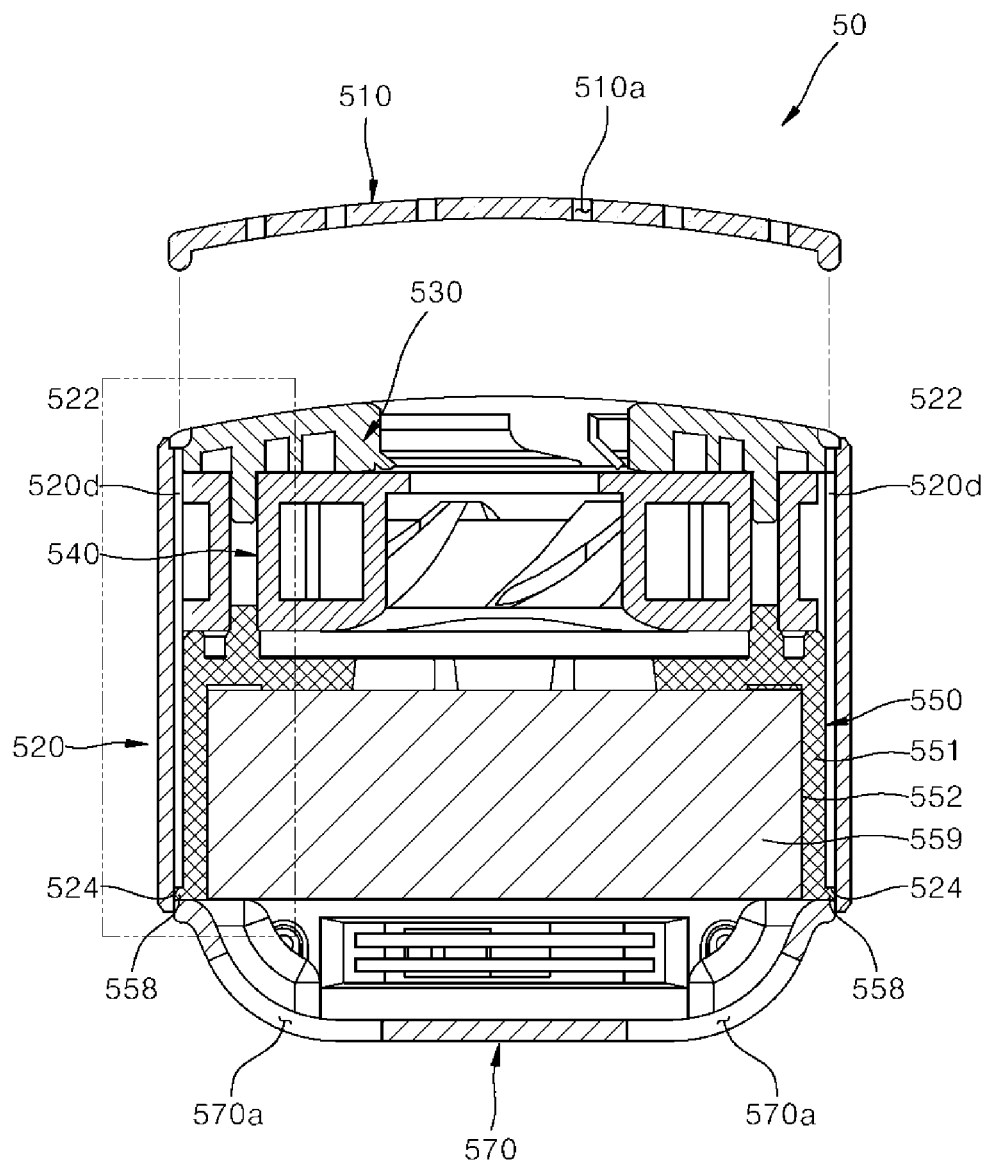
FIG. 43 is a cross-sectional view taken along line "XXXXIII-XXXXIII" of FIG. 14
Figure 44:
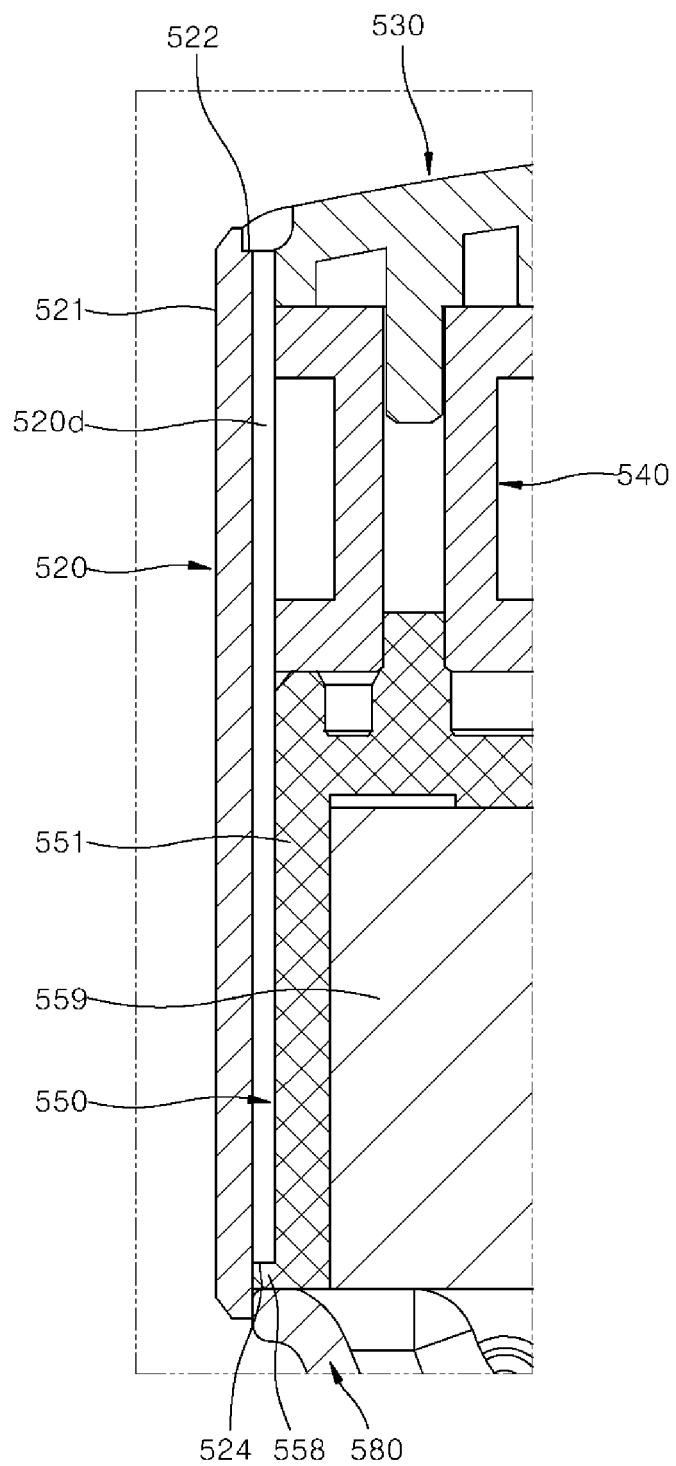
FIG. 44 is a schematic view illustrating a coupling structure of the fan cover, the case, and the filter case shown in FIG. 43.
Figure 45:
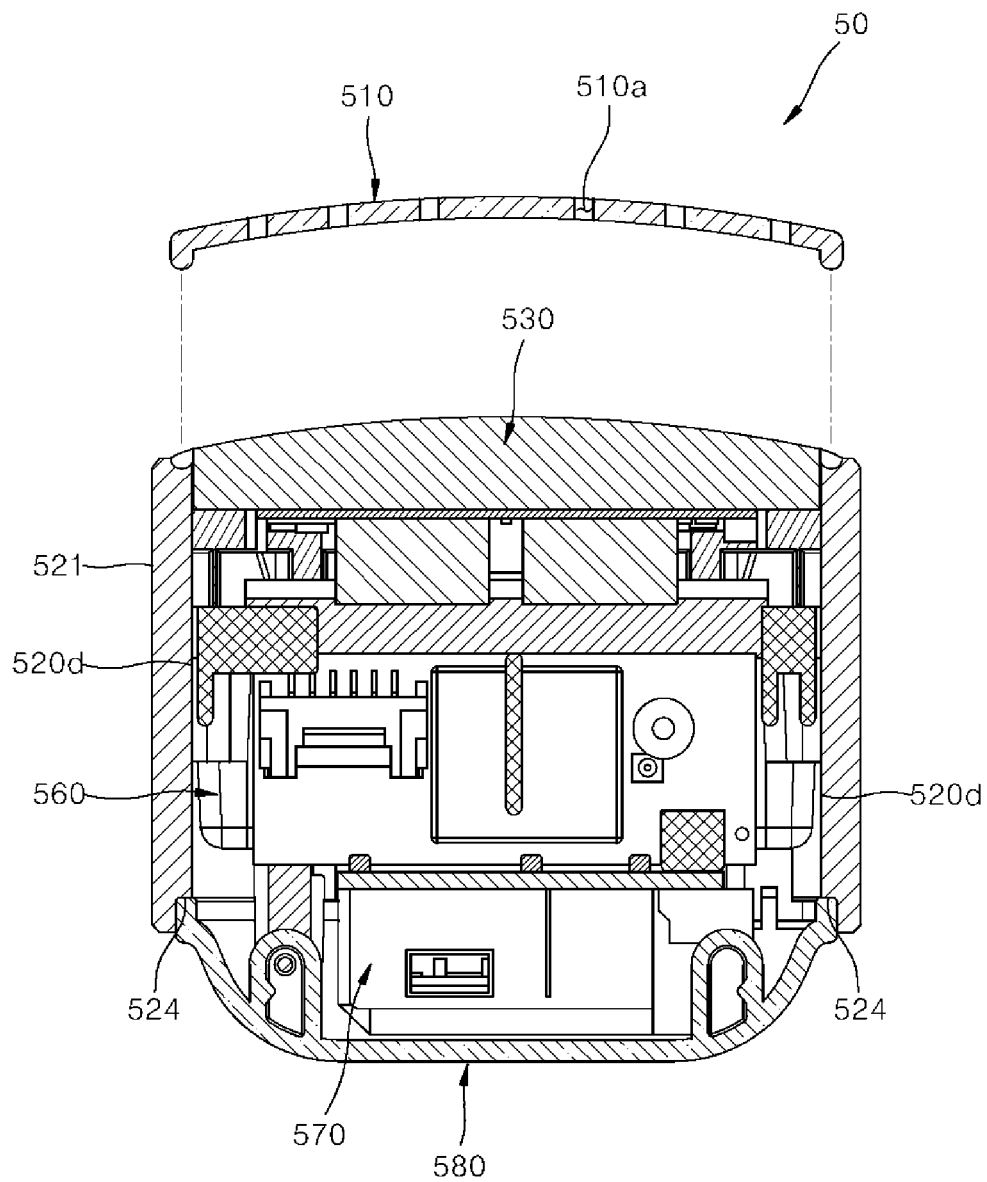
FIG. 45 is a cross-sectional view taken along line "XXXXV-XXXXV" of FIG. 14.

FIG. 39 is a front perspective view illustrating the case according to the second embodiment of the present invention, and FIG. 40 is a rear perspective view illustrating the case according to the second embodiment of the present invention. FIG. 41 is a cross-sectional view taken along line "XXXXI-XXXXI" of FIG. 14, and FIG. 42 is a schematic view illustrating a coupling structure of the fan cover, the case, and the filter case shown in FIG. 41. In addition, FIG. 43 is a cross-sectional view taken along line "XXXXIII-XXXXIII" of FIG. 14, FIG. 44 is a schematic view illustrating a coupling structure of the fan cover, the case, and the filter case shown in FIG. 43, and FIG. 45 is a cross-sectional view taken along line "XXXXV-XXXXV" of FIG. 14.

FIGS. 41 to 45 illustrate a state in which the front cover is separated or removed from the portable air purifier forward.

Referring to FIGS. 15, 17, 39, and 40, the case 520 is provided with first support surfaces 522 and second support surfaces 524. The first support surface 522 is formed as a surface which protrudes from an inner circumferential surface of the case 520 and is disposed behind the fan cover 530 to face the fan cover 530. The second support surface 524 is formed as a surface which protrudes from the inner circumferential surface of the case 520 and is disposed in front of the filter module 550 to face the filter module 550.

According to the present embodiment, a stepped portion, in which an inner side thereof is concave further rearward from the case 520 as compared with an outer side thereof, is formed at the front edge of the case 520. The first support surface 522 is formed as a plane surface facing the fan cover 530 inside the front edge of the case 520. That is, the first support surface 522 is formed on a surface of the front edge of the case 520, which is concave rearward, and is formed as a plane surface facing a rear surface of the fan cover 530.

The first support surface 522 interferes with the fan cover 530 to restrict a position of the fan cover 530. The first support surface 522 may be formed as a plane surface facing a rear edge of the fan cover 530 and may interfere with the rear edge of the fan cover 530 to restrict a position of the fan cover 530 from being changed rearward.

In addition, the case 520 is provided with a support protrusion 520*d* protruding from the inner circumferential surface of the case 520 toward the interior of the case 520. The support protrusion 520*d* may be formed to have a rod shape which protrudes from the inner circumferential surface of the case 520 and has a length extending in a front-rear direction. A plurality of support protrusions 520*d* are disposed in the case 520 so as to be spaced a certain interval from each other in a circumferential direction of the case 520.

The second support surface 524 is formed as a plane surface facing the rear panel 570 at a rear end portion of the support protrusion 520*d*. In this case, the second support surface 524 is disposed at a position that is further biased to the interior of the case 520 as compared with the first support surface 522.

The second support surface 524 interferes with the filter module 550 to restrict a position of the filter module 550. As an example, the protruding support 556 is provided at an upper end of the filter case 551 of the filter module 550, and the protruding support 556 forms a plane surface protruding upward from the upper end of the filter case 551. The first support surface 524 may be formed as a plane surface facing the protruding support 556 and may interfere with the protruding support 556 to restrict a position of the filter module 550 from being changed forward.

According to the present embodiment, the fan cover 530 and the filter module 550 are coupled in a front-rear direction with the first support surface 522 and the second support surface 524 provided in the case 520 interposed therebetween, and due to the coupling, the fan cover 530 and the filter module 550 are fixed to the case. Hereinafter, a coupling structure of the fan cover 530 and the filter module 550 formed with the first support surface 522 and the second support surface 524 interposed therebetween will be described in detail.

Referring to FIGS. 17 and 39 to 45, the front panel 510 and the fan cover 530 are disposed in front of the first support surface 522. When the fan cover 530 is pressed against the case 520 at the front side of the case 520, the rear edge of the fan cover 530 comes into contact with the first support surface 522. That is, when the fan cover 530 is pressed against the case 520 at the front side of the case 520, the first support surface 522 interferes with the rear edge of the fan cover 530.

As described above, when the first support surface 522 interferes with the rear edge of the fan cover 530, a position of the fan cover 530 is restricted from being changed rearward. As described above, the front panel 510 may be coupled to the fan cover 530 installed at the front side of the case 520.

The filter case 551 is disposed behind the fan cover 530. According to the present embodiment, most region of the filter case 551 is disposed in front of the second support surface 524, but a partial region of the filter case 551, for example, a rear end portion of the filter case 551 is disposed further rearward than the second support surface 524.

The filter case 551 is inserted into the case 520 from the rear side of the case 520 and is coupled to the fan cover 530. In this case, most region of the filter case 551 is inserted to be disposed in front of the second support surface 524, but the rear end portion of the filter case 551 is in contact with the second support surface 524.

That is, when the filter case 551 is inserted into the case 520 from the rear side of the case 520, the second support surface 524 interferes with the rear end portion of the filter module 550. As described above, when the second support surface 524 interferes with the rear end portion of the filter module 550, a position of the filter module 550 is restricted from being changed rearward.

According to the present embodiment, the plurality of support protrusions 520d are disposed in the case 520 so as to be spaced apart from each other by a certain interval in the circumferential direction of the case 520. In this case, at least one of the plurality of support protrusions 520d is disposed at the upper portion of the case 520.

In the present embodiment, as shown in FIGS. 17, 41, and 42, a pair of support protrusions 520d are illustrated as being disposed at the upper portion of the case 520. The protruding support 556 protruding from the upper end portion of the filter case 551 is in contact with the second support surface 524 formed at the rear end portion of each of the support protrusions 520d.

That is, when the filter case 551 is inserted into the case 520 from the rear side of the case 520, the second support surface 524 interferes with the protruding support 556. As described above, when the second support surface 524 interferes with the protruding support 556, a position of the filter case 551 is restricted from being changed rearward.

As described above, in a state in which the first support surface 522 interferes with the rear edge of the fan cover 530 and the second support surface 524 interferes with the protruding support 556, the fan cover 530 and the filter case 551 are coupled to each other.

The fan cover 530 and the filter case 551 may be coupled by the coupling of the first fan cover coupling portion 553 and the second coupling boss 531d and the coupling of the second fan cover coupling portion 554 and the third coupling boss 535a. In this case, the coupling of the first fan cover coupling portion 553 and the second coupling boss 531d and the coupling of the second fan cover coupling portion 554 and the third coupling boss 535a are performed using coupling members.

When a coupling operation using coupling members is consecutively performed and thus the fan cover 530 and the filter case 551 are coupled enough that a distance between the rear edge of the fan cover 530 and the protruding support 556 of the filter case 551 is shorter than a distance between the first support surface 522 and the second support surface 524, the rear edge of the fan cover 530 presses the first support surface 522, and the protruding support 556 presses the second support surface 524.

That is, the fan cover 530 and the filter case 551 approach each other with the first support surface 522 and the second support surface 524 interposed therebetween and thus press the front side of the first support surface 522 and the rear side of the second support surface 524, respectively. Accordingly, the case 520 is coupled to the fan cover 530 and the filter case 551 which are coupled to each other by pressing the front side of the first support surface 522 and the rear side of the second support surface 524, respectively.

As a result, the fan cover 530 and the filter case 551 are coupled, and at the same time, an inner side of the front edge of the case 520 and the support protrusion 520d are fitted between the fan cover 530 and the filter case 551 coupled to each other. Thus, the fan cover 530, the filter case 551, and the case 520 are coupled.

That is, the fan cover 530 and the filter case 551 may be coupled to each other so as to not be separated from the case 520 by simply coupling the fan cover 530 and filter case 551 with the first support surface 522 and the second support surface 524 interposed therebetween. In other words, by simply coupling the fan cover 530 and the filter case 551 in the case 520, the fan cover 530, the filter module 550, and the case 520 may be coupled at once.

Meanwhile, as shown in FIGS. 17, 43, and 44, the filter case 551 may be further provided with an edge protrusion 558. The edge protrusion 558 may be formed to have a flange shape protruding laterally from a rear edge of the filter case 551.

According to the present embodiment, the case main body 552 of the filter case 551 is formed to have a width so as to not interfere with the support protrusion 520d when the filter case 551 is inserted into the case 520 from the rear side of the case 520. For example, the width of the case main body 552 is determined to be less than or equal to a distance between the pair of support protrusions 520d facing each other on an inner circumferential surface of the side surface portion 521 of the case 520.

The edge protrusion 558 is formed to protrude laterally from the rear edge of the case main body 552 and is formed to protrude by a length corresponding to a protruding length of each support protrusion 520d. The edge protrusion 558 may be formed as a plane surface which faces the second support surface 524 and is parallel to the second support surface 524.

Therefore, when the fan cover 530 and the filter case 551 are coupled, interference may occur between the protruding support 556 and the second support surface 524 of the support protrusion 520d disposed close to the upper surface portion 523 of the case 520 and interference may occur between the edge protrusion 558 and the second support surface 524 of the support protrusion 520d disposed close to the side surface portion 521 of the case 520 together.

That is, when the fan cover 530 and the filter case 551 are coupled, the fan cover 530, the filter case 551, and the case 520 are coupled on inner circumferential surfaces of the upper surface portion 523 and the both side surfaces of the case 520. This means that the coupling of the fan cover 530, the filter case 551, and the case 520 is not formed at only a specific portion at which coupling is performed using a coupling member but the coupling of the fan cover 530 and the case 520 and the coupling of the filter case 551 and the case 520 are formed in most regions of the inner circumferential surfaces of the case 520.

As described above, since the coupling of the fan cover 530 and the case 520 and the coupling of the filter case 551 and the case 520 are formed in most regions of the inner circumferential surfaces of the case 52, an impact applied to the case 520 may be distributed and transferred to most regions of the inner circumferential surfaces of the case 520.

That is, since coupling portions between the fan cover 530 and the case 520 and coupling portions between the filter case 551 and the case 520 are distributed to most regions of the inner circumferential surfaces of the case 520, the impact applied to the case 520 may not be concentrated on any one portion and may be widely distributed.

Accordingly, even when an impact is applied to the portable air purifier 50, the impact applied to the portable air purifier 50 may not be concentrated on any one portion and may be widely distributed.

As described above, since an influence of the impact applied to the portable air purifier 50 may not be concentrated on any one portion and may be widely distributed, it is possible to mitigate the influence of the impact transmitted to the case 520 being concentrated on a specific portion, thereby reducing a risk of damage to specific portions at which the case 520 and other components are coupled.

That is, by adopting a structure that mitigates an influence of the impact transmitted to the case 520 being concentrated on any specific portion, it is possible to provide the portable air purifier 50 of which a specific portion is not easily damaged due to an impact and which has high durability.

In addition, in the present embodiment, the case 520 is illustrated as being made of a metal material, and more specifically, an aluminum material. The case 520 made of an aluminum material may be light and have high strength and thus may be suitable to be applied to the portable air purifier 50 that should be light and be easy to carry. In addition, the case 520 may have sufficient rigidity to protect various components included in the case 520.

Furthermore, the case 520 made of an aluminum material may have a smooth exterior surface and gloss as compared with a case made of a resin material and thus contribute to an improvement in quality of an exterior of the portable air purifier 50.

In order to couple components such as the fan cover 530 and the filter case 551, which are made of a resin material, to the case 520, a method using a coupling member is generally used. That is, the fan cover 530 and other components may be coupled through a method of allowing coupling members to pass through the case 520 and the components such as the fan cover 530 and the filter case 551.

As described above, in order to perform a coupling operation using the coupling member, coupling holes should be formed in the case 520. However, due to characteristics of the case 520 which is made of an aluminum material with high strength, an operation of forming the coupling holes in the case 520 is a difficult operation that requires a high cost and a great deal of time. That is, it takes a high cost and a great deal of time to form the coupling holes in the case 520, and a level of difficulty of the operation is also very high.

In addition, in a structure in which the coupling members are coupled to the case 520 as described above, the coupling holes or the coupling members cannot help but to be externally exposed from the case 520. In such a structure, a smooth exterior surface of the case 520 is damaged, thereby degrading quality of the exterior of the portable air purifier 50.

In consideration of such a point, in the present embodiment, without needing to couple a coupling member to the case 520, a coupling structure, in which the fan cover 530 and the filter case 551 may be coupled to each other so as to not be separated from the case 520, may be provided by simply coupling the fan cover 530 and the filter case 151 with the first support surface 522 and the second support surface 524 interposed therebetween. That is, when the fan cover 530 and the filter case 551 are simply coupled in the case 520, the fan cover 530, the filter module 550, and the case 520 may be coupled at once without needing to couple the fan cover 530 and the filter module 550 using a coupling member.

As a result, it is possible to reduce a time and a cost required for a coupling operation of the case 520 and each component and also provide the portable air purifier 50 which is capable of maintaining smoothness and high quality of the exterior.

Meanwhile, a fixing structure of the rear cover 580, in which the upper portion of the rear cover 580 is fixed to the rear panel 570 and the lower portion of the rear cover 580 is fixed to the rear cover 580, may be formed at the rear side of the case 520.

As a result, the rear cover 580 may be stably fixed to the rear side of the case 520, and a fixing structure of the rear panel 570 and the rear cover 580, in which the rear panel 570 and the rear cover 580 mutually support a fixed state, may be provided.

The rear cover 580 and the rear panel 570 may be coupled by the coupling of the rear panel coupling portion 586 provided at the upper portion of the rear cover 580 and the rear cover coupling portion 577 provided at the lower portion of the rear panel 570. The rear cover 580 and the case 520 may be coupled by the coupling of the case coupling portion 587 provided at the lower portion of the rear cover 580 and the rear cover coupling groove 520c formed at the rear lower portion of the case 520.

In addition, referring to FIGS. 17 and 45, a structure is provided between the case 520 and the rear cover 580 to restrict a position of the rear cover 580 from being changed forward.

Accordingly, the support protrusion 520d is disposed in the second region B of the case 520, or at a boundary between the first region A and the second region B and in a region adjacent thereto. In this case, the support protrusion 520d is disposed on the inner circumferential surface of the side surface portion 521 of the case 520.

The second support surface 524 formed at the rear end portion of the support protrusion 520d disposed as described above may be formed as a plane surface facing the front edge of the rear cover 580. When the second support surface 524 interferes with the front edge of the rear cover 580, a position of the rear cover 580 is restricted from being changed forward.

The lower portion of the rear cover 580 may be fixed by the coupling of the case coupling portion 587 and the rear cover coupling groove 520c. Due to the coupling, a front-rear position of the lower portion of the rear cover 580 is restricted by the coupling.

In contrast, at the upper portion of the rear cover 580, only the coupling of the rear cover 580 and rear panel 570 is formed by the coupling of the rear panel coupling portion 586 and the rear cover coupling portion 577, and the coupling of the rear cover 580 and the case 520 is not formed.

In the present embodiment, a structure is provided in which a position of the upper portion of the rear cover 580 is restricted from being changed forward by interference between the second support surface 524 and the front edge of the rear cover 580.

Accordingly, when the rear cover 580 is installed in the case 520, a front-rear position of the rear cover 580 may be restricted not only at the upper portion of the rear cover 580 but also at the upper portion of the rear cover 580.

As a result, an installation operation of the rear cover 580 may be performed in a state in which an installation position of the rear cover 580 is guided at both the lower and upper portions of the rear cover 580. Thus, the installation operation of the rear cover 580 may be easily and quickly performed, and the rear cover 580 installed in the case 520 may also be stably fixed to the case 520 at a proper position.

[Detailed Configuration of Fan Cover]

Figure 46:
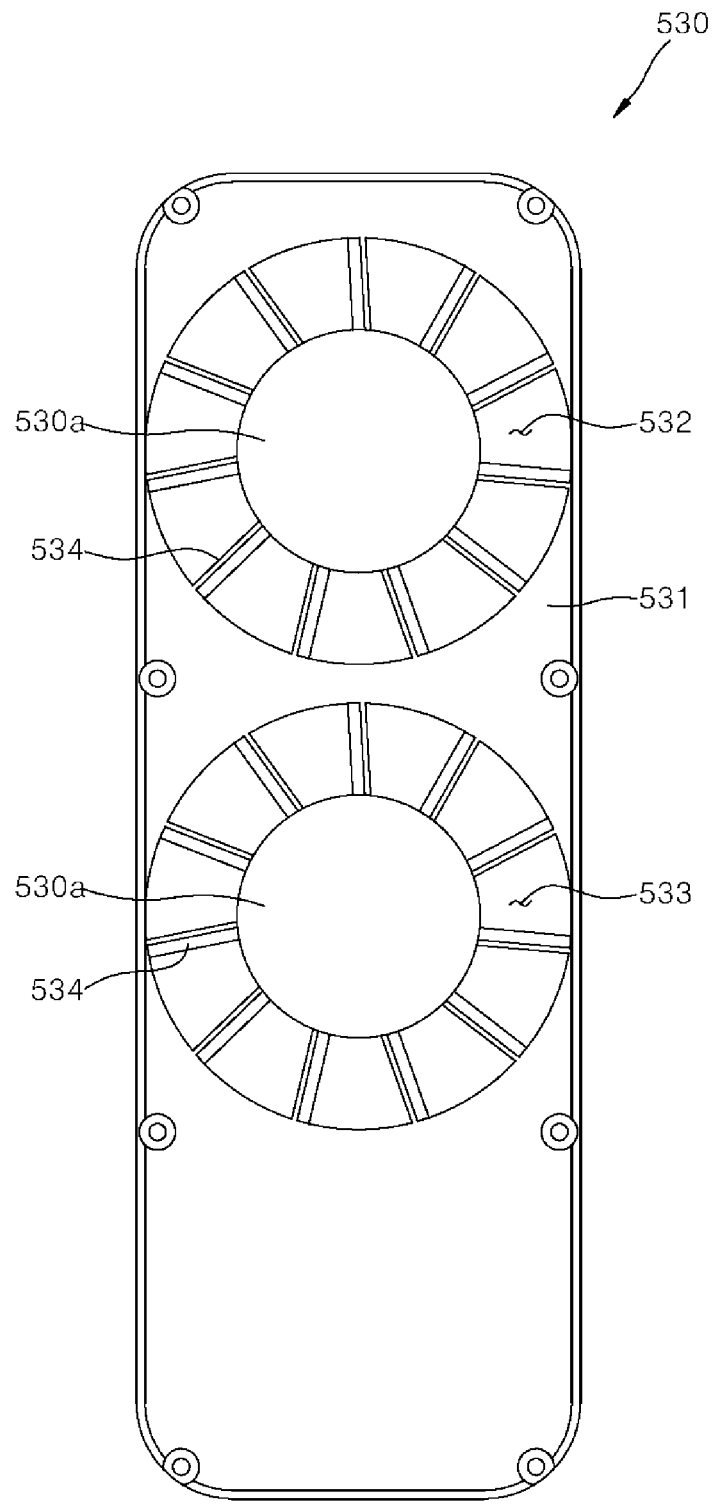
FIG. 46 is a front view illustrating a state in which a fan cover is separated from a blower fan of the portable air purifier according to the second embodiment of the present invention.
Figure 47:
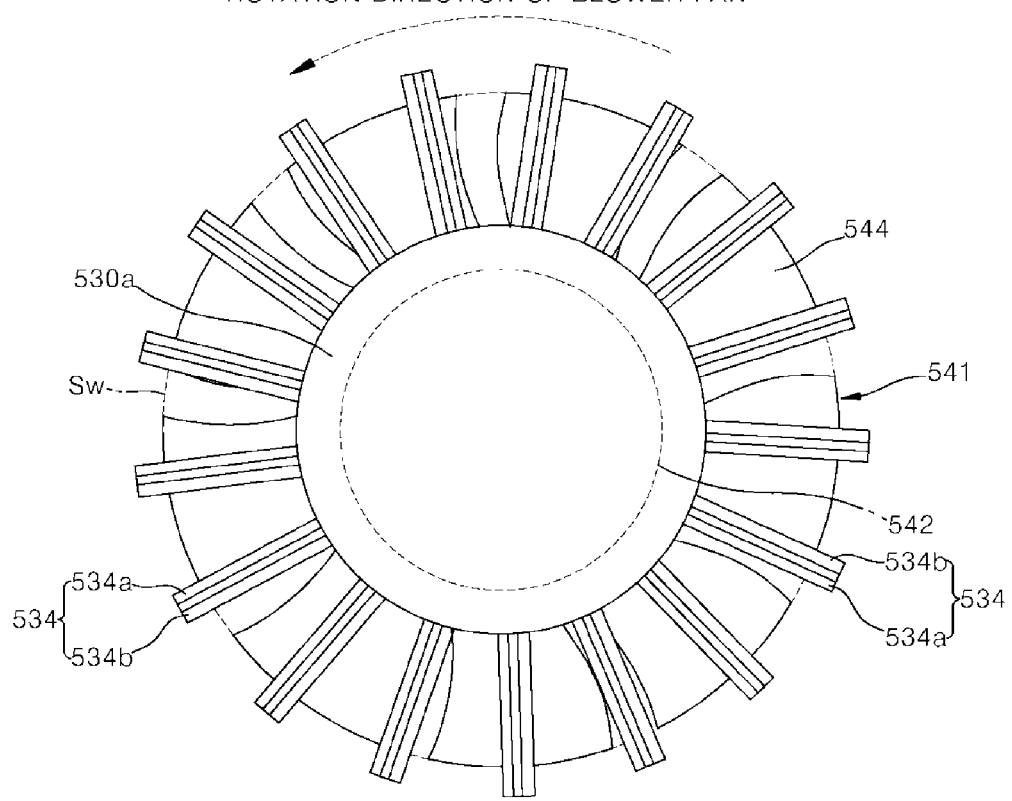
FIG. 47 is an enlarged view illustrating the fan cover and the blower fans.
Figure 48:
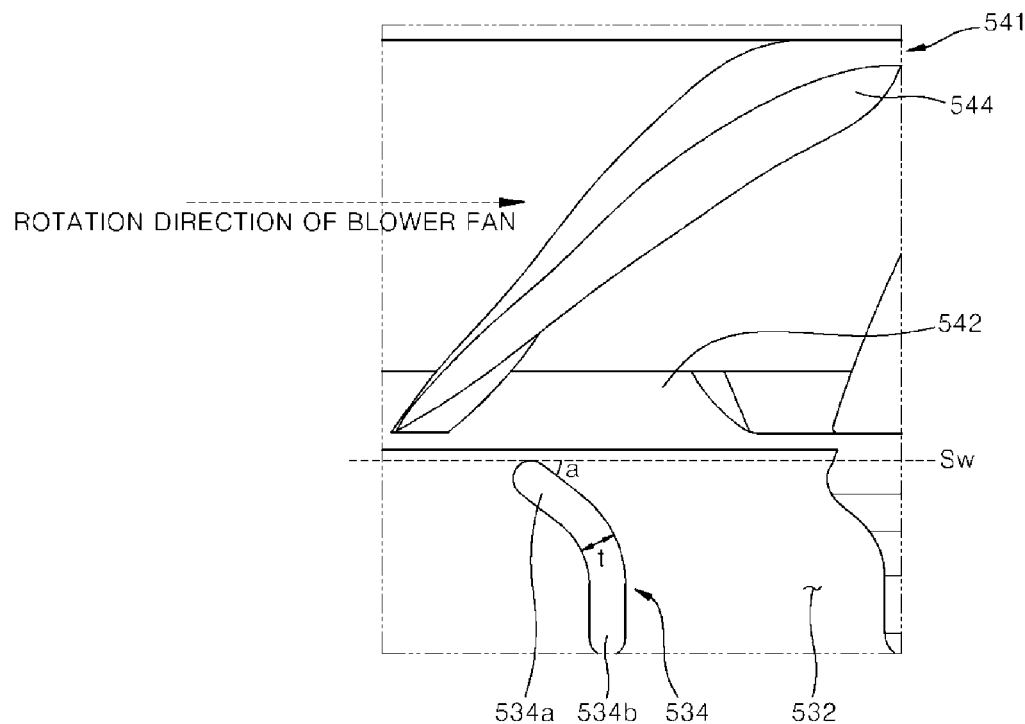
FIG. 48 is a side cross-sectional view illustrating the fan cover and the blower fans.

FIG. 46 is a front view illustrating a state in which the fan cover is separated from the blower fan of the portable air purifier according to the second embodiment of the present invention, FIG. 47 is an enlarged view illustrating the fan cover and the blower fans, and FIG. 48 is a side cross-sectional view illustrating the fan cover and the blower fans.

Referring to FIGS. 15 and 46, the fan cover 530 is provided with the air discharge portions 532 and 533. The air discharge portions 532 and 533 are formed by perforating or cutting a portion of the upper cover portion 531. The air discharge portions 532 and 533 form passages in the fan cover 530, which connect the front side of the case 520 and the blower fans 541 and 546 of the fan assemblies 540 and 545.

The fan assemblies 540 and 545 are disposed behind the air discharge portions 533 and 533, and the blower fans 541 and 546 are provided in the fan assemblies 540 and 545. The blower fans 541 and 546 are provided to generate an air flow. As an example, the blower fans 541 and 546 may include axial-flow fans. Air suctioned into the case 520 through the rear panel 570 may be suctioned in axial directions of the blower fans 541 and 546 and then discharged in the axial directions of the blower fans 541 and 546.

The fan cover 530 of the present embodiment may further include shield plates 530a and guide vanes 534. The shield plates 530a and the guide vanes 534 are disposed in regions in which the air discharge portions 532 and 533 are formed. In the present embodiment, the shield plate 530a and the guide vane 534 are illustrated as being disposed in both the upper air discharge portion 532 and the lower air discharge portion 533.

The shield plate 530a and the guide vane 534 disposed in the upper air discharge portion 532 and the shield plate 530a and the guide vane 534 disposed in the lower air discharge portion 533 may be provided to have the same configuration and function. Therefore, hereinafter, only the shield plate 530a and the guide vane 534 disposed in the upper air discharge portion 532 will be representatively described.

Referring FIGS. 15 and 46 to 48, the blower fan 541 may include a hub 542 and fan blades 544.

The hub 542 is a portion which is coupled to a rotation shaft that serves as a rotation center of the blower fan 541. The rotation shaft is rotated by a fan motor which provides a rotational force to the blower fan 541. The hub 542 may be coupled to the rotation shaft to rotate about the rotation shaft. The hub 542 is provided as a structure for connecting the fan blades 544 to the rotation shaft.

The fan blades 544 are connected to a radial circumference of the hub 542, that is, an outer circumferential surface of the hub 542. The fan blade 544 may be rotated about the rotation shaft together with the hub 542. A plurality of fan blades 544 are disposed on the outer circumferential surface of the hub 542 in a rotation direction of the blower fan 541.

The fan blades 544 may be rotated together with the hub 542, and the fan blades 544 may guide an air flow in which air behind the blower fan 541 is suctioned and then is discharged toward a front side of the blower fan 541.

In this case, a blowing surface Sw is formed in front of a region in which the fan blades 544 are rotated. An air flow rate of the blower fan 541 may be increased or decreased in proportion to a velocity of wind passing through the blowing surface Sw.

The shield plate 530a and the guide vane 534 are disposed at a discharge side of the blower fan 541, in other words, in front of the blowing surface Sw.

The shield plate 530a is disposed at the discharge side of the blower fan 541. In the present embodiment, the shield plate 530a is illustrated as being disposed in the air discharge portion 532 and being disposed at a central portion of the air discharge portion 532. The shield plate 530a is disposed in front of the hub 542 to serve to cover the hub 542.

The guide vane 534 is disposed at the discharge side of the blower fan 541. In the present embodiment, the guide vane 534 is illustrated as being disposed in the air discharge portion 532 and being disposed between the shield plate 530a and an inner circumferential surface of the fan cover 530 surrounding the air discharge portion 532 at a lateral outer side thereof. The guide vane 534 extends radially from the rotation shaft.

The guide vane 534 may serve as a connection structure for supporting the shield plate 530a disposed at the central portion of the air discharge portion 532 to the fan cover 530.

The shield plate 530a is required for covering the hub 542 of the blower fan 541, but in order to secure a passage for air discharged from the blower fan 541, the shield plate 530a should not completely cover the air discharge portion 532. To this end, the shield plate 530a is provided to be smaller than the air discharge portion 532 so as to cover only a portion of the air discharge portion 532, and the inner circumferential surface of the fan cover 530 and the shield plate 530a are connected by the guide vane 534.

In addition, the guide vane 534 may perform not only a function of supporting the hub 542 but also a function of guiding a discharge direction of air discharged from the blower fan 541. The guide vanes 534 are disposed in front of the blowing surface Sw and are connected radially with respect to the rotation shaft.

According to the present embodiment, the guide vane 534 may include a first guide surface 534a and a second guide surface 534b.

The first guide surface 534a is disposed adjacent to the blower fan 541. The first guide surface 534a is formed to have a plane shape facing the fan blade 544 and is formed to have a plane shape obliquely facing the fan blade 544. In other words, the first guide surface 534a is formed to have a planar shape facing the blowing surface Sw at a certain angle.

The second guide surface 534b is disposed farther than the first guide surface 534a from the blower fan 541. The second guide surface 534b may be formed to have a planar shape parallel to a first direction D1. Here, the first direction D1 is defined as being an extension direction of the rotation shaft, that is, a front-rear direction.

The guide vane 534 is provided in a form in which the first guide surface 534a and the second guide surface 534b are connected. In other words, the guide vane 534 is provided in a form in which the first guide surface 534a formed to have a plane surface inclined to form a certain angle with the blowing surface Sw and the first guide surface 534a formed to have a plane surface parallel to the first direction D1 are connected.

In the present embodiment, the blower fan 541 is illustrated as including a small axial-flow fan. Due to characteristics of the portable air purifier 50 having a compact size to increase portability, there is a limitation in increasing a size of the blower fan 541. Therefore, the small axial-flow fan is applied as the blower fan 541 in the portable air purifier 50 of the present embodiment.

However, as a size of the axial-flow fan is reduced, blowing performance of the axial-flow fan is generally reduced by as much as the reduced size. Although there may be a method of applying an expensive axial-flow fan having a small size and high blowing performance as the blower fan 541, in this case, manufacturing costs of the portable air purifier 50 are increased more than necessary.

As a method of increasing the blowing performance of the portable air purifier 50 without using an expensive, high-performance axial fan, there is a method of focusing a blowing direction of the portable air purifier 50. That is, the blowing direction of the portable air purifier 50 is focused forward.

The axial-flow fan is a fan in which a flow direction of air is parallel to a rotation shaft of a blower fan and which suctions air from therebehind and discharges the air forward. In this case, most of the air discharged toward the front side of the axial-flow fan is discharged in a direction inclined radially outward the axial-flow fan. That is, most of the air discharged through the axial-flow fan is not moved straight toward the front side of the portable air purifier 50 and is widely spread in a lateral direction of the portable air purifier 50.

This is because a force generated by rotation of the axial-flow fan, that is, a force generated in a rotation direction of the axial-flow fan, is involved in air discharge of the axial-flow fan. That is, not only a force by which the axial-flow fan pushes air forward and also a force generated in the rotation direction of the axial-flow fan also acts on air discharged from the axial-flow fan.

Therefore, most of the air discharged through the axial-flow fan is not moved straight toward the front side of the portable air purifier 50 and is widely spread in the lateral direction of the portable air purifier 50. As described above, when most of the air discharged through the axial-flow fan is widely spread in the lateral direction of the portable air purifier 50, a front discharge range of purified air discharged from the portable air purifier 50 is inevitably reduced.

Therefore, in order to increase the front discharge range of the purified air discharged from the portable air purifier 50, a traveling direction of the air discharged through the axial-flow fan may be guided to be focused forward. That is, even though a lateral discharge width of the purified air discharged from the portable air purifier 50 is somewhat narrow, the traveling direction of the air discharged through the axial-flow fan being focused forward is advantageous in increasing a front discharge range of the purified air.

Due to characteristics of the portable air purifier 50 which is carried and used by a user, an effect obtainable by increasing the front discharge range of the purified air may have a greater influence than an effect obtainable by decreasing the lateral discharge width of the purified air. Therefore, there is a need for a design of a structure focusing the traveling direction of the air discharged through the axial-flow fan forward.

According to the present embodiment, the guide vane 534 is provided as a structure focusing the traveling direction of the air discharged through the axial-flow forward. This guide vane 534 is provided in the fan cover 530.

In order for a structure such as the guide vane 534 to be applied to the fan assemblies 540 and 545 themselves, all of the fan assembly 540 and 545 including the fan brackets 543 and 548 surrounding the blower fan 541 should be redesigned.

In general, the fan assemblies 540 and 545 are not manufactured exclusively for the portable air purifier 50 but are manufactured for general purpose and used. This is because using a fan assembly manufactured for general purpose rather than separately designing a fan assembly exclusively for the portable air purifier 50 is much more advantageous in terms of component management or costs.

In contrast, the fan cover 530 is separately designed to be applied to the portable air purifier 50 of the present embodiment. Therefore, the guide vane 534 is applied to the fan cover 530 in a process of designing the fan cover 530, and thus, a high cost or a great deal of time is not further required.

In addition, the fan cover 530 requires a structure for connecting the shield plate 530a configured to cover the hub 542 of the blower fan 541 to the fan cover 530. In consideration of such a point, in the present embodiment, a shape design for guiding a discharge direction of the air discharged from the blower fan 541 is applied to the guide vane 534 for supporting, to the fan cover 530, the shield plate 530a disposed at the central portion of the air discharge portion 532.

Accordingly, the first guide surface 534a and the second guide surface 534b are formed in the guide vane 534, and the air discharged from the blower fan 541 passes through regions in which the first guide surface 534a and the second guide surface 543b are disposed and is discharged forward from the portable air purifier 50.

[Configuration of Guide Vane]

Figure 49:
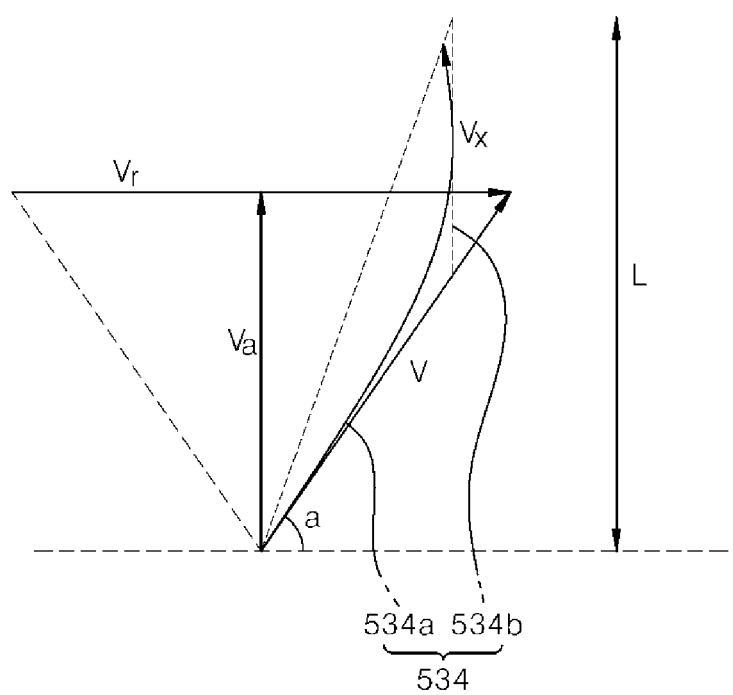
FIG. 49 is a view illustrating a velocity triangle that shows a velocity component of air discharged through a blowing surface.

FIG. 49 is a view illustrating a velocity triangle that shows a velocity component of air discharged through a blowing surface.

Hereinafter, shapes of the first guide surface 534a and the second guide surface 534b will be described in more detail with reference to FIGS. 15 and 47 to 49.

Referring to FIGS. 15 and 47 to 49, the first guide surface 534a is formed as a plane surface that forms a certain angle a with the blowing surface Sw. The second guide surface 534b may be formed as a plane surface parallel to the first direction D1. In this case, the angle a formed by the first guide surface 534a and the blowing surface Sw satisfies the following relationship.

$$a = \tan^{-1}[(va)/(vr)]$$

Here, a refers to an angle formed by the first guide surface 534a and the blowing surface Sw, va refers to a velocity vector (hereinafter, referred to as "first direction velocity vector") in the first direction D1 of a velocity vector of air discharged through the blowing surface Sw, and vr refers to a velocity vector (hereafter, referred to as "second direction velocity vector") in a radial direction of the blower fan 541 (hereinafter, referred to as "second direction D2") among the velocity vectors of the air passing through the blowing surface Sw.

va and vr may be determined by the following equations.

$r = (ro + ri)/2$ $A = \pi(ro^2 - ri^2)$ $va = Q/A$ $vr = \omega \times r$

Here, r refers to a distance from an rotation shaft to a center of the fan blade 544, ri refers to a radius of the hub 542, ro refers to a radius of the blower fan 541, A refers to an area of the blowing surface Sw, Q refers to an air flow rate of the blower fan 541, and ω refers to an angular velocity of the blower fan.

Accordingly, the first direction velocity vector va and the second direction velocity vector vr may be determined using pieces of information about the radius of the hub 542, a length of the fan blade 544, and a rotation velocity of the blower fan 541 which may be obtained through a specification of the blower fan 541.

An included angle between a velocity vector v of air discharged through the blowing surface Sw and the blowing surface Sw may be determined using pieces of information about the first direction velocity vector va and the second direction velocity vector vr obtained as described above.

The air discharged from the blower fan 541 first passes through the region in which the first guide surface 534a is disposed and then passes through the region in which the second guide surface 534b is disposed. The second guide surface 534b is formed to have a plane shape parallel to the first direction D1, and a flow direction of air, which passes through the region in which the first guide surface 534a is disposed, is guided by the second guide surface 534b.

Accordingly, in a process in which air flows along the second guide surface 534b forming a plane surface parallel to the first direction D1, the first direction velocity vector va of the air flowing along the second guide surface 534b is increased by being influenced by the second guide surface 534b. Since the sum of the first direction velocity vector va and the second direction velocity vector vr, that is, the velocity vector v of the air discharged through the blowing surface Sw, is not changed, the second direction velocity vector vr is decreased by as much as the increased first direction velocity vector va.

As described above, the increase in the first direction velocity vector va and the decrease in the second direction velocity vector vr mean that a direction of the velocity vector v of the air discharged through the blowing surface Sw is changed into a direction close to the first direction D1.

That is, the second guide surface 534b changes a discharge direction of air discharged from the blower fan 541 to the first direction D1 by increasing the first direction velocity vector va of the air discharged from the blower fan 541 and decreasing the second direction velocity vector vr thereof, thereby serving to focus a traveling direction of purified air discharged from the portable air purifier 50 forward.

Accordingly, in air passing through the region in which the guide vane 534 is disposed, since the first direction velocity vector va thereof is increased and the second direction velocity vector vr thereof is decreased, a velocity vector of the air is changed into a new form, and thus, the air has a velocity vector Vx. Air discharged with the velocity vector Vx may be discharged in a traveling direction concentrated further forward than before passing through the region in which the guide vane 534 is disposed. Therefore, the portable air purifier 50 concentrates a discharge direction of air forward and allows purified air to reach a position that is more distant therefrom.

When a flow direction of air is abruptly changed as described above, there is a high risk of turbulence in a process in which air passes the guide vane 534.

In consideration of such a point, in the present embodiment, the first guide surface 534a is disposed between the second guide surface 534b and the blower fan 541, and an approach of air to the second guide surface 534b is guided by the first guide surface 534a.

In order for air discharged from the blower fan 541 to pass through the second guide surface 534b without causing turbulence, the first guide surface 534a may form a plane surface in a direction parallel to a discharge direction of the air discharged from the blower fan 541.

To this end, it is necessary to determine the discharge direction of the air discharged from the blower fan 541. The discharge direction of the air discharged from the blower fan 541 may be expressed as the included angle a between the blowing surface Sw and a direction in which the air discharged from the blower fan 541 passes through the blowing surface Sw.

The included angle a may be determined using the first direction velocity vector va and the second direction velocity vector vr calculated above.

That is, $a = \tan^{-1}[(va)/(vr)]$.

The included angle a may be calculated using a relationship of $a = \tan^{-1}[(va)/(vr)]$.

The first direction velocity vector va and the second direction velocity vector vr may be determined using the pieces of information about the radius of the hub 542, the length of the fan blade 544, and the rotation velocity of the blower fan 541 which may be determined through the specification of the blower fan 541.

The angle a formed by the first guide surface 534a and the blowing surface Sw may be determined through the included angle a determined as described above. That is, the first guide surface 534a may be provided to form a plane surface in a direction parallel to the discharge direction of the air discharged from the blower fan 541 based on information about the included angle a determined as described above.

In the present embodiment, a length of the first guide surface 534a is illustrated as being the same as a length of the second guide surface 534b. In order for the air discharged from the blower fan 541 to pass through the second guide surface 534b without causing turbulence, the first guide surface 534a may be formed to have a sufficient length. In the present embodiment, a shape of the guide vane 534 is determined such that the length of the first guide surface 534a is at least the same as the length of the second guide surface 534b.

As the length of the second guide surface 534b is increased, it may be expected that the first direction velocity vector va is further increased. Accordingly, the length of the first guide surface 534a should also be increased. However, there is a limitation in increasing the length of the guide vane 534 due to characteristics of the portable air purifier 50. Therefore, the length of the second guide surface 534b is determined to be as long as possible within a length range, which may be occupied by the fan cover 530, and the length of the first guide surface 534a may be determined to be the same.

In addition, in order to avoid occurrence of turbulence, a portion between the first guide surface 534a and the second guide surface 534b connected to be inclined with respect to each other, an end of the first guide surface 534a, and an end of the second guide surface 534b are formed to have curved shapes.

Meanwhile, a plurality of guide vanes 534 are disposed in the fan cover 530 so as to be spaced apart from each other by a certain interval in the rotation direction of the blower fan 541. Preferably, the plurality of guide vanes 534 may be disposed in the fan cover 530 so as to be spaced apart from each other by the same interval.

The guide vanes 534 disposed as described above not only stably support the shield plate 530a at a plurality of points but also effectively guide the discharge direction of the air discharged from the blower fan 541 at a plurality of points.

Preferably, the number of the guide vanes 534 is set to be greater than the number of the fan blades 544. For example, when the number of fan blades 544 is nine, the number of guide vanes 534 is set to eleven. As a result, the number of points at which air is discharged by the blower fan 541 may be greater than the number of points at which air is discharged by the blower fan 541, thereby more effectively serving to guide a discharge direction of air.

In addition, the fan cover 530 of the present embodiment may be made of a synthetic resin injection molding material. Since the fan cover 530 is not a structure requiring high strength, the fan cover 530 may be sufficiently of a synthetic resin injection molding material that is easy to manufacture and is inexpensive. The fan cover 530 may be formed of a synthetic resin injection-molded product in which the upper cover portion 531, the lower cover portion 535, the shield plate 530a, and the guide vane 534 are integrally injection-molded.

As a thickness t of the guide vane 534 is decreased, a passage through which air passes through the fan cover 530 becomes wider. Thus, it is preferable that the thickness t of the guide vane 534 is as small as possible. However, when the thickness t of the guide vane 534 is too small, strength of the guide vane 534 is low, and injection molding is difficult. In consideration of such a point, the thickness t of the guide vane 534 may be set to 1 mm.

[Operation and Effect of Guide Vane]

Figure 50:
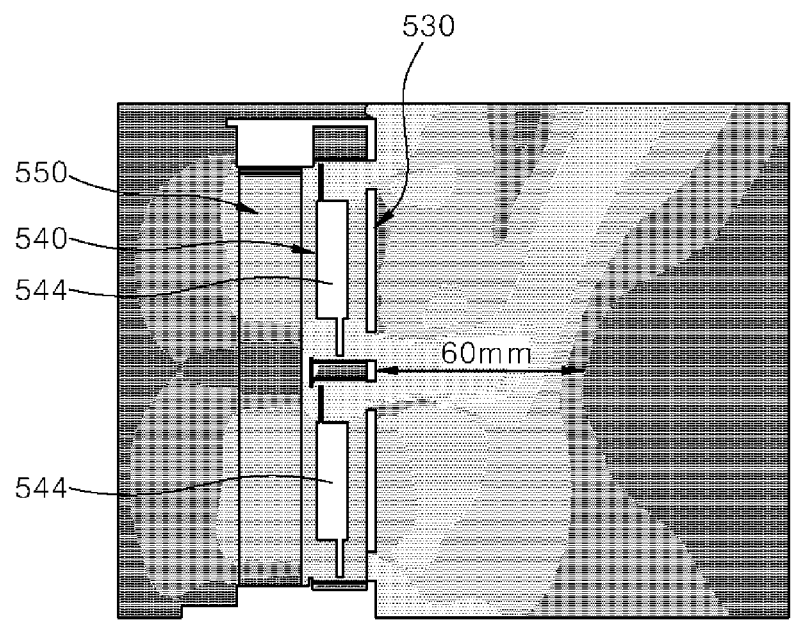
FIG. 50 is a view illustrating a flow analysis result of an air purifier in which a guide vane is not applied to a fan cover.
Figure 51:
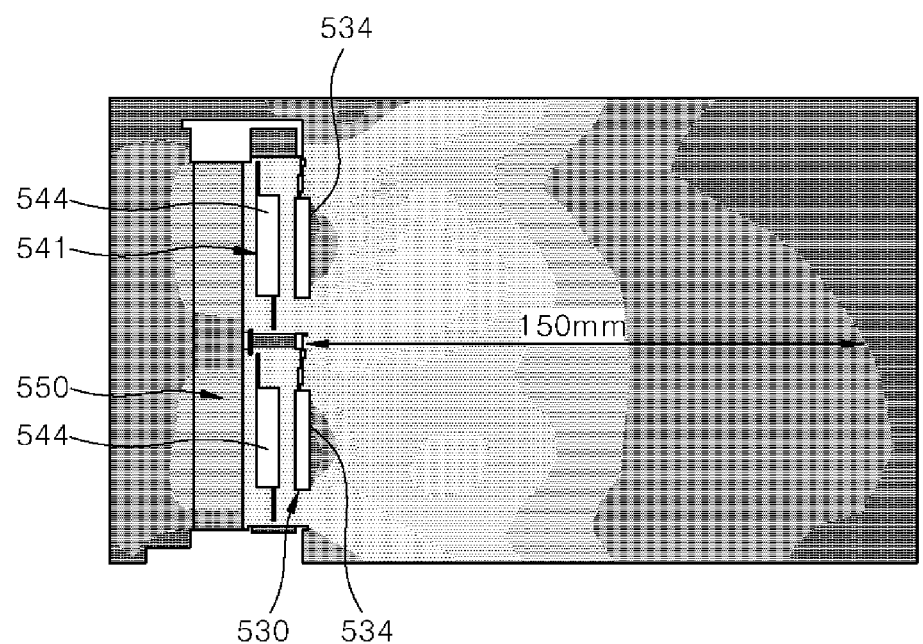
FIG. 51 is a view illustrating a flow analysis result of the portable air purifier according to the second embodiment of the present invention.
Figure 52:
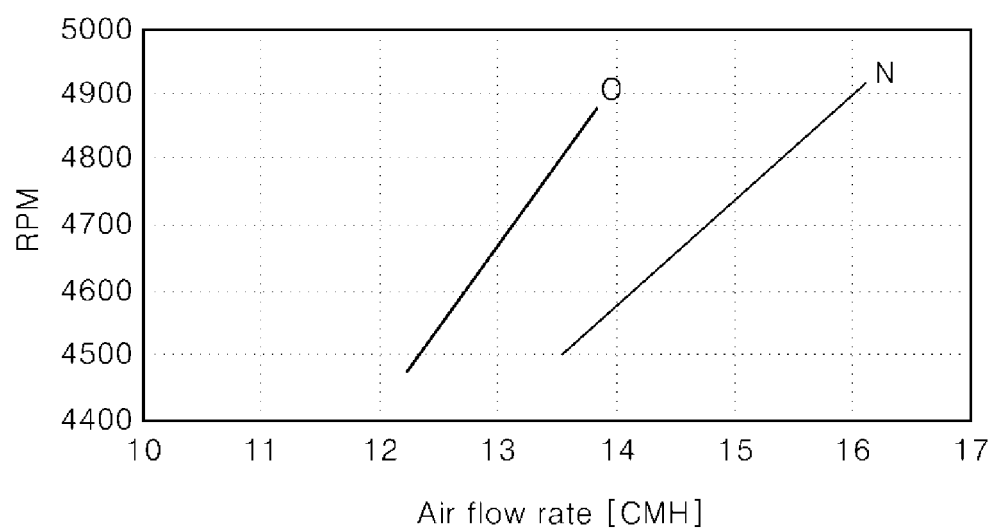
FIG. 52 is a graph showing results of measuring an air flow rate of the air purifier in which the guide vane is not applied to the fan cover and measuring an air flow rate of the air purifier according to the second embodiment of the present invention.

FIG. 50 is a view illustrating a flow analysis result of an air purifier in which a guide vane is not applied to a fan cover, and FIG. 51 is a view illustrating a flow analysis result of the portable air purifier according to the second embodiment of the present invention. FIG. 52 is a graph showing results of measuring an air flow rate of the air purifier in which the guide vane is not applied to the fan cover and measuring an air flow rate of the air purifier according to the second embodiment of the present invention, and FIG. 53 is a table showing the results of measuring the air flow rate of the air purifier in which the guide vane is not applied to the fan cover and measuring the air flow rate of the air purifier according to the second embodiment of the present invention.

FIGS. 50 and 52 show results of an experiment using a portable air purifier in which a guide vane is not applied to a fan cover. FIGS. 51 and 53 show results of an experiment using the portable air purifier according to the second embodiment of the present invention, that is, a portable air purifier in which a guide vane is applied to a fan cover.

In this case, a radius ro of the blower fan 541 was 29 mm, a radius ri of the hub was 16 mm, and a length L of the guide vane 534 was 5 mm. In FIGS. 50 and 51, an experiment was performed under a condition in which a rotation velocity of the blower fan 541 was 4,500 RPM. In FIGS. 47 and 53, an experiment was performed under a condition in which a rotation velocity of the blower fan 541 ranged from 4,500 RPM to 4,900 RPM. The remaining experimental conditions were the same, except whether a guide vane was applied to a fan cover.

Hereinafter, operations and effects of the guide vane according to the present embodiment will be described with reference to FIGS. 15 and 47 to 53.

As a result of an experiment, a front discharge distance of purified air discharged from a conventional air purifier was only about 60 mm (see FIG. 50), but it was confirmed that a front discharge distance of purified air discharged from the portable air purifier 50 of the present embodiment was about 150 mm (see FIG. 51)

That is, it was confirmed that the portable air purifier 50 of the present embodiment could discharge purified air forward about 2.5 times farther than the conventional air purifier. Such a result is due to the first direction velocity vector va of air discharged from the blower fan 541 being increased by the guide vane 534 to thereby improve straightness of purified air discharged from the portable air purifier 50. Thus, it could be seen that the guide vane 534 had a significant influence on an improvement in purified air discharge performance of the portable air purifier 50.

In addition, describing results of measuring an air flow rate of the conventional air purifier and measuring an air flow rate of the portable air purifier according to the present embodiment with reference to FIGS. 52 and 53, when a rotation velocity of a blower fan was 4,500 RPM, an air flow rate O of the conventional air purifier was measured to be 12.2 CMH, and an air flow rate N of the portable air purifier of the present embodiment was measured to be 13.5 CMH. That is, the air flow rate N of the portable air purifier of the present embodiment was measured to be about 10% greater than the air flow rate O of the conventional air purifier.

In addition, when a rotation velocity of the blower fan was 4,900 RPM, the air flow rate O of the conventional air purifier was measured to be 13.8 CMH, and the air flow rate N of the portable air purifier of the present embodiment was measured to be 16.1 CMH. That is, the air flow rate N of the portable air purifier of the present embodiment was measured to be about 16% greater than the air flow rate O of the conventional air purifier.

According to a result of the experiment, under all conditions, the air flow rate N of the portable air purifier of the present embodiment was measured to be greater than the air flow rate O of the conventional air purifier. The result shows that purified air discharge performance of the portable air purifier of the present embodiment is superior to that of the conventional air purifier.

In addition, although the air flow rate N of the conventional air purifier and the air flow rate N of the portable air purifier of the present embodiment were both increased as a rotation velocity of the blowing fan was increased. It can be seen that an increase in the air flow rate N of the portable air purifier of the present embodiment was greater.

The result shows that, as a rotation velocity of the blower fan is increased, the guide vane may further assist in an improvement in purified air discharge performance of the portable air purifier as an air flow rate of air passing through the guide vane is increased.

As described above, the portable air purifier of the present embodiment provided with the guide vane may improve straightness of purified air discharged forward using the guide vane, thereby increasing an amount of purified air from the portable air purifier that reaches a user's face. Accordingly, it is possible to provide more improved air purification performance.

In addition, more improved air discharge performance may be provided using a low cost general purpose fan instead of an expensive and high performance fan, thereby providing a high performance portable air purifier at a low cost.

Furthermore, according to the portable air purifier of the present embodiment, the guide vane may be applied to the fan cover in a process of designing the fan cover, thereby suppressing an increase in designing and manufacturing costs while providing improved air purification performance.

<Portable Air Purifier According to Third Embodiment of the Present Invention>

[Configuration of Portable Air Purifier]

Figure 54:
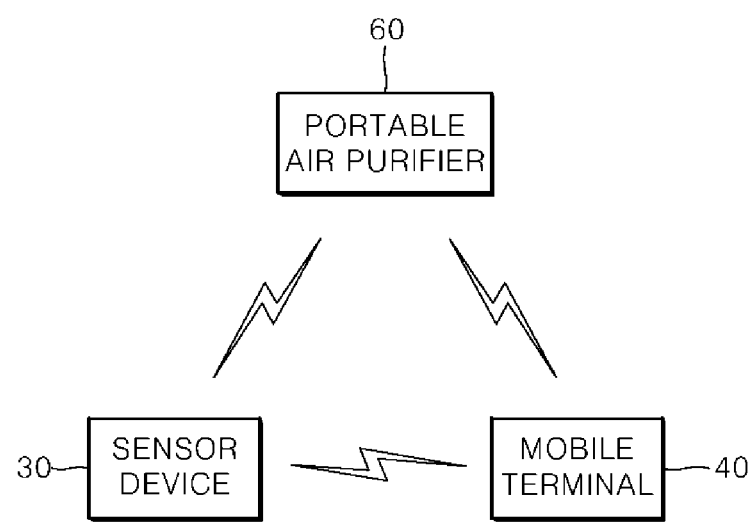
FIG. 54 is a view illustrating an example of devices connected to a portable air purifier according to a third embodiment of the present invention.
Figure 55:
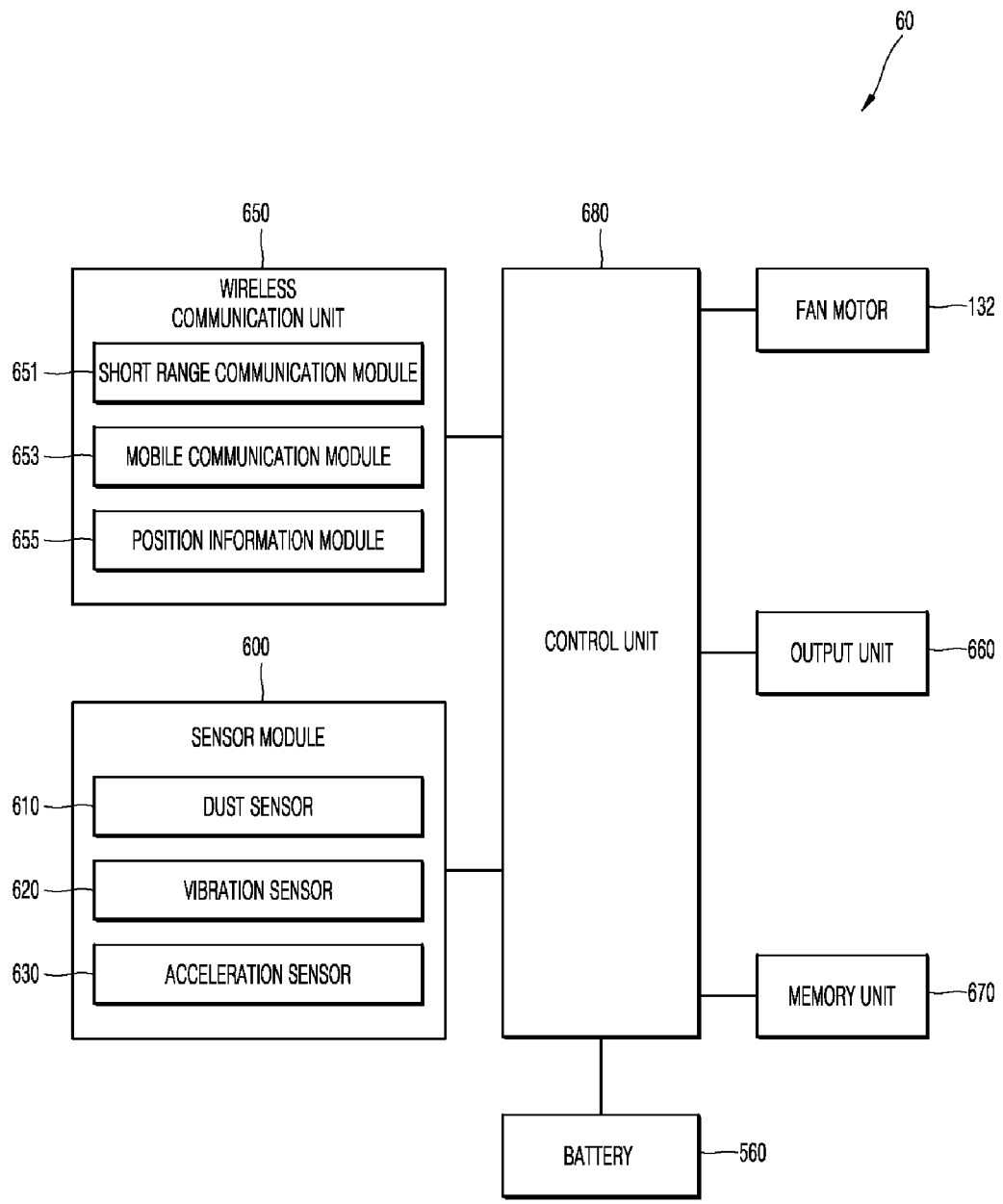
FIG. 55 is a block diagram illustrating a configuration of the portable air purifier according to the third embodiment of the present invention.

FIG. 54 is a view illustrating an example of devices connected to a portable air purifier according to a third embodiment of the present invention, and FIG. 55 is a block diagram illustrating a configuration of the portable air purifier according to the third embodiment of the present invention.

Referring to FIG. 54, a portable air purifier 60 according to the third embodiment of the present invention may be provided in a form which includes a configuration of any one of the portable air purifier 10 (see FIG. 1) according to the first embodiment of the present invention and the portable air purifier 50 (see FIG. 14) according to the second embodiment of the present invention.

The portable air purifier 60 according to the third embodiment of the present invention may communicate with a device such as a sensor device 30 or a mobile terminal 40. As the communication is performed, the portable air purifier 60 may transmit and receive various types of information, data, or commands to and from the sensor device 30 and the mobile terminal 40.

Referring to FIGS. 54 and 55, the sensor device 30 may include various sensors which sense air quality of a periphery of the portable air purifier 60 or an indoor space in which the portable air purifier 60 is disposed. For example, the sensors may include a dust sensor, a gas sensor, and the like. The sensor module 600 may sense air quality using the sensors and transmit sensed data to the portable air purifier 60 or the mobile terminal 40.

The portable air purifier 60 may determine that air quality is degraded based on the sensed data received from the sensor module 600, and in this case, the portable air purifier 60 may be automatically turned on to perform an air purifying function. Thereafter, the portable air purifier 60 may determine that the air quality is improved based on the sensed data received from the sensor module 600 and may be automatically turned off to stop the air purifying function.

In the present specification, turning the portable air purifier 60 on or off may mean turning an air purifying operation on or off, and an communication operation may be performed irrespective of whether the portable air purifier 60 is turned on or off.

A user of the mobile terminal 40 may check air quality based on the sensed data received from the sensor module 600 and turn the portable air purifier 60 on or off based on the checked air quality.

According to some embodiments, the portable air purifier 60 may provide various types of information about an operation and status of the portable air purifier 60 to the mobile terminal 40. For example, the portable air purifier 60 may provide various types of information, such as an air flow rate or a driving time of a blower fan, a state of a filter module 550, and a remaining capacity of a battery 560, to the mobile terminal 40.

The mobile terminal 40 may transmit a control command for remotely controlling turning-on or off of the portable air purifier 60 to the portable air purifier 60 according to a user's input or the like.

That is, the portable air purifier 60 may transmit and receive various types of information or commands through communication with the sensor module 600 or the mobile terminal 40.

The portable air purifier 60 may be used in a studio, an office, a vehicle interior, and a partitioned indoor space. In particular, since the portable air purifier 60 may have a relatively low purifying capacity as compared with a large air purifier, the portable air purifier 60 may be used in an indoor space having an area that is less than a certain area.

In an embodiment, the portable air purifier may be positioned in a vehicle interior. The portable air purifier 60 may be mounted on a structure in the vehicle interior. Since the portable air purifier 60 is formed to have an approximately hexahedral shape, the portable air purifier 60 may be disposed in a form which is stood up or laid down on a relatively flat surface. That is, since there is no restriction on the posture or installation position of the portable air purifier 60, the portable air purifier 60 may be used in various postures.

However, there may be a case in which the portable air purifier 60 is placed at a position out of reach of a driver. In this case, in a situation in which a fellow passenger is not riding, a driver may not smoothly operate the portable air purifier 60. In addition, during driving of a vehicle, the driver operating the portable air purifier 60 to turn the portable air purifier 60 on may be cumbersome and also increase a risk of an accident.

Therefore, the portable air purifier 60 according to the embodiment of the present invention may be automatically operated by detecting whether a vehicle is in a riding state, thereby preventing the above-described cumbersome and risk of accident. The riding state may mean a state in which a vehicle starts, that is, a state in which the vehicle stops or travels after start. That is, the riding state corresponds to a state in which a driver or fellow passenger rides in the vehicle and thus may be a state in which the portable air purifier 60 should be operated.

The portable air purifier 60 according to the present embodiment may include a wireless communication unit 650, a sensor module 600, an output unit 660, a memory unit 670, and a control unit 680.

At least one of the wireless communication unit 650, the sensor module 600, the memory unit 670, and the control unit 680 may be included in the main PCB 190 (see FIG. 3) according to the first embodiment of the present invention or the main PCB 595 (see FIG. 15) according to the second embodiment of the present invention. In addition, at least some of the wireless communication unit 650, the memory unit 670, and the control unit 680 may be implemented in the form of one integrated chip, or each of the wireless communication unit 650, the memory unit 670, and the control unit 680 may be implemented as a separate chip, circuit, or the like.

The wireless communication unit 650 may include a communication module which enables wireless communication between the portable air purifier 60 and the sensor module 600 or between the portable air purifier 60 and the mobile terminal 40. For example, the wireless communication unit 650 may include a short range communication module 651, a mobile communication module 653, and a position information module 655.

The short range communication module 651 may communicate with the sensor module 600 or the mobile terminal 40. For example, the short range communication module 651 may include a communication module supporting a low power wireless communication method (for example, a Bluetooth low energy (BLE) method), thereby minimizing power consumed when a communication function is performed. In addition, the short range communication module 651 may include a module supporting various short range communication methods, such as a Bluetooth communication module or a near field communication (NFC) module.

The mobile communication module 653 may communicate with the mobile terminal 40 or a server (not shown). For example, the mobile communication module 653 may include a module supporting a wireless communication method such as long term evolution (LTE) and Wi-Fi.

The position information module 655 is for acquiring position information of the portable air purifier 60 and may include a module for acquiring position information using various satellite navigation systems such as a global positioning system (GPS). As another example, the control unit 680 may also acquire position information of the portable air purifier 60 using the position information module 655 as well as the mobile communication module 653.

The sensor module 600 may include at least one sensor for sensing a state change of a space (for example, an interior of a transportation device (vehicle)) in which the portable air purifier 60 is disposed. For example, the sensor module 600 may include a dust sensor 610, a vibration sensor 620, and an acceleration sensor 630. As another example, the vibration sensor 620 may also be implemented as an acceleration sensor, and the vibration sensor 620 and the acceleration sensor 630 may correspond to one sensor instead of separate sensors.

The vibration sensor 620 senses vibration transmitted to the portable air purifier 60 while a transportation device starts or travels. The acceleration sensor 630 may sense an acceleration that is changed according to the traveling of the transportation device. The sensor module 600 may transmit sensed data acquired from the vibration sensor 620 and/or the acceleration sensor 630 to the control unit 680. The sensed data may include vibration data and/or acceleration data.

As another example, the sensor module 600 may be provided in the sensor device 30 instead of the portable air purifier 60. In this case, the portable air purifier 60 may receive sensed data through the wireless communication unit 650.

The output unit 660 may output information or notification related to operations of the portable air purifier 60. For example, the output unit 660 may be implemented as a light source or a display for outputting information or notification in a visual form or may be implemented as a speaker for outputting information or notification in the form of a voice.

The memory unit 670 may store data such as various types of information or algorithms for operating the portable air purifier 60. In particular, the memory unit 670 may store comparison data (hereinafter, referred to as learning data) for detecting a state of the transportation device from sensed data acquired from the sensor module 600.

The learning data may include riding data for detecting a riding state. The riding data may include vibration patterns or acceleration patterns when the transportation device starts and stops and may include vibration patterns or acceleration patterns when the transportation device is traveling.

The learning data may be provided in a pre-stored form when a product is released or may be received and stored from the mobile terminal 40 or the server. In addition, the learning data may be regularly or irregularly updated by the mobile terminal 40 or the server. The learning data will be described in detail below.

The control unit 680 may include one or more control units which control an overall operation of the portable air purifier 60.

The control unit 680 may detect whether the vehicle is in a riding state by using sensed data acquired from the sensor module 600. The riding state mean a state in which a transportation device such as a vehicle stops while the transportation device starts or is traveling. That is, the riding state may correspond to a state in which a person such as a driver, a fellow passenger, or a passenger is present in the transportation device.

For example, when the portable air purifier 60 is provided in the vehicle, the riding state may correspond to a state in which a driver or the like rides in the vehicle and starts the vehicle. Alternatively, when the user carries the portable air purifier 60, the riding state may include a state in which a user rides in a transportation device such as a bus or a train.

When the riding state is detected, the control unit 680 may drive a fan motor 132 to automatically perform an air purifying operation. In this case, a sensing operation is performed by a low power driving control unit among one or more control units included in the control unit 680. Therefore, even when the sensing operation is periodically or continuously performed, power consumed by the sensing operation may be minimized. An operation in which the control unit 680 detects the riding state will be described in more detail below.

Meanwhile, the control unit 680 may control driving of the blower fan, more specifically, driving of the fan motor 132 that rotates the blower fan, in order for the air purifying operation to be executed. The fan motor 132 may provide a rotational force to the blower fan during driving thereof, and air may flow according to rotation of the blower fan.

In particular, when the fan motor 132 is implemented as a BLDC motor or the like capable of adjusting a frequency, the control unit 680 may adjust a rotation velocity of the fan motor 132 to adjust an air flow rate based on an air flow rate adjustment request acquired through an operation of an air flow rate adjustment button 185 or communication with the mobile terminal 40 or based on a sensing result received from the sensor module 600. In this case, a control operation of the fan motor 132 may be performed by a control unit different from the low power driving control unit among the control units included in the control unit 680.

[Operation Control of Portable Air Purifier]

Figure 56:
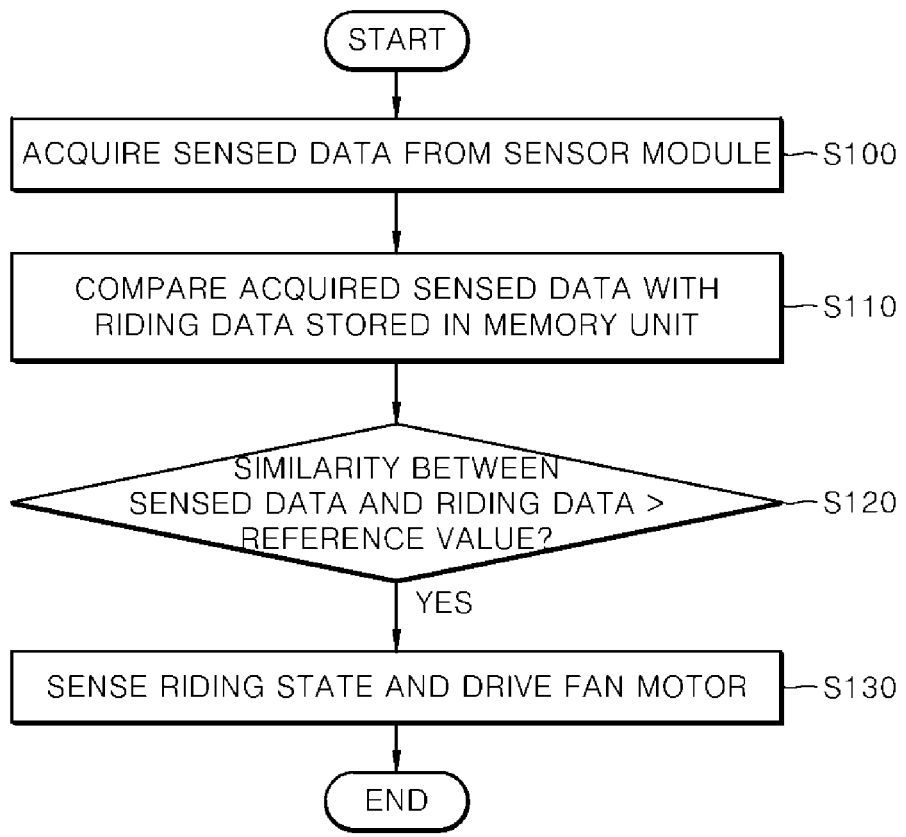
FIG. 56 is a flowchart illustrating an operation control process of the portable air purifier shown in FIG. 54.

FIG. 56 is a flowchart illustrating an operation control process of the portable air purifier shown in FIG. 54.

Referring to FIGS. 55 and 56, the portable air purifier 60 may acquire sensed data from the sensor module 600 (S100) and compare the acquired sensed data with riding data stored in the memory unit 670 (S110).

The vibration sensor 620 and/or the acceleration sensor 630 of the sensor module 600 may sense vibration transmitted from the outside, may sense a change in velocity, and may generate sensed data including vibration data and/or acceleration data based on sensing results. The sensor module 600 may transmit the generated sensed data to the control unit 680.

The control unit 680 may detect whether a current state corresponds to a riding state by comparing the sensed data acquired from the sensor module 600 with the riding data stored in the memory unit 670.

As a comparison result, when similarity between the sensed data and the riding data is higher than a reference value (YES in S120), the portable air purifier 60 may detect that the current state is the riding state and may control driving of the fan motor 132 (S130).

The control unit 680 may calculate the similarity between the sensed data and the riding data and may detect that a current vehicle is in the riding state when the calculated similarity is higher than or equal to the reference value.

For example, the similarity may mean the highest similarity among similarities between a pattern of vibration data and/or acceleration data included in the sensed data and patterns of a plurality of pieces of vibration data and/or a plurality of pieces of acceleration data included in the riding data. The similarity may be calculated using at least one of various known similarity measurement methods including a correlation analysis and the like.

When the riding state is detected, the control unit 680 may determine that a driver or a fellow passenger is present in the vehicle and may automatically perform an air purifying operation by driving the fan motor 132.

As another example, even when the riding state is detected, the control unit 680 may determine whether to perform the air purifying operation based on air quality determined based on data received from the sensor module 600. That is, even when the current state is the riding state, the control unit 680 may not drive the fan motor 132 or may stop driving of the fan motor 132 when air quality is higher than reference level.

FIGS. 57 to 59 are graphs showing illustrating examples of sensed data sensed by the sensor module of the portable air purifier according to whether a vehicle starts or travels.

Referring to FIGS. 55 to 59, the sensor module 600 may acquire sensed data using the vibration sensor 620 and/or the acceleration sensor 630 for a certain time (for example, a time between a first time point T1 and a second time point T2).

FIG. 57 illustrates an example of sensed data sensed by the sensor module 600 in a state in which the vehicle is turned off.

Referring to FIGS. 55 and 57, when the vehicle is turned off, vibration due to driving of an engine or the like may not be generated, and there may be no change in velocity of the vehicle. Accordingly, vibration data acquired by the vibration sensor 620 and acceleration data acquired by the acceleration sensor 630 may have a pattern that is maintained at zero without change.

Riding data included in learning data stored in the memory unit 670 may include the vibration data and acceleration data having patterns shown in FIG. 57. Accordingly, when the vibration data and the acceleration data as shown in FIG. 57 are acquired, the control unit 680 may detect that the current state is not the riding state and may not drive the fan motor 132.

FIG. 58 shows an example of sensed data sensed by the sensor module 600 in a state in which a vehicle stops after the vehicle starts.

Referring to FIGS. 55 and 58, when the vehicle starts, vibration may be generated due to driving of an engine or the like. On the other hand, since the vehicle stops, there may be no change in velocity. In this case, the vibration sensor 620 may acquire vibration data having a pattern in which vibration having a certain amplitude is maintained without large change, and the acceleration sensor 630 may acquire acceleration data having a pattern that maintains zero without change.

The vehicle start may mean that it is highly possible that a driver or a fellow passenger rides is in the vehicle. Accordingly, riding data included in learning data stored in the memory unit 670 may include vibration data and acceleration data having patterns similar to those of FIG. 58.

That is, when vibration data and acceleration data as shown in FIG. 58 are acquired, the control unit 680 detects that a current state is a riding state and may drive the fan motor 132 to perform an air purifying operation.

FIG. 59 shows an example of sensed data sensed by the sensor module 600 in a state in which a vehicle is traveling.

Referring to FIGS. 55 and 59, when the vehicle is traveling, vibration may be irregularly generated due to driving of an engine, a state of a road surface, or the like. In addition, since the vehicle is traveling, a change in velocity may occur. In this case, as shown in FIG. 59, the vibration sensor 620 may acquire vibration data having an irregular pattern, and the acceleration sensor 630 may also acquire acceleration data having an irregular pattern.

The vehicle traveling may mean that a driver rides in the vehicle. Accordingly, riding data included in learning data stored in the memory unit 670 may include vibration data and acceleration data having patterns similar to those of FIG. 59.

That is, when vibration data and acceleration data as shown in FIG. 59 are acquired, the control unit 680 detects that a current state is a riding state and may drive the fan motor 132 to perform an air purifying operation.

As another example, the control unit 680 may detect whether the vehicle is in a riding state using only vibration data. That is, when the vibration data as shown in FIG. 58 or 59 is acquired, the control unit 680 detects that a current state is a riding state.

That is, the portable air purifier 60 may detect a state of a transportation device in which the portable air purifier 60 is disposed using sensed data acquired from the sensor module 600. The state of the transportation device may be related to whether a user is present in the transportation device, and as a detection result, the portable air purifier 60 may automatically perform an air purifying operation in a riding state in which it is determined that a user is present.

Accordingly, it is possible to resolve inconvenience for a user to operate the portable air purifier 60 whenever the user boards the transportation device. In addition, it is possible to effectively prevent a risk of accident that may occur when a driver operates the portable air purifier 60 while driving.

Figure 60:
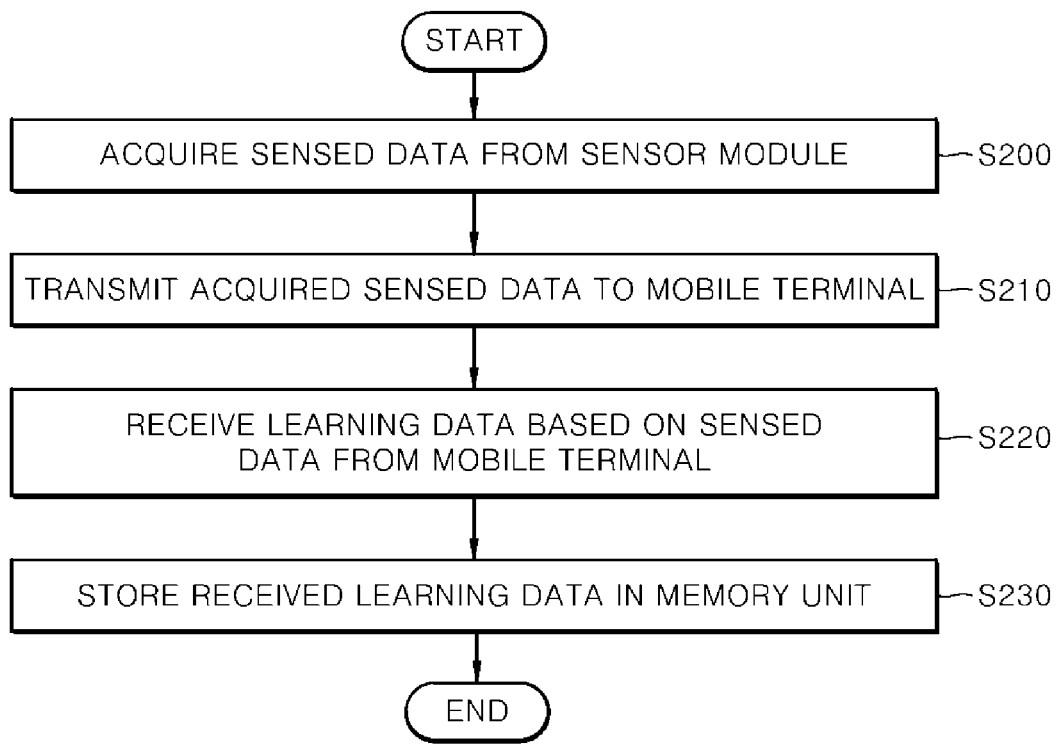
FIG. 60 is a flowchart illustrating an example of an operation of acquiring learning data used for detecting a riding state by a portable air purifier according to an embodiment of the present invention.
Figure 61:
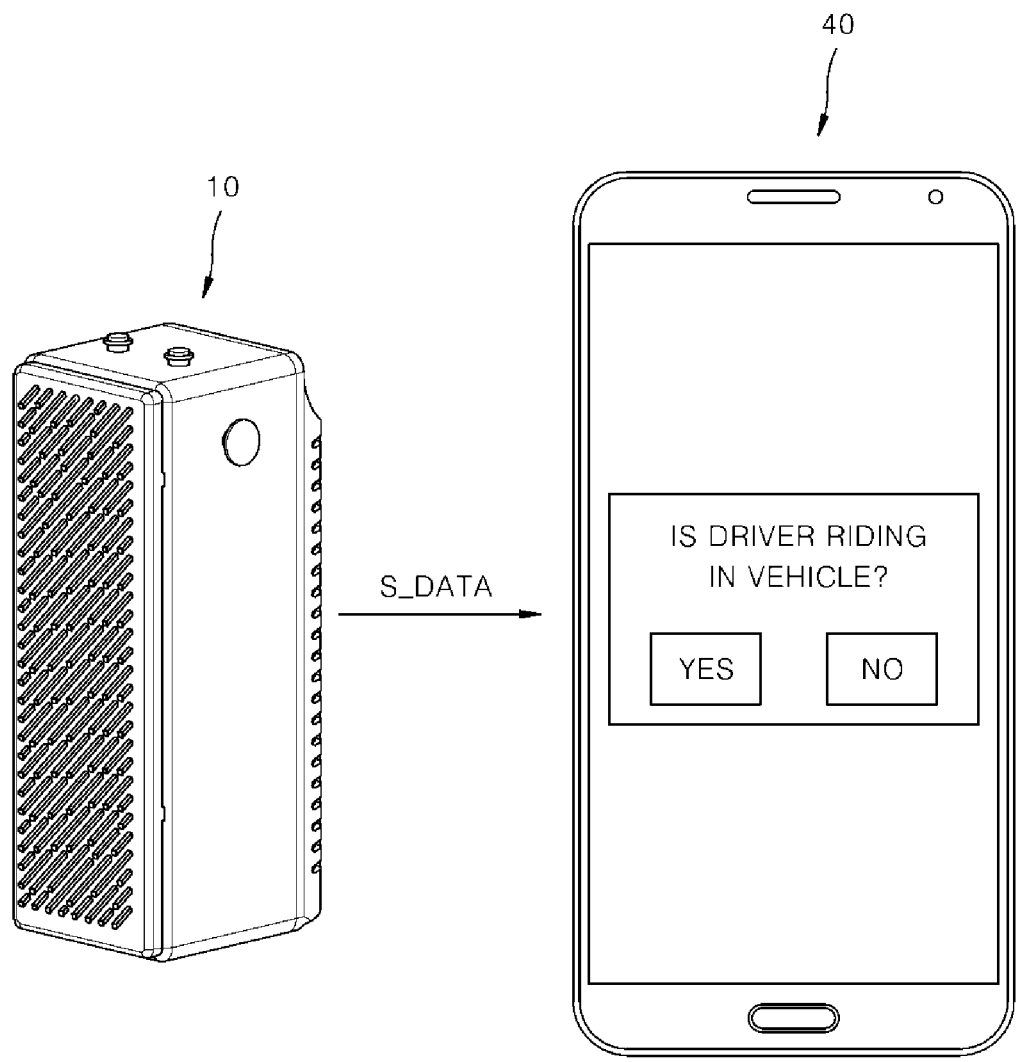
FIG. 61 is an exemplary view illustrating a process in which a mobile terminal generates learning data using sensed data received from the portable air purifier in relation to the embodiment shown in FIG. 60.

FIG. 60 is a flowchart illustrating an example of an operation of acquiring learning data used for detecting a riding state by a portable air purifier according to an embodiment of the present invention, and FIG. 61 is an exemplary view illustrating a process in which a mobile terminal generates learning data using sensed data received from the portable air purifier in relation to the embodiment shown in FIG. 60.

Referring to FIGS. 55 and 60, the portable air purifier 60 may acquire sensed data from the sensor module 600 (S200) and may transmit the acquired sensed data to the mobile terminal 40 (S210).

The mobile terminal 40 may confirm whether the received sensed data is sensed data in a riding state, and when a current state is the riding state as a confirmation result, the mobile terminal 40 may update the riding data based on the sensed data. For example, the mobile terminal 40 may update the riding data such that a vibration pattern and/or an acceleration pattern of the sensed data are included in the riding data.

In this regard, referring to FIGS. 55 and 61, the control unit 680 of the portable air purifier 60 may acquire sensed data S_DATA from the sensor module 600. The control unit 680 may transmit the acquired sensed data S_DATA to the mobile terminal 40 through the wireless communication unit 650.

The mobile terminal 40 may confirm whether the received sensed data S_DATA is the sensed data in the riding state. For example, the mobile terminal 40 may display an interface for confirming whether a user is riding in a transportation device through a display. The user may input information about whether the user is riding in the transportation device based on the displayed interface.

When the input information corresponds to "the user is riding in the transportation device," the mobile terminal 40 may update the riding data based on the sensed data S_DATA. As described above, the mobile terminal 40 may update the riding data such that a vibration pattern and/or an acceleration pattern included in the sensed data S_DATA are included in the riding data, but the present invention is not necessarily limited thereto.

Meanwhile, referring to FIGS. 55 and 60, the portable air purifier 60 receives learning data based on the sensed data from the mobile terminal 40 (S220). The portable air purifier 60 may store the received learning data in the memory unit 670 (S230).

The mobile terminal 40 may transmit the learning data including the updated riding data to the portable air purifier 60. The portable air purifier 60 may store the received learning data in the memory unit 670. Thereafter, when sensed data is acquired from the sensor module 600, the control unit 680 may detect whether a current state is a riding state using learning data.

That is, the portable air purifier 60 may transmit the sensed data acquired from the sensor module 600 to the mobile terminal 40 and may acquire the riding data updated based on the sensed data from the mobile terminal 40. That is, since a kind of data learning is possible, the portable air purifier 60 may more accurately detect a riding state.

Figure 62:
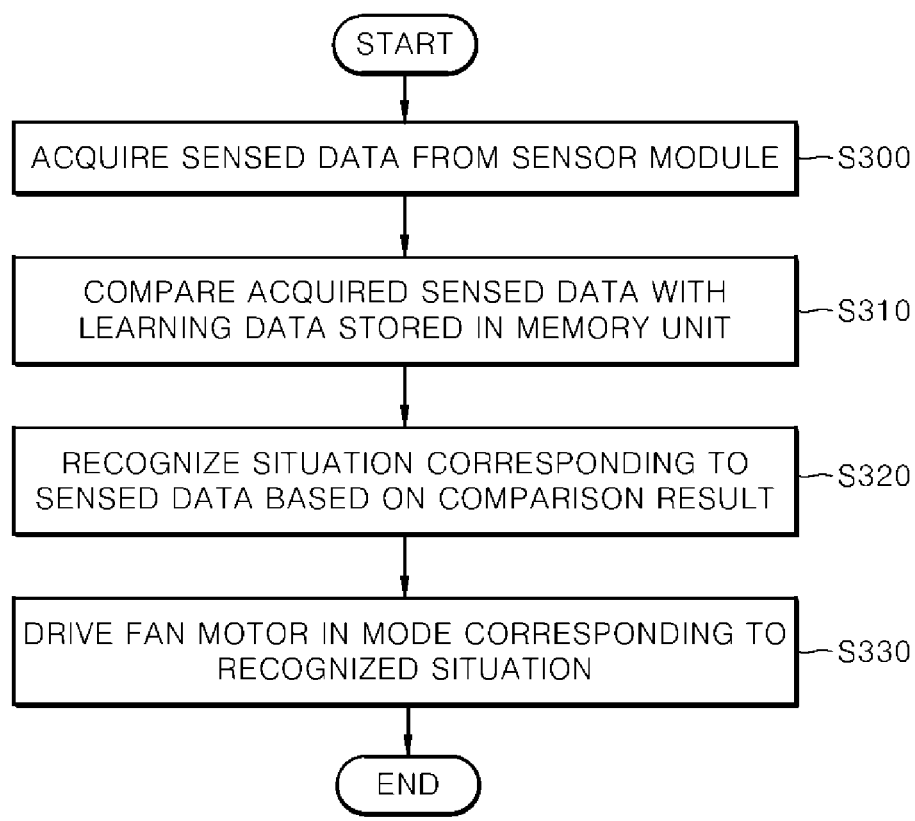
FIG. 62 is a flowchart illustrating another example of a control operation of the portable air purifier according to the third embodiment of the present invention.

FIG. 62 is a flowchart illustrating another example of a control operation of the portable air purifier according to the third embodiment of the present invention.

Referring to FIG. 62, the portable air purifier 60 may acquire sensed data from the sensor module 600 (S300) and may compare the acquired sensed data with learning data stored in the memory unit 670 (S310).

Operations S300 and S310 may be similar to operations S100 and S110 of FIG. 6.

However, the learning data in FIG. 62 may include data corresponding to each of various situations as well as the above-described riding data.

For example, the learning data may include data corresponding to each of various situations such as situations in which the portable air purifier 60 is positioned in a home, an office, and an outdoor space.

The portable air purifier 60 may recognize a situation corresponding to sensed data based on a comparison result (S320).

For example, the control unit 680 may extract data having the highest similarity with the sensed data among pieces of data included in the learning data and may recognize a situation corresponding to the extracted data.

As another example, the control unit 680 may acquire position information of the portable air purifier 60 from the position information module 655 and may recognize a situation of the portable air purifier 60 using the acquired position information and/or the sensed data.

The portable air purifier 60 may drive the fan motor 132 in a mode corresponding to the recognized situation to perform an air purifying operation (S330).

That is, the control unit 680 may drive the fan motor 132 at different intensities based on the mode corresponding to the recognized situation.

For example, when a situation in which the portable air purifier 60 is positioned in an office is compared with a situation in which the portable air purifier 60 is positioned in an outdoor space, it is necessary to increase intensity of an air flow rate in the situation in which the portable air purifier 60 is positioned in the outdoor space. Accordingly, the control unit 680 may drive the fan motor 132 such that intensity of an air flow rate in the situation in which the portable air purifier 60 is positioned in the outdoor space is greater than intensity of an air flow rate in the situation in which the portable air purifier 60 is positioned in the office.

That is, the portable air purifier 60 may recognize a situation of the portable air purifier 60 based on sensed data acquired from the sensor module 600 and position information acquired from the position information module 655 and may perform an air purifying operation in an optimal mode corresponding to the recognized situation. Accordingly, ease of use of the portable air purifier 60 may be maximized, and satisfaction of a product may also be improved.

[Portable Air Purifier According to Fourth Embodiment of the Present Invention]

[Configuration of Portable Air Purifier]

Figure 63:
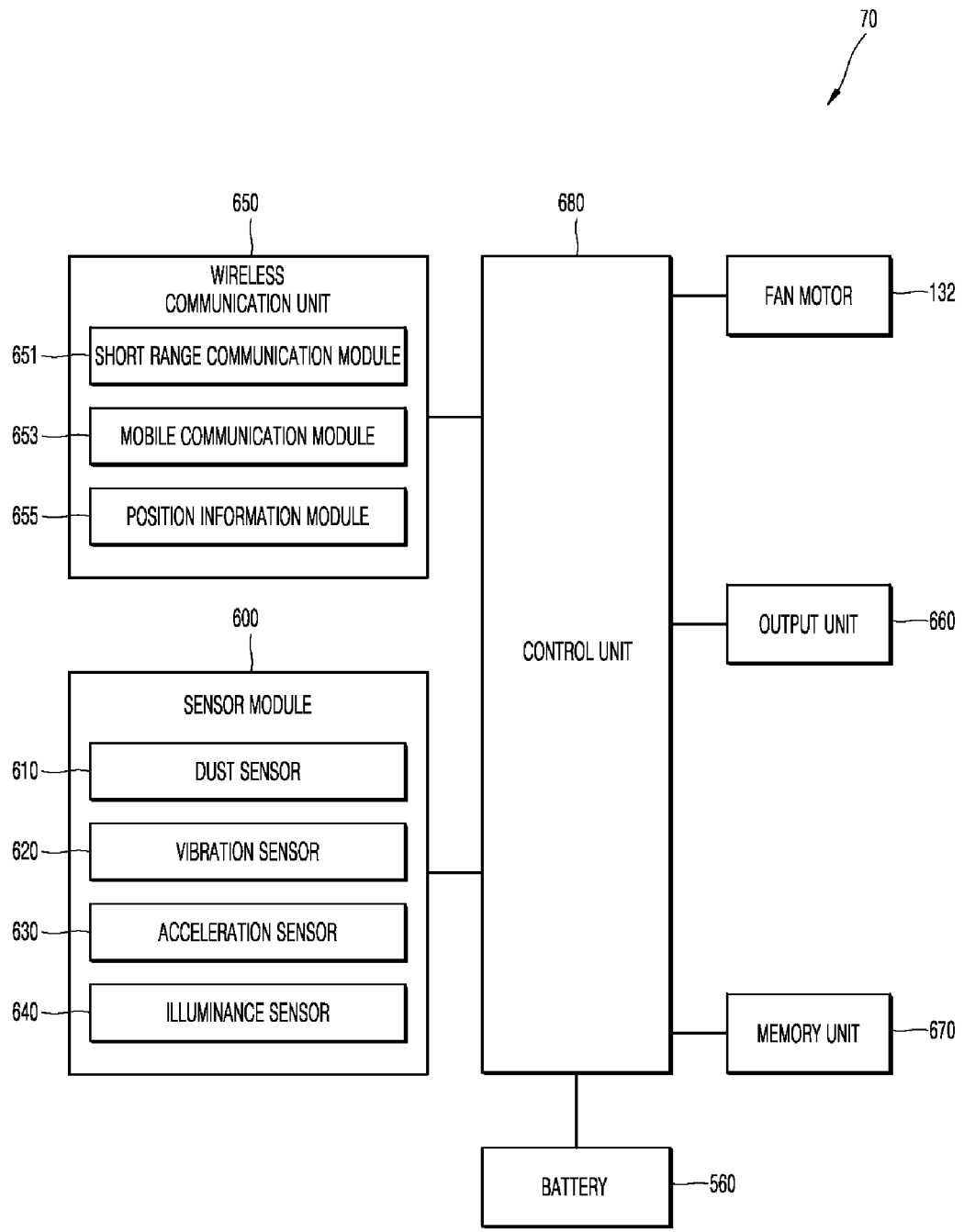
FIG. 63 is a block diagram illustrating a configuration of a portable air purifier according to a fourth embodiment of the present invention.

FIG. 63 is a block diagram illustrating a configuration of a portable air purifier according to a fourth embodiment of the present invention.

Referring to FIG. 63, a portable air purifier 70 according to the fourth embodiment of the present invention may further include an illuminance sensor 640. The illuminance sensor 640 may sense brightness around the portable air purifier 70 and may transmit sensed data to a control unit 580 of the portable air purifier 70 or a mobile terminal 40.

That is, a sensor module 600 of the portable air purifier 70 according to the present embodiment may include a dust sensor 610, a vibration sensor 620, an acceleration sensor 630, and the illuminance sensor 640. The control unit 680 may control an operation of the portable air purifier 70 using the sensors.

[First Example of Operation Control of Portable Air Purifier]

Figure 64:
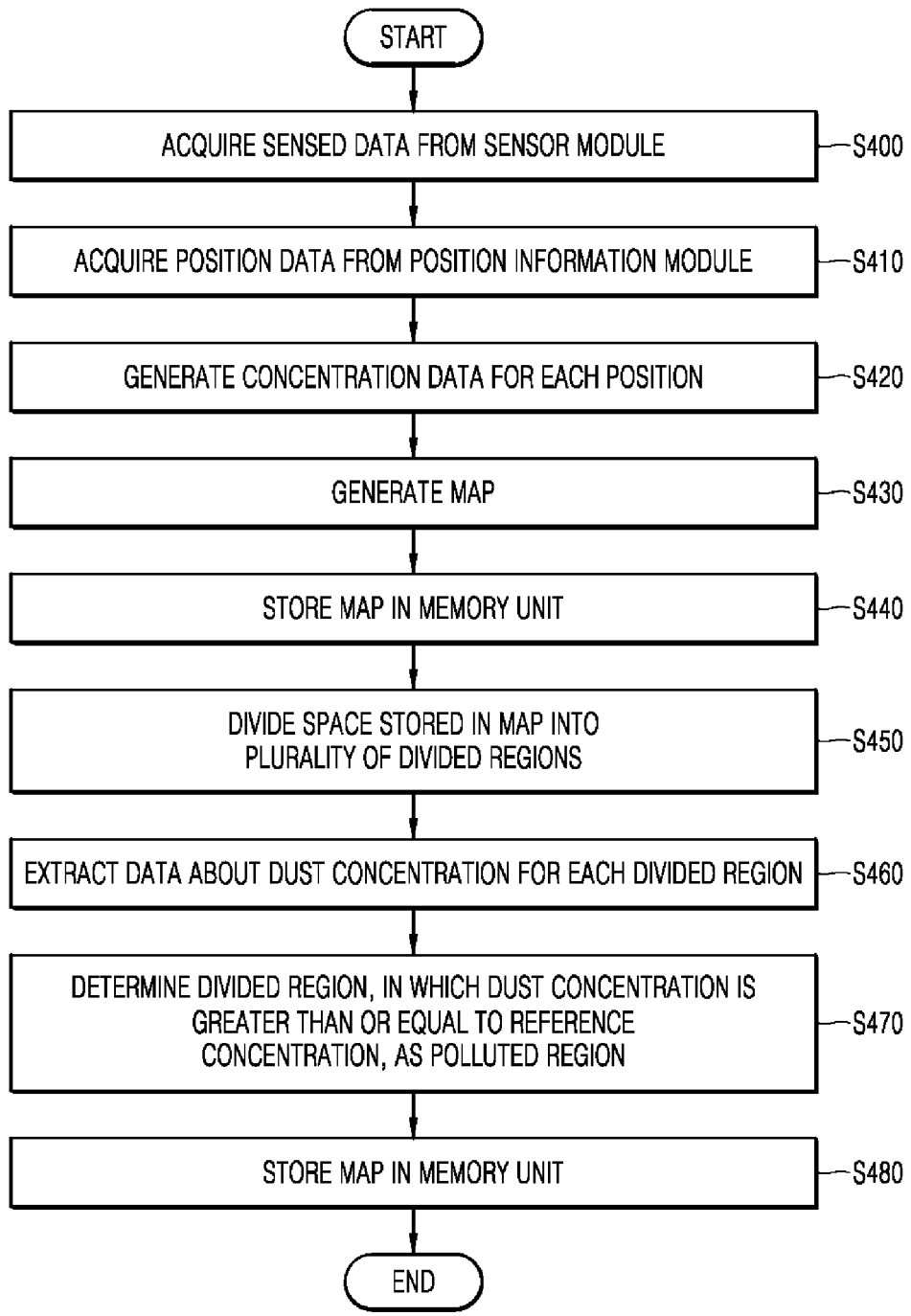
FIG. 64 is a flowchart illustrating a first example of an operation control process of the portable air purifier shown in FIG. 63.
Figure 65:
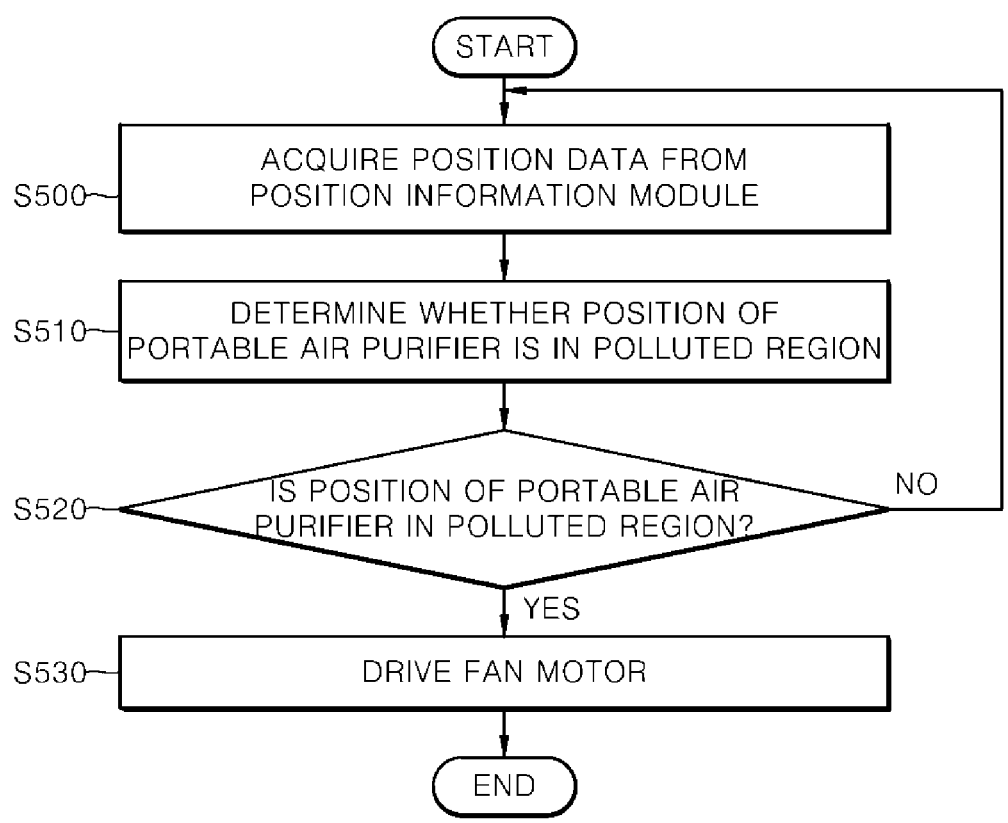
FIG. 65 is a flowchart illustrating a second example of an operation control process of the portable air purifier shown in FIG. 63.

FIG. 64 is a flowchart illustrating a first example of an operation control process of the portable air purifier shown in FIG. 63, and FIG. 65 is a flowchart illustrating a second example of an operation control process of the portable air purifier shown in FIG. 63.

Hereinafter, the first example and the second example of the operation control process of the portable air purifier of the present embodiment will be described with reference to FIGS. 63 and 65.

Referring to FIG. 63, the portable air purifier 70 according to the present embodiment may be used as a portable dust meter. That is, the portable air purifier 70 may not be operated for purifying air and may be used only for measuring a concentration of dust in air.

Since the portable air purifier 70 of the present embodiment is provided in a small and light form so as to be easily portable, it is suitable for a user to measure a dust concentration in a desired place while carrying the portable air purifier 70.

The portable air purifier 70 provides an advantage of allowing the user to easily and conveniently measure a dust concentration at a specific time point in a place desired by the user.

Meanwhile, the portable air purifier 70 of the present embodiment may provide not only a function of measuring a dust concentration at a specific point and a specific time point but also a function of collecting results measured at a plurality of points and generating a map on which a concentration for each position is recorded based on the collected results. Hereinafter, a control process of the portable air purifier 70 for providing the functions will be described.

Referring to FIGS. 63 and 64, the portable air purifier 70 acquires sensed data from the sensor module 600 (S400) and also acquires position data from the position information module 655 (S410).

The dust sensor 610 of the sensor module 600 may sense dust in air and may generate sensed data including dust concentration data based on a sensing result. The sensor module 600 may transmit the generated sensed data to the control unit 680.

The position information module 655 may detect a position at a time point at which the dust sensor 610 senses dust in air and may generate position data based on a detection result. The position information module 655 may transmit the generated position data to the control unit 680.

The control unit 680 generates data about a dust concentration for each position (hereinafter, referred to as "dust concentration data for each position") based on the sensed data transmitted from the sensor module 600 and the position data transmitted from the position information module 655 (S420).

When operations S400 to S420 are repeated and thus dust concentration data about a certain concentration or more is collected, the control unit 680 generates a map on which a dust concentration for each position is recorded based on the collected dust concentration data (S430).

The control unit 680 generates a map based on dust concentration data collected at various positions, and thus, a dust concentration for each position is recorded on the map.

When the same dust concentration data is repeatedly collected based on position data that is the basis for generation of dust concentration data, the control unit 680 may calculate an average value of pieces of sensed data recorded in the pieces of collected dust concentration data. That is, the control unit 680 may calculate an average value of pieces of sensed data included in pieces of dust concentration data generated at the same position and may record a dust concentration at a corresponding position on a map based on the calculated average value of the pieces of sensed data.

The map generated as described above is stored in the memory unit 670 (S440). As described above, the map stored in the memory unit 670 may be used as data for displaying an air pollution state for each position in a corresponding space to a user.

For example, the map may be transmitted to the mobile terminal 40, and information stored in the map, that is, the air pollution state for each position may be displayed to the user through the mobile terminal 40. In this case, the mobile terminal 40 may display a shape of a space stored in the map together with a dust concentration for each position in a corresponding space.

As an example, the dust concentration for each position may be expressed as a density of color indicating the presence of dust. For example, on a screen of the mobile terminal 40, a position at which a dust concentration is higher may be expressed as a color having higher density, and a position at which a dust concentration is lower may be expressed as a color having lower density.

Accordingly, the user may quickly and easily confirm a position at which an air pollution level is high in a space in which the user lives through information displayed on the screen of the mobile terminal 40. In addition, the user may easily and quickly acquire information necessary for grasping a cause of air pollution and a position of an air pollution source by confirming a position at which an air pollution level is high in a space in which the user lives.

In addition, the portable air purifier 70 may divide a space in which air quality is measured into a plurality of divided regions and may acquire and provide data about an air pollution level for each divided region.

To this end, the control unit 680 divides a space stored in the map generated as described above into a plurality of divided regions (S460) and extracts data about a dust concentration for each divided region (S470). The control unit 680 determines a divided region having a dust concentration greater than or equal to a preset reference concentration among the plurality of divided regions as a polluted region (S460).

Then, the control unit 680 records a position of the polluted region on the map (S470), and such data is stored in the memory unit 670 (S480). The data stored as described above may be used as data for controlling operation of the portable air purifier 70.

That is, the map generated as described above may be used as data for controlling the operation of the portable air purifier 70 as well as data for allowing the user to check an air pollution state for each position.

Referring to FIGS. 63 and 65, when the user moves with the portable air purifier 70, an operation in which the position information module 655 detects a position of the portable air purifier 70 in real time may be performed (S500).

The control unit 680 determines whether the position of the portable air purifier 70 is in the polluted region based on real-time position data acquired by the position information module 655 (S510).

When the position of the portable air purifier 70 detected by the position information module 655 is in the polluted region recorded in the memory unit 670 (S520), the control unit 680 may control the operation of the portable air purifier 70 to drive a fan motor 132 (S530).

In this case, the control unit 680 may control the operation of the portable air purifier 70 to drive the fan motor 132 irrespective of sensed data generated using the dust sensor 610.

That is, even when a dust concentration sensed in real time by the dust sensor 610 is lower than a preset reference concentration, as long as the position of the portable air purifier 70 detected by the position information module 655 is in the polluted region recorded in the memory unit 670, the control unit 680 may control the operation of the portable air purifier 70 to unconditionally drive the fan motor 132.

In a region determined as a polluted region as a result of a large number of times of dust concentration measurement and long-term data accumulation, even when a dust concentration is measured to be low in some cases, a dust concentration is likely to rise again. This is because a region determined as a polluted region is a region close to a dust causing factor or a region into which dust may be easily introduced.

In addition, the dust sensor 610 may malfunction at a moment when the portable air purifier 70 is positioned in the polluted region, and thus, there is a possibility that a dust concentration may be measured to be lower than an actual concentration.

In consideration of such a point, in the present embodiment, as long as the position of the portable air purifier 70 detected by the position information module 655 is in the polluted region recorded in the memory unit 670, the control unit 680 performs an operation control to unconditionally drive the fan motor 132.

Accordingly, as long as a user enters a region in which an air pollution level is high, the portable air purifier 70 may automatically perform an air purifying operation. As a result, the portable air purifier 70 of the present embodiment may reduce a possibility that the user is exposed to a polluted environment and may make a contribution such that the user lives in a more comfortable environment.

[Third Example of Operation Control of Portable Air Purifier]

Figure 66:
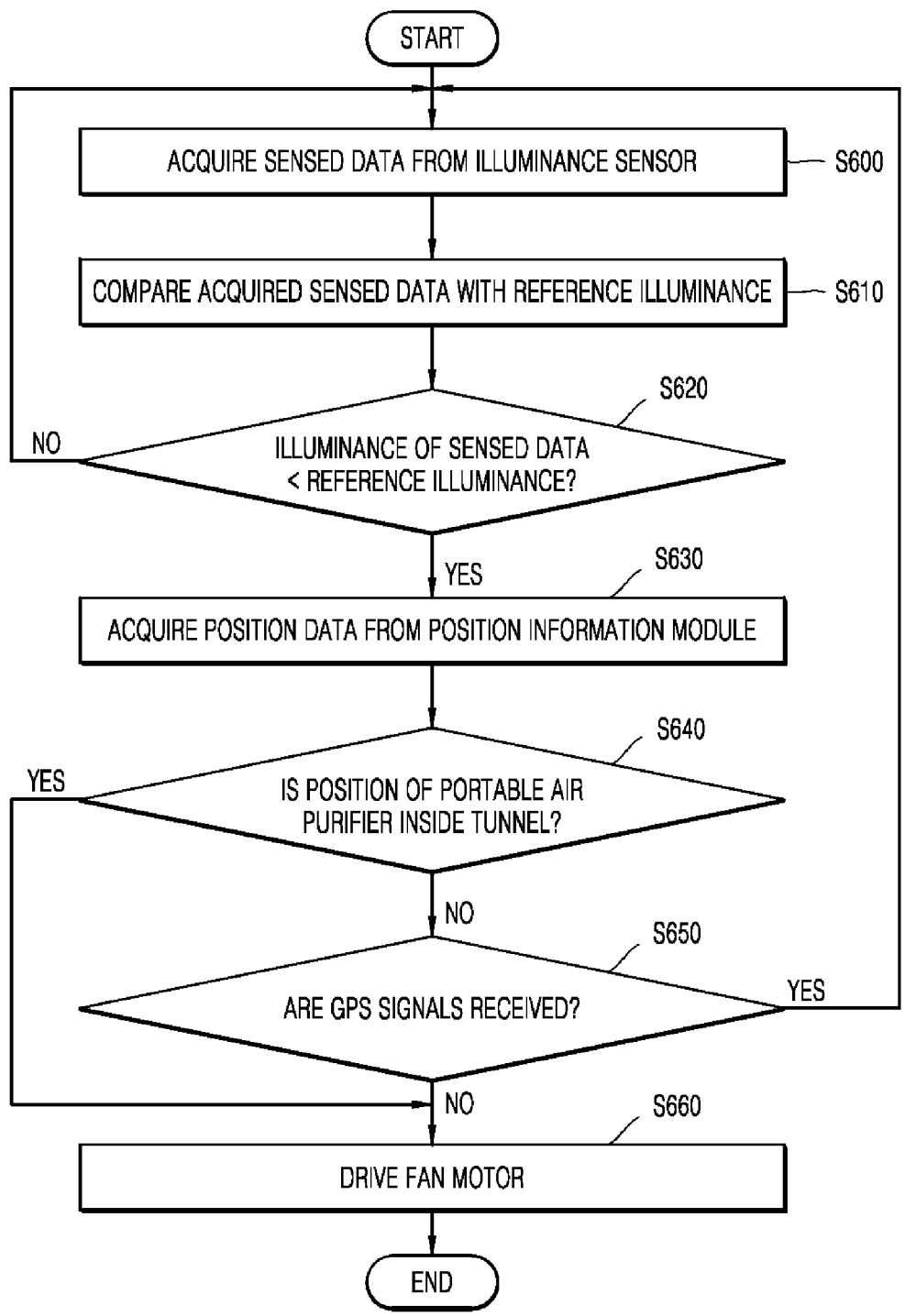
FIG. 66 is a flowchart illustrating a third example of an operation control process of the portable air purifier shown in FIG. 63.

FIG. 66 is a flowchart illustrating a third example of an operation control process of the portable air purifier shown in FIG. 63.

Referring to FIGS. 63 and 66, the portable air purifier 70 of the present embodiment may control operation of the portable air purifier 70 using sensed data acquired by the illuminance sensor 640.

As an example, when illuminance around the portable air purifier 70 measured by the illuminance sensor 640 is less than or equal to preset reference illuminance, the portable air purifier 70 may consider that a vehicle loaded with the portable air purifier 70 is positioned inside a tunnel and an air purifying operation may start.

To this end, the portable air purifier 70 acquires sensed data from the sensor module 600 (S600). The illuminance sensor 640 of the sensor module 600 senses illuminance around the portable air purifier 70 and may generate sensed data including data about illuminance (hereinafter, referred to as "illuminance data") based on a sensing result. The sensor module 600 may transmit the generated sensed data to the control unit 680.

The control unit 680 compares the illuminance data included in the sensed data acquired by the illuminance sensor 640 with the preset reference illuminance (S610). In this case, the reference illuminance may be set to a value that corresponds to or is slightly higher than illuminance in the vehicle when the vehicle is positioned inside the tunnel.

As a comparison result, when the illuminance around the portable air purifier 70 sensed by the illuminance sensor 640 is lower than the reference illuminance (S620), the position information module 655 is operated, and the control unit 680 acquires position data from the position information module 655 (S630).

The position information module 655 may detect a position at a time point at which the illuminance sensor 640 senses the illuminance around the portable air purifier 70 and may generate position data based on a detection result. The position information module 655 may transmit the generated position data to the control unit 680. In the present embodiment, the position information module 655 is illustrated as including a GPS receiver for receiving GPS signals.

The control unit 680 determines whether the portable air purifier 70 is positioned inside the tunnel based on the position data generated by the position information module 655. When whether the vehicle loaded with the portable air purifier 70 is positioned inside the tunnel is determined using only the illuminance data generated by the illuminance sensor 640, an inaccurate result not matching an actual result may be deduced. This is because there are plenty of cases in which illuminance is lower than the reference illuminance even when the portable air purifier 70 is not positioned inside the tunnel.

Even so, when the position information module 655 is continuously operated to continuously grasp the position of the portable air purifier 70, power consumption is increased more than necessary due to characteristics of the position information module 655 that receives GPS signals using the GPS receiver.

The portable air purifier 70 may be operated using only a battery without being connected to a power source of the vehicle. In this case, an operation time of the portable air purifier 70 is reduced by as much as the increased power consumption. Therefore, the position information module 655 being continuously operated to continuously grasp the position of the portable air purifier 70 is not a desirable method.

In consideration of such a point, only when the illuminance around the portable air purifier 70 is lower than the reference illuminance, the portable air purifier 70 of the present embodiment may be operated such that the position information module 655 acquires position data.

Accordingly, it is possible to grasp the position of the portable air purifier 70 at high accuracy while suppressing unnecessary power consumption of the portable air purifier 70.

According to the present embodiment, the control unit 680 determines whether the portable air purifier 70 is positioned inside the tunnel by using the GPS signals received through the GPS receiver (S640). As a result, when it is confirmed that the portable air purifier 70 is positioned inside the tunnel, the control unit 680 may control the operation of the portable air purifier 70 to drive the fan motor 132 (S660).

When it is not confirmed that the portable air purifier 70 is positioned inside the tunnel, the control unit 680 may check whether the GPS signals are received by the position information module 655 (S650).

When the GPS signals are received by the position information module 655, the control unit 680 may trust the position data provided by the position information module 655 and may determine that the portable air purifier 70 is not positioned inside the tunnel.

As a result, when the GPS signals are not received by the position information module 655, the control unit 680 may determine that the portable air purifier 70 is positioned inside the tunnel and may control the operation of the portable air purifier 70 to drive the fan motor 132 (S660).

In general, a reception rate of the GPS signals is rapidly reduced inside the tunnel. Illuminance inside such a tunnel is generally lower than that outside the tunnel. In consideration of such a point, when a condition in which the illumination around the portable air purifier 70 is lower than the reference illuminance and a condition in which the GPS signals are not received are satisfied at the same time, the control unit 680 may consider that the portable air purifier 70 is positioned inside the tunnel.

Inside the tunnel, a large amount of pollutants, such as fumes, are emitted from vehicles passing through the tunnel. Since the inside of the tunnel is under a condition in which it is difficult for ventilation to be performed properly when compared to the outside of the tunnel, air quality inside the tunnel is generally lower than that outside of the tunnel.

Therefore, although air purification using the portable air purifier 70 is not necessary in the outside of the tunnel, the portable air purifier 70 needs to be operated when the vehicle enters the tunnel.

In particular, since a large number of tunnels are disposed on a road that has recently been opened, there is a great deal of inconvenience in repeating an operation of turning the portable air purifier 70 on or off whenever the vehicle passes through the tunnel. In addition, forgetting to operate the portable air purifier 70 when the vehicle enters the tunnel may occur frequently, and in this case, there is a problem in that air inside the vehicle may be polluted by polluted air inside the tunnel.

According to the present embodiment, when the vehicle enters the tunnel, the portable air purifier 70 may be automatically operated by automatically detecting the vehicle entering the tunnel so as to purify air inside the vehicle.

Therefore, without the inconvenience of having to repeat the operation of turning the portable air purifier 70 on or off whenever the vehicle passes through the tunnel, an environment inside the vehicle may be comfortably maintained. In addition, a risk of accident that may occur when a driver operates the portable air purifier 70 while driving may be effectively prevented.

[Fourth Example of Operation Control of Portable Air Purifier]

FIG. 66 is a flowchart illustrating a fourth example of an operation control process of the portable air purifier shown in FIG. 63.

Figure 67:
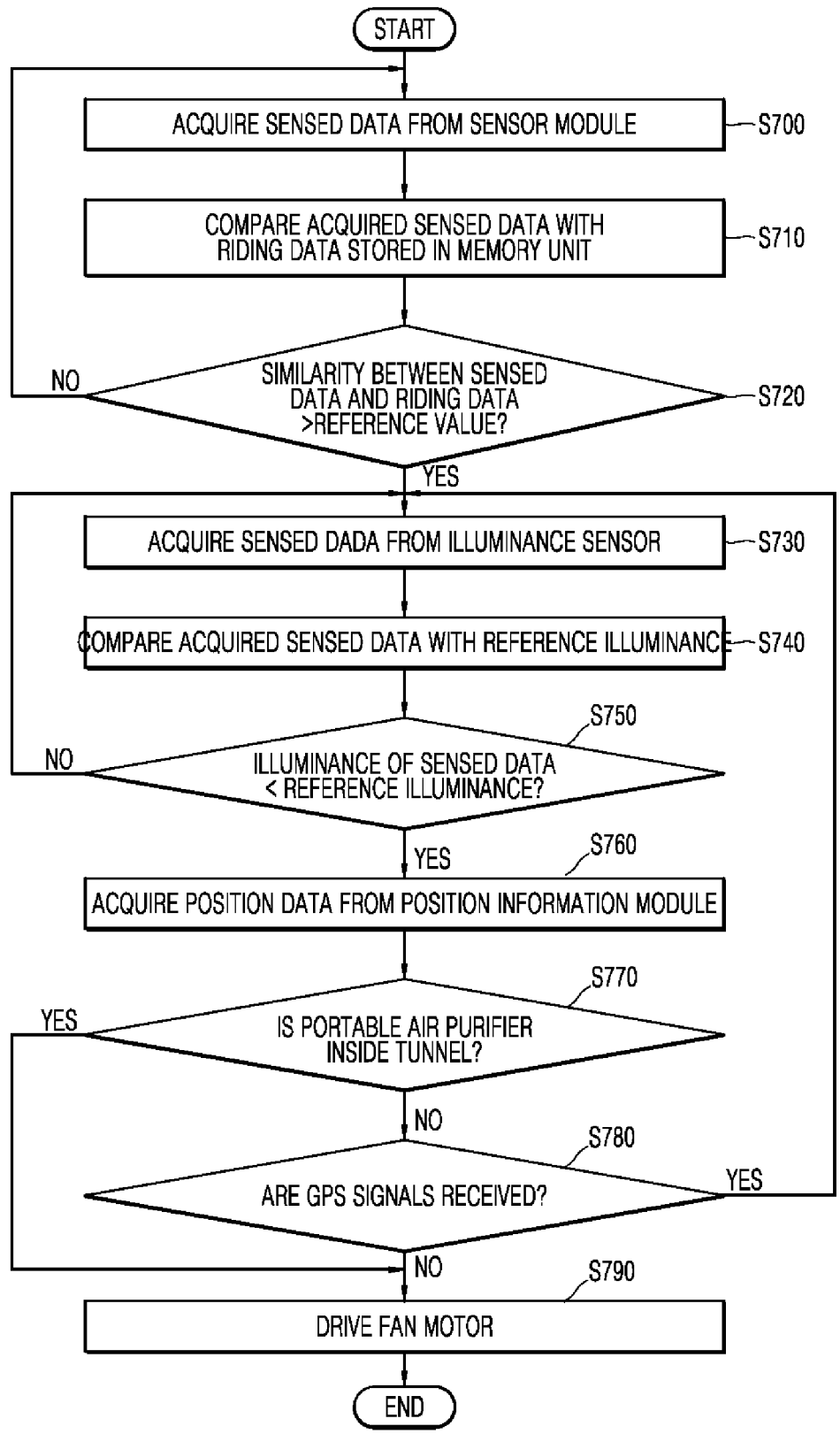
FIG. 67 is a flowchart illustrating a fourth example of an operation control process of the portable air purifier shown in FIG. 63.

Referring to FIGS. 63 and 67, the portable air purifier 70 of the present embodiment may control operation of the portable air purifier 70 using sensed data acquired by the vibration sensor 620, the illuminance sensor 640, and the acceleration sensor 630.

As an example, when a condition in which illumination around the portable air purifier 70 measured by the illuminance sensor 640 is lower than or equal to preset reference illuminance and a condition in which a riding state is sensed are satisfied at the same time, the portable air purifier 70 may consider that a vehicle loaded with the portable air purifier 70 is positioned inside a tunnel and an air purifying operation may start.

To this end, the portable air purifier 60 may acquire the sensed data from the sensor module 600 (S700) and may compare the acquired sensed data with riding data stored in the memory unit 670 (S710).

As a comparison result, when similarity between the sensed data and the riding data is greater than a reference value (YES in S720), the portable air purifier 70 detects that a current state is the riding state.

Since operations S700 to S720 are performed in a form similar to those of initial operations (operations S100 to S120, see FIG. 48) of the operation control process of the portable air purifier 60 (see FIG. 55) according to the third embodiment of the present invention, detailed descriptions thereof will be omitted.

As described above, when it is detected that the portable air purifier 70 is in the riding state, the portable air purifier 70 acquires sensed data from the sensor module 600 (S730). The sensor module 600 may transmit generated sensed data to the control unit 680.

The control unit 680 compares illuminance data included in sensed data acquired by the illuminance sensor 640 with the preset reference illuminance (S740). As a comparison result, when the illuminance around the portable air purifier 70 sensed by the illuminance sensor 640 is lower than the reference illuminance (S750), the position information module 655 is operated, and the control unit 680 acquires position information from the position information module 655 (S760).

The control unit 680 determines whether the portable air purifier 70 is positioned inside the tunnel by using GPS signals received through the GPS receiver (S770). As a result, when it is confirmed that the portable air purifier 70 is positioned inside the tunnel, the control unit 680 may control operation of the portable air purifier 70 to drive the fan motor 132 (S790).

When it is not confirmed that the portable air purifier 70 is positioned inside the tunnel, the control unit 680 may check whether the GPS signals are received by the position information module 655 (S780).

When the GPS signals are received by the position information module 655, the control unit 680 may trust the position data provided by the position information module 655 and may determine that the portable air purifier 70 is not positioned inside the tunnel.

When the GPS signals are not received by the position information module 655, the control unit 680 may determine that the portable air purifier 70 is positioned inside the tunnel and thus may control the operation of the portable air purifier 70 to drive the fan motor 132 (S790).

Since operations S730 to S790 are performed in a form similar to those of operations S600 to S660 shown in FIG. 66, detailed descriptions thereof will be omitted.

In the above-described operation control process of the portable air purifier 70, it is noted that the riding data is further used to increase accuracy of determining whether the portable air purifier 70 is positioned inside the tunnel.

When the position of the portable air purifier 70 is determined using only the sensed data acquired by the illuminance sensor 640 and the position data acquired by the position information module 655, though the portable air purifier 70 is not positioned inside the tunnel, sometimes, the position of the portable air purifier 70 is likely to be determined as being positioned inside the tunnel.

For example, in a dark place in a building, illuminance may be measured to be low, and GPS signals may not be properly received. Though such a place is not an inside of the tunnel, the space may be identified as being the inside of the tunnel in a case in which determination is performed based on only illuminance and whether GPS signals are received.

In consideration of such a point, only in a state in which whether a user rides in a vehicle is confirmed using a riding data, the portable air purifier 70 of the present embodiment may be operated such that illumination is sensed and position data is confirmed.

Accordingly, the portable air purifier 70 of the present embodiment may more accurately grasp a position thereof and may provide reliable operation performance.

Although the present invention has been described with reference to the embodiments shown in the drawings, the embodiments are only examples. It will be appreciated by those skilled in the art that various modifications and equivalent other embodiments are possible from the present invention. Therefore, the scope of the present invention should be defined only by the accompanying claims.

The invention claimed is:

1. A portable air purifier, comprising:
   at least one blower fan which is rotated about a rotational shaft extending in a first direction and including a hub and a plurality of fan blades connected to a radial circumference of the hub;
   a filter unit including a filter disposed adjacent to the at least one blower fan at a suction side of the at least one blower fan;

a fan cover including at least one shield plate disposed at a discharge side of the at least one blower fan to cover the hub, and a plurality of guide vanes configured to guide a discharge direction of air discharged from the at least one blower fan, wherein a blowing surface is formed in front of a region in which the plurality of fan blades is rotated, wherein the plurality of guide vanes is disposed in front of the blowing surface and radially extends from the rotational shaft, wherein the plurality of guide vanes includes a first guide surface disposed adjacent to the at least one blower fan configured to guide a discharge direction of air discharged from the at least one blower fan and a second guide surface connected to the first guide surface and disposed farther than the first guide surface from the at least one blower fan, wherein the second guide surface extends parallel to the first direction, wherein the first guide surface and the second guide surface are directly and continuously connected, and wherein the first guide surface forms a plane surface that extends in a direction parallel to the discharge direction of air discharged from the at least one blower fan, the plane surface extending at a predetermined angle with respect to the blowing surface; and a battery supported by the fan cover, wherein the fan cover includes an upper cover disposed in a first region where the fan is disposed, and a lower cover disposed in a second region where the fan is not disposed, wherein the battery is disposed in the second region and coupled to the fan cover, and wherein the lower cover extends from the upper cover between the blowing surface and the battery to support the battery.

2. The portable air purifier of claim 1, wherein a length of the first guide surface is the same as a length of the second guide surface.

3. The portable air purifier of claim 1, wherein the predetermined angle formed by the first guide surface and the blowing surface satisfies relationships below:

$$r=(r_o+r_i)/2;$$

$$A=\pi(r_o^2-r_i^2);$$

$$v_a=Q/A;$$

$$v_r=\omega \times r; \text{ and}$$

$$a=\tan^{-1}(v_a/v_r),$$

wherein $r_o$ refers to a radius of the at least one blower fan, $r_i$ refers to a radius of the hub, A refers to an area of the blowing surface, Q refers to an air flow rate of the at least one blower fan, a refers to the predetermined angle formed by the first guide surface and the blowing surface, $v_a$ refers to a discharge velocity vector of the at least one blower fan in the first direction, and $v_r$ refers to a radial discharge velocity vector of the at least one blower fan.

4. The portable air purifier of claim 1, wherein the plurality of guide vanes is each made of a synthetic resin injection molding material and has a thickness of 1 mm.

5. The portable air purifier of claim 1, wherein the plurality of guide vanes is disposed in a rotational direction of the at least one blower fan.

6. The portable air purifier of claim 5, wherein a number of the plurality of guide vanes is greater than a number of the plurality of fan blades.

7. The portable air purifier of claim 1, wherein the fan cover includes the upper cover to which the at least one blower fan is coupled and an air discharge formed to pass through the upper cover in front of the at least one blower fan, wherein the at least one shield plate is disposed in the air discharge, and wherein the plurality of guide vanes connects the at least one shield plate and the upper cover.

8. The portable air purifier of claim 7, wherein the fan cover is made of a synthetic resin injection molding material, wherein the upper cover, the at least one shield plate, and the plurality of guide vanes are integrally injection-molded, and wherein each of the plurality of guide vanes has a thickness of 1 mm.

9. A portable air purifier, comprising:
a plurality of blower fans oriented in a vertical direction, wherein each of the plurality of blower fans is rotated about a rotational shaft extending in a horizontal direction and includes a hub and a plurality of fan blades connected to a radial circumference of the hub;
a filter unit including a filter disposed adjacent to the at least one blower fan at a suction side of the at least one blower fan;
a fan cover including a plurality of shield plates disposed, respectively, at a discharge side the plurality of blower fans to cover the hubs, and a plurality of guide vanes configured to guide a discharge direction of air discharged from the plurality of blower fans, wherein a blowing surface is formed in front of a region in which the plurality of fan blades is rotated, wherein the plurality of guide vanes is disposed in front of the blowing surface and extends radially, wherein the plurality of guide vanes each includes a first guide surface disposed adjacent to the plurality of blower fans and a second guide surface connected to the first guide surface and disposed farther than the first guide surface from the plurality of blower fans, wherein the second guide surface extends in the horizontal direction, and wherein the first guide surface forms a plane surface that extends in a direction parallel to a discharge direction of air discharged from the blower fan, the plane surface extending at a predetermined angle with respect to the blowing surface, and
a battery supported by the fan cover, wherein the fan cover includes an upper cover disposed in a first region where the fan is disposed, and a lower cover disposed in a second region where the fan is not disposed, wherein the battery is disposed in the second region and coupled to the fan cover, and wherein the lower cover extends from the upper cover between the blowing surface and the battery to support the battery.

10. The portable air purifier of claim 9, wherein a length of the first guide surface is the same as a length of the second guide surface.

11. The portable air purifier of claim 9, wherein the predetermined angle formed by the first guide surface and the blowing surface satisfies relationships below:

$$r=(r_o+r_i)/2;$$

$$A=\pi(r_o^2-r_i^2);$$

$$v_a=Q/A;$$

$$v_r=\omega \times r; \text{ and}$$

$$a=\tan^{-1}(v_a/v_r),$$

wherein $r_o$ refers to a radius of the plurality of blower fans, $r_i$ refers to a radius of the hub, A refers to an area of the blowing surface, Q refers to an air flow rate of the plurality of blower fans, a refers to the predetermined angle formed by the first guide surface and the blowing surface, $v_a$ refers to a discharge velocity vector of the plurality of blower fans in the vertical direction, and $v_r$ refers to a radial discharge velocity vector of the plurality of blower fans.

12. The portable air purifier of claim 9, wherein the plurality of guide vanes is each made of a synthetic resin injection molding material and has a thickness of 1 mm.

13. The portable air purifier of claim 9, wherein the plurality of guide vanes is disposed in a rotational direction of the plurality of blower fans.

14. The portable air purifier of claim 13, wherein a number of the plurality of guide vanes is greater than a number of the plurality of fan blades.

15. The portable air purifier of claim 9, wherein the fan cover includes the upper cover to which the plurality of blower fans is coupled and an air discharge formed to pass through the upper cover in front of the plurality of blower fans, wherein the plurality of shield plates is disposed in the air discharge, and wherein the plurality of guide vanes connects the plurality of shield plates and the upper cover.

16. The portable air purifier of claim 15, wherein the fan cover is made of a synthetic resin injection molding material, wherein the upper cover, the plurality of shield plates, and the plurality of guide vanes are integrally injection-molded, and wherein each of the plurality of guide vanes has a thickness of 1 mm.

17. A portable air purifier, comprising:
a plurality of blower fans oriented in a vertical direction, wherein each of the plurality of blower fans is rotated about a rotational shaft extending in a horizontal direction and includes a hub and a plurality of fan blades connected to a radial circumference of the hub;
a filter unit including a filter disposed adjacent to the at least one blower fan at a suction side of the at least one blower fan;
a fan cover disposed at a discharge side of the plurality of blower fans, and a plurality of guide vanes configured to guide a discharge direction of air discharged from the plurality of blower fans, wherein a blowing surface is formed in front of a region in which the plurality of fan blades is rotated, wherein the plurality of guide vanes is disposed in front of the blowing surface and extends radially, wherein the plurality of guide vanes includes a first guide surface disposed adjacent to the plurality of blower fans and a second guide surface connected to the first guide surface and disposed farther than the first guide surface from the plurality of blower fans, wherein the second guide surface extends in the horizontal direction, wherein the first guide surface forms a plane surface in a direction that extends parallel to the discharge direction of air discharged from the plurality of blower fans, the plane surface extending at a predetermined angle with respect to the blowing surface, wherein the predetermined angle formed by the first guide surface and the blowing surface satisfies relationships below:

$r=(r_o+r_i)/2;$ $A=\pi(r_o^2-r_i^2);$ $v_A=Q/a;$ $v_r=\omega \times r;$ and $a=\tan^{-1}(v_a/v_r),$ wherein $r_o$ refers to a radius of the plurality of blower fans, $r_i$ refers to a radius of the hub, A refers to an area of the blowing surface, Q refers to an air flow rate of the plurality of blower fans, a refers to the predetermined angle formed by the first guide surface and the blowing surface, $v_a$ refers to a discharge velocity vector of the plurality of blower fans in the vertical direction, and $v_r$ refers to a radial discharge velocity vector of the plurality of blower fans; and
a battery supported by the fan cover, wherein the fan cover includes an upper cover disposed in a first region where the fan is disposed, and a lower cover disposed in a second region where the fan is not disposed, wherein the battery is disposed in the second region and coupled to the fan cover, and wherein the lower cover extends from the upper cover between the blowing surface and the battery to support the battery.

18. The portable air purifier of claim 17, wherein a length of the first guide surface is the same as a length of the second guide surface.

19. The portable air purifier of claim 17, wherein the plurality of guide vanes is each made of a synthetic resin injection molding material and has a thickness of 1 mm.

20. The portable air purifier of claim 17, wherein the plurality of guide vanes is disposed in a rotational direction of the plurality of blower fans.

\* \* \* \* \*